United States Patent
Inomata et al.

(10) Patent No.: US 10,302,931 B2
(45) Date of Patent: May 28, 2019

(54) MAGNIFYING OBSERVATION APPARATUS

(71) Applicant: KEYENCE CORPORATION, Osaka-shi, Osaka (JP)

(72) Inventors: Masahiro Inomata, Osaka (JP); Shingo Matsumura, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 148 days.

(21) Appl. No.: 15/646,444

(22) Filed: Jul. 11, 2017

(65) Prior Publication Data
US 2018/0024346 A1    Jan. 25, 2018

(30) Foreign Application Priority Data

Jul. 22, 2016 (JP) ................................. 2016-144936

(51) Int. Cl.
| | |
|---|---|
| *H04N 5/00* | (2011.01) |
| *G02B 21/36* | (2006.01) |
| *G02B 21/06* | (2006.01) |
| *G02B 21/18* | (2006.01) |
| *H04N 5/232* | (2006.01) |
| *G02B 21/08* | (2006.01) |

(Continued)

(52) U.S. Cl.
CPC .......... *G02B 21/367* (2013.01); *G02B 21/06* (2013.01); *G02B 21/084* (2013.01); *G02B 21/18* (2013.01); *G02B 21/362* (2013.01); *G02B 21/368* (2013.01); *H04N 5/2355* (2013.01); *H04N 5/23212* (2013.01); *H04N 5/23293* (2013.01); *G03B 13/32* (2013.01); *G03B 13/34* (2013.01)

(58) Field of Classification Search
CPC .. G02B 21/365; G02B 21/367; G02B 21/002; H04N 7/18; G01N 21/6458
See application file for complete search history.

(56) References Cited

U.S. PATENT DOCUMENTS 6,028,608 A *   2/2000   Jenkins ................. G06T 1/0021
                                                              345/619
6,396,628 B1 *  5/2002   Osa ........................ G02B 21/06
                                                              359/385

(Continued)

FOREIGN PATENT DOCUMENTS

JP        2013-72971         4/2013

OTHER PUBLICATIONS

U.S. Appl. No. 15/646,432, filed Jul. 11, 2017, Masahiro Inomata et al., Keyence Corporation.

(Continued)

*Primary Examiner* — Frank F Huang

(57) ABSTRACT

Light in a first emitting direction is irradiated on an observation target from a light projecting section and light from the observation target is received by an imaging section via an objective lens while a focal position of the light is changed in an optical axis direction of the objective lens, whereby a plurality of first original image data are generated in a plurality of focal positions. Light in a second emitting direction different from the first emitting direction is irradiated on the observation target from the light projecting section, whereby a plurality of second original image data are generated. First and second focused image data are respectively acquired on the basis of the pluralities of first and second original image data.

15 Claims, 49 Drawing Sheets

(51) Int. Cl.
*H04N 5/235* (2006.01)
*G03B 13/32* (2006.01)
*G03B 13/34* (2006.01)

(56) References Cited

U.S. PATENT DOCUMENTS

| | | | | |
|---|---|---|---|---|
| 7,602,483 | B2 * | 10/2009 | Allweier | G01N 21/8806 356/237.4 |
| 8,179,432 | B2 * | 5/2012 | Yazdanfar | G02B 21/365 250/201.2 |
| 8,310,531 | B2 * | 11/2012 | Nandy | G01N 21/6458 348/226.1 |
| 2004/0196365 | A1 * | 10/2004 | Green | G02B 21/367 348/79 |
| 2006/0045505 | A1 * | 3/2006 | Zeineh | G02B 21/365 396/89 |
| 2008/0059889 | A1 * | 3/2008 | Parker | G06F 16/29 715/748 |
| 2008/0247670 | A1 * | 10/2008 | Tam | H04N 13/0257 382/298 |
| 2008/0284869 | A1 * | 11/2008 | Utsugi | G06T 11/001 348/222.1 |
| 2009/0231362 | A1 * | 9/2009 | Kaba | G11B 27/034 345/660 |
| 2010/0080448 | A1 * | 4/2010 | Tam | H04N 13/0257 382/154 |
| 2010/0331684 | A1 * | 12/2010 | Ragauskas | A61B 5/031 600/438 |
| 2011/0285813 | A1 * | 11/2011 | Girdzijauskas | H04N 13/128 348/42 |

OTHER PUBLICATIONS

U.S. Appl. No. 15/646,451, filed Jul. 11, 2017, Masahiro Inomata et al., Keyence Corporation.

* cited by examiner

FIG. 21

| 12 | 13 | 12 | 11 | 10 | 50 | 51 | 51 |
|----|----|----|----|----|----|----|----|
| 13 | 14 | 15 | 16 | 17 | 18 | 19 | 20 |
| 13 | 13 | 18 | 21 | 24 | 27 | 30 | 33 |
| 13 | 13 | 21 | 26 | 31 | 36 | 41 | 46 |
| 13 | 13 | 24 | 31 | 38 | 45 | 52 | 59 |
| 13 | 13 | 27 | 36 | 45 | 54 | 63 | 72 |
| 13 | 13 | 30 | 41 | 52 | 63 | 74 | 85 |

RING ILLUMINATION

PIXEL PX1
PIXEL VALUE: 255

FIRST DIRECTIONAL
ILLUMINATION

PIXEL PX2
PIXEL VALUE: 255

SECOND DIRECTIONAL
ILLUMINATION

PIXEL PX3
PIXEL VALUE: 100

THIRD DIRECTIONAL
ILLUMINATION

PIXEL PX4
PIXEL VALUE: 95

FOURTH DIRECTIONAL
ILLUMINATION

PIXEL PX5
PIXEL VALUE: 90

MAGNIFYING OBSERVATION APPARATUS

CROSS-REFERENCE TO RELATED APPLICATIONS

The present application claims foreign priority based on Japanese Patent Application No. 2016-144936, filed Jul. 22, 2016, the contents of which is incorporated herein by reference.

BACKGROUND OF THE INVENTION

1. Field of the Invention

The present invention relates to a magnifying observation apparatus for magnifying and observing an observation target.

2. Description of Related Art

A magnifying observation apparatus is sometimes used in order to magnify and observe an observation target (see, for example, JP-A-2013-72971). In a microscope system described in JP-A-2013-72971, bright-field illumination light and dark-field illumination light are irradiated on a sample on a stage through an objective lens.

The bright-field illumination light is illumination light emitted in a direction parallel to an optical axis of the objective lens. The dark-field illumination light is illumination light emitted in a direction inclined with respect to the optical axis of the objective lens. Observation light reflected on the sample is made incident on an imaging apparatus through an imaging lens, whereby the sample is imaged.

In the microscope system described in JP-A-2013-72971, illumination intensity of one illumination light is relatively reduced according to a ratio of an exposure time for the bright-field illumination light and an exposure time for the dark-field illumination light. Consequently, the intensity of the bright-field illumination light and the intensity of the dark-field illumination light are aligned. JP-A-2013-72971 mentions that, as a result, it is possible to perform the observation of the sample at most suitable illumination intensity in observing the sample on which the bright-field illumination light and the dark-field illumination light are simultaneously irradiated. A user is capable of intuitively adjusting a ratio of illumination intensities of the bright-field illumination light and the dark-field illumination light from an image in an optimized illumination intensity state.

However, appropriate imaging conditions such as illumination intensity are different depending on the shape and the material of an observation target. Therefore, it is difficult for an unskilled user to acquire an image captured under the appropriate imaging conditions. It is sometimes found ex post that the imaging conditions are inappropriate. In such a case, imaging of the observation target needs to be performed again under different imaging conditions. Therefore, a burden on the user increases.

SUMMARY OF THE INVENTION

An object of the present invention is to provide a magnifying observation apparatus capable of easily acquiring an image of an observation target corresponding to a request of a user.

(1) A magnifying observation apparatus according to a first invention includes: an objective lens; a light projecting section configured to selectively irradiate, on an observation target, lights from first and second emitting directions different from each other; an imaging section configured to receive light from the observation target via the objective lens and generate first and second original image data indicating an image of the observation target; a focal-position changing section configured to change a focal position of the light passed through the objective lens to an optical axis direction of the objective lens relatively to the observation target; and a data generating section configured to generate image data for display indicating an image of the observation target that should be obtained when it is assumed that light in a specific emitting direction designated by a user is irradiated on the observation target. At a first light irradiation time, the light projecting section irradiates the light in the first emitting direction on the observation target and the imaging section generates a plurality of the first original image data in a different plurality of the focal positions changed by the focal-position changing section. At a second light irradiation time, the light projecting section irradiates the light in the second emitting direction on the observation target and the imaging section generates a plurality of the second original image data in a different plurality of the focal positions changed by the focal-position changing section. The data generating section acquires, on the basis of the plurality of first original image data, first focused image data having a focus degree decided in advance, acquires, on the basis of the plurality of second original image data, second focused image data having a focus degree decided in advance, and generates image data for display on the basis of at least one of the first and second focused image data.

In the magnifying observation apparatus, the light in the first emitting direction is irradiated on the observation target from the light projecting section. In this state, the light from the observation target is received by the imaging section via the objective lens while the focal position of the light passed through the objective lens is changed to the optical axis direction of the objective lens relatively to the observation target by the focal-position changing section. Consequently, the plurality of first original image data respectively indicating images of the observation target in the plurality of focal positions are generated.

The light in the second emitting direction different from the first emitting direction is irradiated on the observation target from the light projecting section. In this state, the light from the observation target is received by the imaging section via the objective lens while the focal position of the light passed through the objective lens is changed to the optical axis direction of the objective lens relatively to the observation target by the focal-position changing section. Consequently, the plurality of second original image data respectively indicating images of the observation target in the plurality of focal positions are generated.

Further, the first focused image data having the focus degree decided in advance is acquired on the basis of the plurality of first original image data. The second focused image data having the focus degree decided in advance is acquired on the basis of the plurality of second original image data. The image data for display indicating the image of the observation target that should be obtained when it is assumed that the light in the specific emitting direction designated by the user is irradiated on the observation target is generated by the data generating section on the basis of at least one of the first and second focused image data.

With this configuration, the lights in the first and second emitting directions different from each other are irradiated on the observation target from the light projecting section.

Therefore, the user can generate, by optionally designating an emitting direction, without changing an emitting direction of light actually irradiated on the observation target, image data for display indicating an image at the time when light in an appropriate emitting direction corresponding to the shape and the material of the observation target is irradiated on the observation target. The image data for display is generated on the basis of at least one of the first and second focused image data having the focus degree decided in advance. Therefore, the user can generate image data for display indicating an image having a large focus degree as a whole. Consequently, the user can easily acquire an image of the observation target corresponding to a request of the user.

The image data for display can be generated using the already generated first and second original image data. Therefore, it is unnecessary to perform imaging of the observation target again. Therefore, it is possible to reduce a burden on the user.

(2) The magnifying observation apparatus may further include a focus determining section configured to determine a focus degree of each of portions of the first or second original image data generated by the imaging section. The data generating section may selectively combine portions of the plurality of first original image data on the basis of the determination of the focus degree by the focus determining section to thereby generate the first focused image data indicating an image focused on portions of the observation target and selectively combine portions of the plurality of second original image data on the basis of the determination of the focus degree by the focus determining section to thereby generate the second focused image data indicating an image focused on the portions of the observation target. In this case, the user can observe the image focused on the portions of the observation target.

(3) The data generating section may generate correspondence relation data indicating a correspondence relation between portions of the first focused image data and portions of the plurality of first original image data and generate the second focused image data from the plurality of second original image data on the basis of the generated correspondence relation data.

In this case, when the second focused image data is generated, the focus determining section does not need to determine a focus degree of each of pixels concerning the plurality of second original image data. Consequently, it is possible to generate the second focused image data at high speed.

(4) The generation of the plurality of first or second original image data by the imaging section and the generation of the first or second focused image data by the data generating section may be performed in parallel. In this case, it is possible to generate the image data for display at high speed.

(5) The magnifying observation apparatus may further include a focus determining section configured to determine a focus degree of the first or second original image data generated by the imaging section. The data generating section may extract any one of the plurality of first original image data as the first focused image data on the basis of the determination of the focus degree by the focus determining section and extract any one of the plurality of second original image data as the second focus image data on the basis of the determination of the focus degree by the focus determining section. In this case, it is possible to generate the first and second focused image data having the focus degrees decided in advance at high speed.

(6) The magnifying observation apparatus may further include a first operation section operated by the user in order to designate a range of a focal position of light in the optical axis direction of the objective lens. The focal-position changing section may change the focal position of the light in the optical axis direction of the objective lens in the range designated by the first operation section.

In this case, the user can operate the first operation section to designate the range of the focal position of the light in the optical axis direction of the objective lens. Therefore, the focal-position changing section does not need to change the focal position of the light in an excessively large range. Consequently, it is possible to generate the pluralities of first and second original image data at high speed.

(7) The magnifying observation apparatus may further include: a second operation section configured to receive an instruction for a start of observation by the user; and a control section configured to, in response to the instruction received by the second operation section, control the light projecting section to sequentially emit the lights in the first and second emitting directions respectively at the first and second light irradiation times while controlling the focal-position changing section to set the focal position of the light to a first position and thereafter control the light projecting section to sequentially emit the lights in the first and second emitting directions respectively at the first and second light irradiation times while controlling the focal-position changing section to set the focal position of the light to a second position different from the first position in the optical axis direction of the objective lens.

In this case, the second operation section receives the instruction for the start of the observation from the user, whereby the focal position of the light is automatically moved to the first position. The lights in the first and second emitting directions are automatically sequentially irradiated on the observation target from the light projecting section. Thereafter, the focal position of the light is automatically moved to the second position. The lights in the first and second emitting directions are automatically sequentially irradiated on the observation target. Therefore, even if the user is unskilled, the user can easily generate the pluralities of first and second original image data.

(8) The magnifying observation apparatus may further include: a second operation section configured to receive an instruction for a start of observation by the user; and a control section configured to, in response to the instruction received by the second operation section, control the light projecting section to emit the light in the first emitting direction while controlling the focal-position changing section to sequentially change the focal position of the light to different first and second positions in the optical axis direction of the objective lens at the first light irradiation time and thereafter control the light projecting section to emit the light in the second emitting direction while controlling the focal-position changing section to sequentially change the focal position of the light to the first and second positions at the second light irradiation time.

In this case, the second operation section receives the instruction for the start of the observation from the user of the second operation section, whereby the focal position of the light is automatically sequentially moved to the first and second positions while the light in the first emitting direction is automatically irradiated on the observation target from the light projecting section. Thereafter, the focal position of the light is automatically sequentially moved to the first and second positions while the light in the second emitting direction is automatically irradiated on the observation target from the light projecting section. Therefore, even if the user is unskilled, the user can easily generate the pluralities of first and second original image data.

(9) The imaging section may generate the first and second original image data in a state in which a light reception time is changed to a plurality of times. The data generating section may generate the image data for display with an adjusted dynamic range on the basis of at least one of the plurality of first original image data generated by the imaging section in the state in which the light reception time is changed to the plurality of times concerning the focal positions and the plurality of second original image data generated by the imaging section in the state in which the light reception time is changed to the plurality of times concerning the focal positions.

When the dynamic range of the image data for display is adjusted to be expanded, the user can observe an image with black solid and halation (white void) reduced. When the dynamic range of the image data for display is adjusted to be reduced, the user can observe an image with improved resolution.

(10) The light projecting section may include a plurality of light emission regions disposed rotation-symmetrically around an optical axis of the objective lens and simultaneously emit lights from the plurality of light emission regions at the first light irradiation time to thereby irradiate the light in the first emitting direction on the observation target and emit light from a part of the plurality of light emission regions at the second light irradiation time to thereby irradiate the light in the second light emitting direction on the observation target.

In this case, the light projecting section can easily emit lights in a uniform emitting direction from the plurality of light emission regions as the light in the first emitting direction. The light projecting section can easily emit the light in the second emitting direction different from the first emitting direction from a part of the plurality of light emission regions. Further, since the plurality of light emission regions are disposed rotation-symmetrically around the optical axis of the objective lens, when the image data for display is generated by an arithmetic operation on the basis of the first and second original image data, it is possible to simplify the arithmetic operation.

(11) One or more light emitting members may be provided in each of the plurality of light emission regions. In this case, the light projecting section can easily emit light from each of the plurality of light emission regions.

(12) The data generating section may combine the first and second focused image data to thereby generate the image data for display. In this case, the first and second focused image data respectively corresponding to the lights in the first and second emitting directions different from each other are combined. Consequently, it is possible to easily generate image data for display indicating an image of the observation target that should be obtained when it is assumed that light in any emitting direction is irradiated on the observation target.

(13) The data generating section may determine a ratio of the combination of the first and second focused image data on the basis of the specific emitting direction. In this case, it is possible to easily generate the image data for display on the basis of the first and second original image data.

(14) The magnifying observation apparatus may further include a third operation section operated by the user in order to designate the specific emitting direction. The data generating section may update, according to the specific emitting direction designated by the third operation section, the image data for display to be generated. In this case, the user can easily acquire image data for display indicating an image of the observation target corresponding to a request of the user by operating the third operation section to designate an appropriate emitting direction corresponding to the shape and the material of the observation target.

(15) A magnifying observation apparatus according to a second invention includes: an objective lens; a light projecting section configured to irradiate lights in a plurality of emitting directions on an observation target; an imaging section configured to receive light from the observation target via the objective lens and generate original image data indicating an image of the observation target; a focal-position changing section configured to change a focal position of the light passed through the objective lens to an optical axis direction of the objective lens relatively to the observation target; an operation section operated by a user in order to designate an imaginary emitting direction of light; and a data generating section configured to generate image data for display indicating an image of the observation target that should be obtained when it is assumed that light in the emitting direction designated by the operation section is irradiated on the observation target. The light projecting section irradiates light in one or a plurality of emitting directions on the observation target on the basis of the emitting direction designated by the operation section. The imaging section generates a plurality of the original image data in a different plurality of the focal positions changed by the focal-position changing section. The data generating section acquires, on the basis of the plurality of original image data, one or a plurality of focused image data having a focus degree decided in advance and generates image data for display on the basis of at least one of the one or plurality of focused image data.

In the magnifying observation apparatus, the operation section is operated by the user, whereby the imaginary emitting direction of light is designated. The light in the one or plurality of emitting directions is irradiated on the observation target from the light projecting section on the basis of the emitting direction designated by the operation section. In this state, the light from the observation target is received by the imaging section via the objective lens while the focal position of the light passed through the objective lens is changed to the optical axis direction of the objective lens relatively to the observation target by the focal-position changing section. Consequently, the plurality of original image data respectively indicating images of the observation target in the plurality of focal positions are generated. The one or plurality of focused image data having the focus degree decided in advance are acquired on the basis of the plurality of original image data. The image data for display indicating the image of the observation target that should be obtained when it is assumed that the light in the emitting direction designated by the operation section is irradiated on the observation target is generated by the data generating section on the basis of at least one of the one or plurality of focused image data.

With this configuration, it is possible to irradiate lights in a plurality of emitting directions different from one another from the light projecting section on the observation target. Therefore, the user can generate image data for display indicating an image at the time when light in an emitting direction appropriately designated according to the shape and the material of the observation target is irradiated on the observation target. The image data for display is generated on the basis of at least one of the one or plurality of focused image data having the focus degree decided in advance.

Therefore, the user can generate image data for display indicating an image having a large focus degree as a whole. Consequently, the user can easily acquire an image of the observation target corresponding to a request of the user.

Further, the imaginary emitting direction of light is received by the operation section before the plurality of original image data are generated. Therefore, light in an emitting direction that should be irradiated on the observation target in order to generate the image data for display is known. Therefore, light in an unnecessary emitting direction is prevented from being irradiated on the observation target and unnecessary original image data is prevented from being generated. Consequently, it is possible to generate the image data for display at high speed.

According to the present invention, it is possible to easily acquire an image of the observation target corresponding to a request of the user.

BRIEF DESCRIPTION OF THE DRAWINGS

FIG. 21 is a diagram visually showing mask image data.

DESCRIPTION OF EMBODIMENTS

Figure 1:
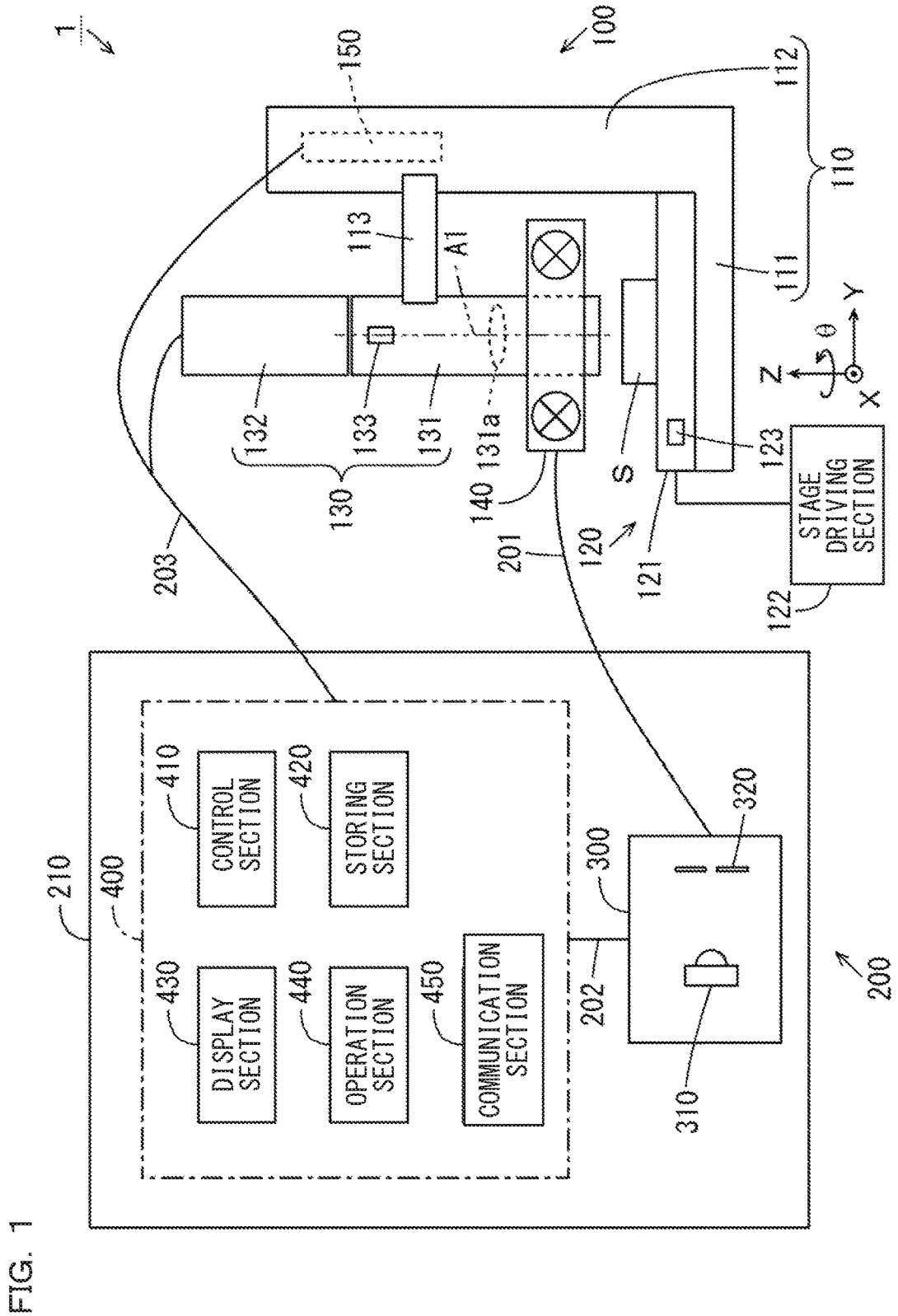
FIG. 1 is a schematic diagram showing the configuration of a magnifying observation apparatus according to a first embodiment of the present invention.

[1] First Embodiment (1) Configuration of a Magnifying Observation Apparatus
(a) Measurement Head A magnifying observation apparatus according to a first embodiment of the present invention is explained with reference to the drawings. FIG. 1 is a schematic diagram showing the configuration of the magnifying observation apparatus according to the first embodiment of the present invention. As shown in FIG. 1, a magnifying observation apparatus 1 includes a measurement head 100 and a processing device 200. The measurement head 100 is, for example, an endoscope and includes a stand section 110, a stage device 120, a lens barrel section 130, a light projecting section 140, and a control board 150.

The stand section 110 has an L-shape in a longitudinal cross section and includes a setting section 111, a holding section 112, and a focus driving section 113. The setting section 111 and the holding section 112 are formed by, for example, resin. The setting section 111 has a horizontal flat shape and is set on a setting surface. The holding section 112 is provided to extend upward from one end portion of the setting section 111.

The stage device 120 includes a stage 121 and a stage driving section 122. The stage 121 is provided on the upper surface of the setting section 111. An observation target S is placed on the stage 121. Two directions orthogonal to each other in a plane on the stage 121 on which the observation target S is placed (hereinafter referred to as placement surface) are defined as an X direction and a Y direction and respectively indicated by arrows X and Y. A direction of a normal orthogonal to the placement surface of the stage 121 is defined as a Z direction and indicated by an arrow Z. A direction of rotation around an axis parallel to the Z direction is defined as a θ direction and indicated by an arrow θ.

The stage driving section 122 includes a not-shown actuator such as a stepping motor. The stage driving section 122 moves the stage 121 in the X direction, the Y direction, or the Z direction or rotates the stage 121 in the θ direction on the basis of a drive pulse given by the control board 150. The user is also capable of manually moving the stage 121 in the X direction, the Y direction, or the Z direction or rotating the stage 121 in the θ direction.

The lens barrel section 130 includes a lens unit 131 and an imaging section 132 and is disposed above the stage 121. The lens unit 131 can be replaced with another lens unit according to a type of the observation target S. The lens unit 131 is configured by an objective lens 131a and a not-shown plurality of lenses. An optical axis A1 of the objective lens 131a is parallel to the Z direction. The imaging section 132 includes, for example, a CMOS (complementary metal oxide semiconductor) camera. The imaging section 132 may include another camera such as a CCD (charge coupled device) camera.

The lens barrel section 130 is attached to the holding section 112 by the focus driving section 113 of the stand section 110. The focus driving section 113 includes a not-shown actuator such as a stepping motor. The focus driving section 113 moves the lens unit 131 in the direction of the optical axis A1 of the objective lens 131a (the Z direction) on the basis of a drive pulse given by the control board 150. Consequently, a focal position of light passed through the lens unit 131 changes to the Z direction. The user is also capable of manually moving the lens unit 131 in the direction of the optical axis A1 of the objective lens 131a.

The light projecting section 140 is integrally attached to the lens unit 131 to surround the optical axis A1 of the objective lens 131a. Consequently, it is possible to uniquely determine a positional relation between the light projecting section 140 and the lens unit 131. Since it is unnecessary to add a member that holds the light projecting section 140 in the magnifying observation apparatus 1, it is possible to reduce the magnifying observation apparatus 1 in size. An optical axis A2 (FIGS. 3A and 3B referred to below) of the light projecting section 140 is substantially the same as the optical axis A1 of the objective lens 131a.

Lights in a plurality of emitting directions are irradiated on the observation target S on the stage 121 from the light projecting section 140. Light reflected to above the stage 121 by the observation target S is condensed and focused by the lens unit 131 and thereafter received by the imaging section 132. The imaging section 132 generates image data on the basis of pixel data corresponding to light reception amounts of pixels. Each of a plurality of image data respectively generated by the imaging section 132 at the time when the lights in the plurality of emitting directions are irradiated on the observation target S by the light projecting section 140 is referred to as original image data. The imaging section 132 gives the generated plurality of original image data to a control device 400.

The control board 150 is provided in, for example, the holding section 112 of the stand section 110 and connected to the focus driving section 113, the stage driving section 122, and the imaging section 132. The control board 150 controls the operations of the focus driving section 113 and the stage driving section 122 on the basis of control by the processing device 200. A control signal is input to the imaging section 132 from the control device 400. A plurality of original image data generated by the imaging section 132 are sequentially given to the processing device 200 via a cable 203.

(b) Processing Device

The processing device 200 includes a housing 210, alight generating section 300, and the control device 400. The housing 210 houses the light generating section 300 and the control device 400. The light generating section 300 is optically connected to the light projecting section 140 of the measurement head 100 by a fiber unit 201. The fiber unit 201 includes a not-shown plurality of optical fibers.

The light generating section 300 includes a light source 310 and a light blocking section 320. The light source 310 is, for example, an LED (light emitting diode). The light source 310 may be another light source such as a halogen lamp. The light blocking section 320 is disposed between the light source 310 and the fiber unit 201 to be capable of partially blocking light emitted by the light source 310. The light emitted by the light source 310 passes through the light blocking section 320 and is made incident on the fiber unit 201. Consequently, light is emitted from the light projecting section 140 of the measurement head 100 through the fiber unit 201.

Figure 2:
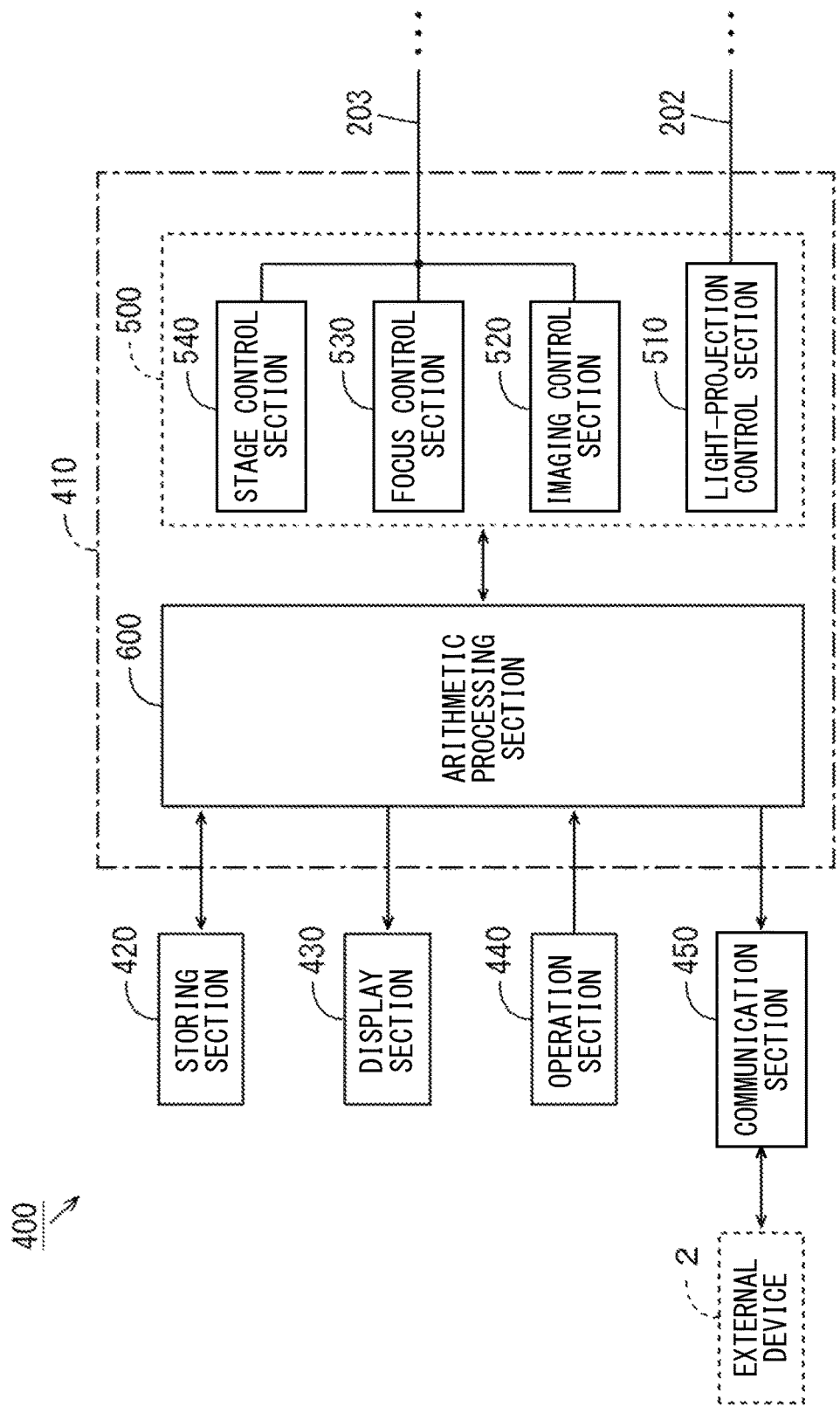
FIG. 2 is a block diagram showing the configuration of a control device shown in FIG. 1.

FIG. 2 is a block diagram showing the configuration of the control device 400 shown in FIG. 1. As shown in FIG. 2, the control device 400 includes a control section 410, a storing section 420, a display section 430, an operation section 440, and a communication section 450. The control section 410 includes, for example, a CPU (central processing unit). The storing section 420 includes, for example, a ROM (read only memory), a RAM (random access memory), or a HDD (hard disk drive). In this embodiment, the control section 410 and the storing section 420 are realized by a personal computer.

The control section 410 includes a driving control section 500 and an arithmetic processing section 600. A system program is stored in the storing section 420. The storing section 420 is used for processing of various data and saving of various data given from the control section 410. Functions of the driving control section 500 and the arithmetic processing section 600 are realized by the control section 410 executing the system program stored in the storing section 420.

The driving control section 500 includes a light-projection control section 510, an imaging control section 520, a focus control section 530, and a stage control section 540. The light-projection control section 510 is connected to the light generating section 300 shown in FIG. 1 through a cable 202 and controls the operation of the light generating section 300. The imaging control section 520, the focus control section 530, and the stage control section 540 are connected to the control board 150 of the measurement head 100 shown in FIG. 1 through the cable 203.

The imaging control section 520, the focus control section 530, and the stage control section 540 respectively control the operations of the imaging section 132, the focus driving section 113, and the stage driving section 122 through the control board 150. The imaging control section 520 sequentially gives a plurality of original image data generated by the imaging section 132 to the arithmetic processing section 600.

The arithmetic processing section 600 can generate, on the basis of at least one of the acquired plurality of original image data, image data for display indicating an image of the observation target S that should be obtained when it is assumed that light in an emitting direction designated by the user is irradiated on the observation target S. Details of the arithmetic processing section 600 are explained below. The plurality of original image data acquired by the arithmetic processing section 600 and the image data for display generated by the arithmetic processing section 600 are stored in the storing section 420.

The display section 430 is configured by, for example, an LCD (liquid crystal display) panel. The display section 430 may be configured by another display section such as an organic EL (electroluminescence) panel. The display section 430 displays, for example, an image based on the image data stored in the storing section 420 or the image data generated by the arithmetic processing section 600. The operation section 440 includes a pointing device such as a mouse, a touch panel, a trackball, or a joystick and a keyboard and is operated by the user in order to give an instruction and the like to the control device 400. The operation section 440 may include a jog shuttle in addition to the pointing device and the keyboard. The operation section 440 may include dial-like operation means, a rotation center of which faces the horizontal direction, for moving the lens barrel section 130 and the stage 121 in the up-down direction.

The communication section 450 includes an interface for connecting the control device 400 to a network. In the example shown in FIG. 1, an external device 2 having a display function is connected to the network. The control device 400 is capable of transmitting image data to the external device 2 having the display function via the communication section 450 A user of the external device 2 can acquire image data stored in a general-purpose image file format from the control device 400 via the communication section 450 and cause the external device 2 to display an image based on the image data.

(c) Light Projecting Section

Figure 3A:
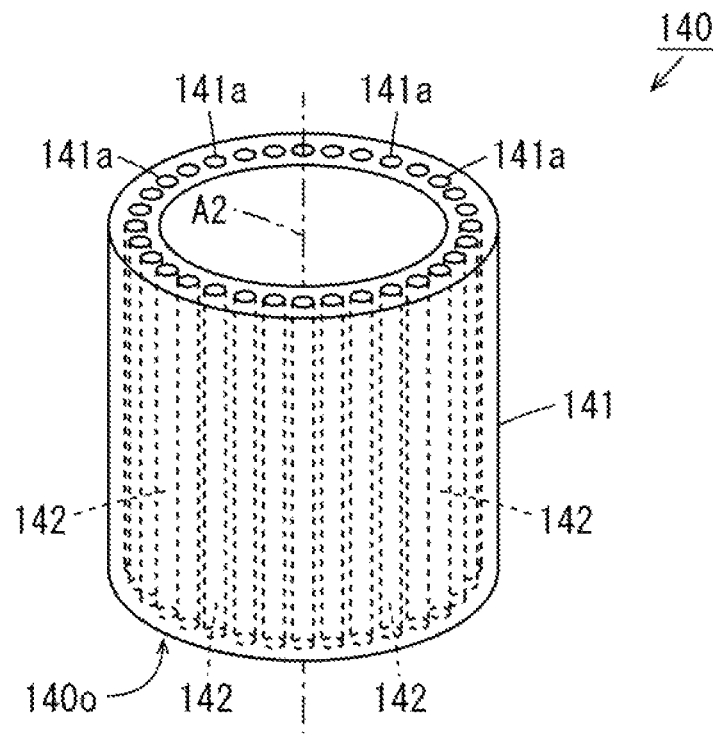
FIGS. 3A and 3B are a perspective view and a plan view showing the configuration of a light projecting section.
Figure 3B:
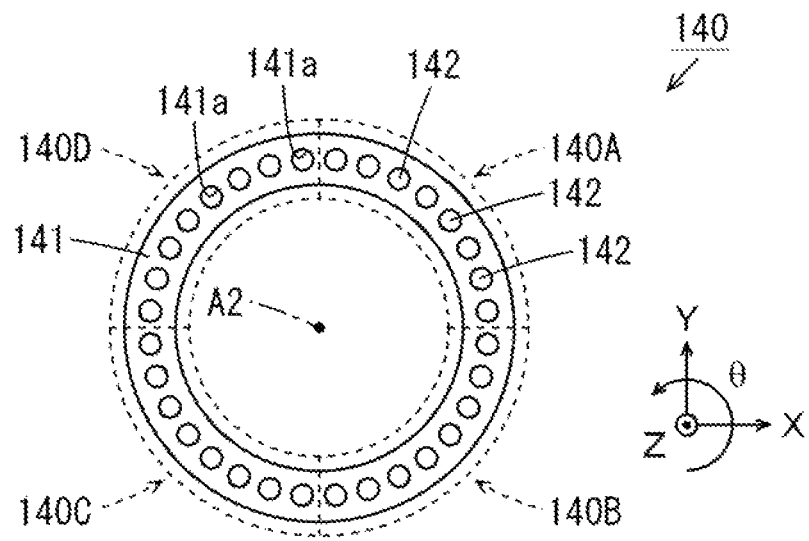

FIGS. 3A and 3B are a perspective view and a plan view respectively showing the configuration of the light projecting section 140. As shown in FIG. 3A, the light projecting section 140 includes a holding member 141 and a plurality of optical fibers 142. The holding member 141 is formed by, for example, resin and has a cylindrical shape. The outer diameter of the holding member 141 in plan view is smaller than the dimension of the stage 121 shown in FIG. 1. The holding member 141 is disposed to surround the optical axis A1 of the objective lens 131a shown in FIG. 1.

A plurality of through holes 141a piercing through the holding member 141 from the upper surface to the lower surface are formed in the holding member 141. The plurality of through holes 141a are disposed at substantially equal intervals and located rotation-symmetrically around the optical axis A1 of the objective lens 131a. The plurality of optical fibers 142 are respectively inserted through the plurality of through holes 141a. Consequently, the plurality of optical fibers 142 are integrally held by the holding member 141. Incident sections and emission sections of lights in the optical fibers 142 are respectively located on the upper surface and the lower surface of the holding member 141. Consequently, a light emitting section 140o is formed on the lower surface of the holding member 141.

The plurality of optical fibers 142 are disposed on one circumference centering on the optical axis A1 of the objective lens 131a. Therefore, the distances from the optical axis A1 of the objective lens 131a to the emitting sections in the plurality of optical fibers 142 are substantially equal. An angle formed by lines, which connect the emitting sections in the optical fibers 142 and the center of the stage 121, with respect to the optical axis A1 of the objective lens 131a is an acute angle. In this embodiment, the holding member 141 integrally holds the plurality of optical fibers 142, whereby a positional relation among the plurality of optical fibers 142 is easily maintained.

As shown in FIG. 3B, the annular light emitting section 140o of the light projecting section 140 is substantially equally divided into a plurality of (in this example four) regions 140A, 140B, 140C, and 140D. The plurality of regions 140A to 140D are disposed rotation-symmetrically around the optical axis A1 of the objective lens 131a. The plurality of regions 140A to 140D include emitting sections of the optical fibers 142 generally as many as the plurality of regions 140A to 140D.

The incident sections of the plurality of optical fibers 142 are optically connected to the light generating section 300 of the processing device 200 by the fiber unit 201 shown in FIG. 1. Consequently, light emitted from the light generating section 300 is made incident on the incident sections of the plurality of optical fibers 142 from the upper surface of the holding member 141 and emitted from the light emitting section 140o on the lower surface of the holding member 141 through the emitting sections of the plurality of optical fibers 142. That is, the optical fibers 142 included in the regions 140A to 140D emit lights from the light emitting section 140o, whereby the lights are emitted from the regions 140A to 140D.

The light blocking section 320 shown in FIG. 1 include a mask including a plurality of opening patterns respectively corresponding to the regions 140A to 140D of the light projecting section 140. Light emitted by the light source 310 shown in FIG. 1 passes through any one of the opening patterns of the light blocking section 320 and is made incident on the fiber unit 201. The light-projection control section 510 shown in FIG. 2 switches the opening pattern of the light blocking section 320 for allowing the light to pass to thereby switch the regions 140A to 140D from which lights are emitted in the light projecting section 140. Consequently, the light projecting section 140 is capable of emitting lights from the entire regions 140A to 140D and capable of selectively emitting light from any one of the regions 140A to 140D.

In this way, the light projecting section 140 can irradiate the lights having the emitting directions different from one another on the observation target S. Lights simultaneously emitted from the entire regions 140A to 140D are referred to as ring illumination. Light emitted from any one region of the regions 140A to 140D is referred to as directional illumination. In this embodiment, the light projecting section 140 is capable of selectively emitting the ring illumination and any one of four directional illuminations. Therefore, the imaging section 132 shown in FIG. 1 is capable of generating five original image data indicating the observation target S at the time when the ring illumination and the four directional illuminations are respectively irradiated on the observation target S.

The arithmetic processing section 600 can generate, on the basis of the five original image data, saturation reduced image data indicating an image of the observation target S with a reduced halation component and cause the display section 430 to display the image of the observation target S based on the generated saturation reduced image data (halation reduction processing).

The four directional illuminations are lights respectively emitted from four positions (the regions 140A to 140D) different from one another by approximately 90° in the θ direction around the optical axis A1 of the objective lens 131a. The four directional illuminations are rotation-symmetrical around the optical axis A1 of the objective lens 131a. Therefore, the directional illuminations have deviation from the optical axis A1 of the objective lens 131a. The four directional illuminations are emitted in directions inclined with respect to the optical axis A1 of the objective lens 131a and different from one another. Light amounts of the four directional illuminations are substantially equal to one another. Angles of irradiation of the four directional illuminations with respect to the optical axis A1 of the objective lens 131a are not uniform according to the θ direction.

On the other hand, the ring illumination is light not deviating from the optical axis A1 of the objective lens 131a. The center of the ring illumination substantially coincides with the optical axis A1 of the objective lens 131a. Therefore, the ring illumination is emitted substantially in the direction of the optical axis A1 of the objective lens 131a. The ring illumination has a substantially uniform light amount distribution around the optical axis A1 of the objective lens 131a. A light amount of the ring illumination is substantially equal to a sum of light amounts of the four directional illuminations. That is, the light amount of the ring illumination is approximately four times as large as the light amount of each of the directional illuminations. An angle of irradiation of the ring illumination with respect to the optical axis A1 of the objective lens 131a is uniform according to the θ direction.

As explained above, in this embodiment, the plurality of regions 140A to 140D are disposed rotation-symmetrically around the optical axis A1 of the objective lens 131a. Consequently, when image data for display is generated by an arithmetic operation on the basis of the plurality of original image data, it is possible to simplify the arithmetic operation.

In this embodiment, the optical fibers 142 are provided as the light emitting members in the regions 140A to 140D of the light projecting section 140. However, the present invention is not limited to this. Light sources such as LEDs may be provided as the light emitting members in the regions 140A to 140D of the light projecting section 140. In this case, the light generating section 300 is not provided in the processing device 200. In this configuration, one or a plurality of light sources provided in each of the regions 140A to 140D emit lights, whereby the lights are emitted from the regions 140A to 140D.

Figure 4A:
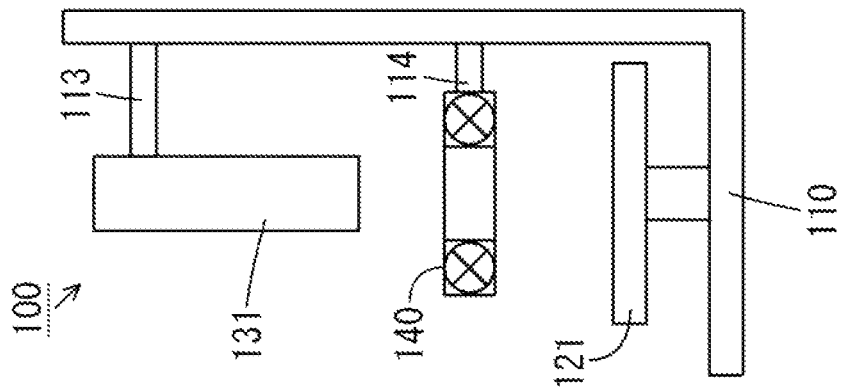
FIGS. 4A to 4C are schematic diagrams showing disposition examples of the light projecting section.
Figure 4B:
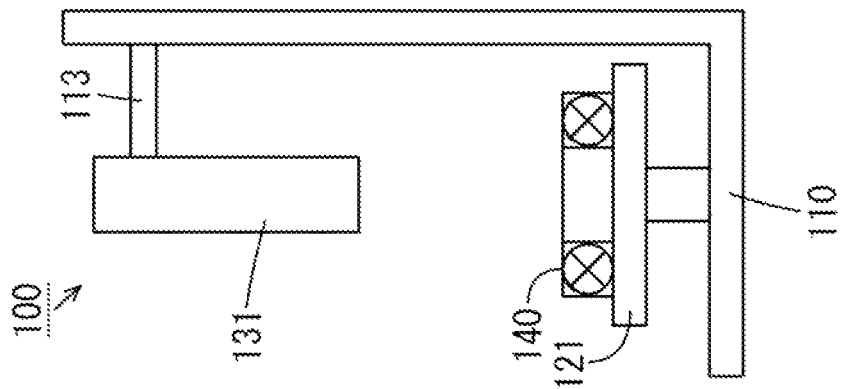
Figure 4C:
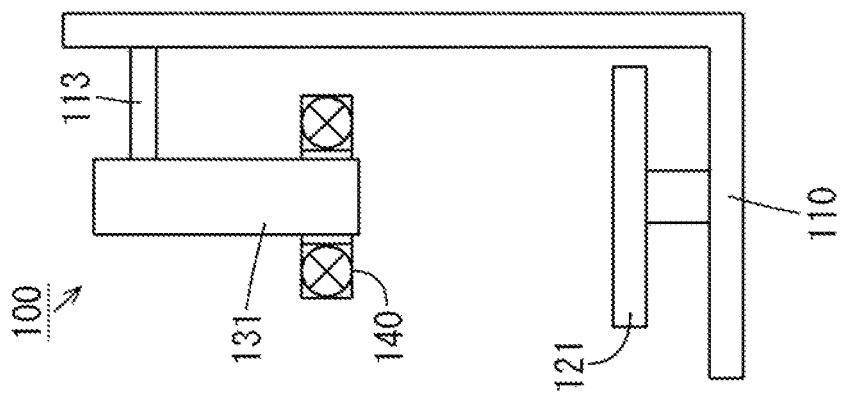

FIGS. 4A to 4C are schematic diagrams showing disposition examples of the light projecting section 140. In this embodiment, as shown in FIG. 4A, the light projecting section 140 is attached to the lens unit 131. The present invention is not limited to this. As shown in FIG. 4B, the light projecting section 140 may be disposed on the stage 121. Alternatively, as shown in FIG. 4C, the light projecting section 140 may be disposed between the stage 121 and the lens unit 131 and held in the stand section 110 by a holding section 114.

Further, in this embodiment, the four regions 140A to 140D from which lights are emitted are provided in the light projecting section 140. However, the present invention is not limited to this. Three or less or five or more regions from which lights are emitted may be provided in the light projecting section 140.

In this embodiment, the plurality of light emitting members (the optical fibers 142) are disposed on one circumference centering on the optical axis A1 of the objective lens 131a. However, the present invention is not limited to this. The plurality of light emitting members may be disposed on two or more concentric circles centering on the optical axis A1 of the objective lens 131a. Further, in this embodiment, the plurality of light emitting members are disposed in each of the regions 140A to 140D. However, the present invention is not limited to this. One light emitting member may be disposed in each of the regions 140A to 140D.

In the embodiment, the light projecting section 140 is configured as a unit such that a positional relation among the plurality of light emission regions does not change. However, the present invention is not limited to this. The light projecting section 140 may be configured to be capable of changing the positional relation among the plurality of light emission regions.

(d) Lens Barrel Section

Figure 5A:
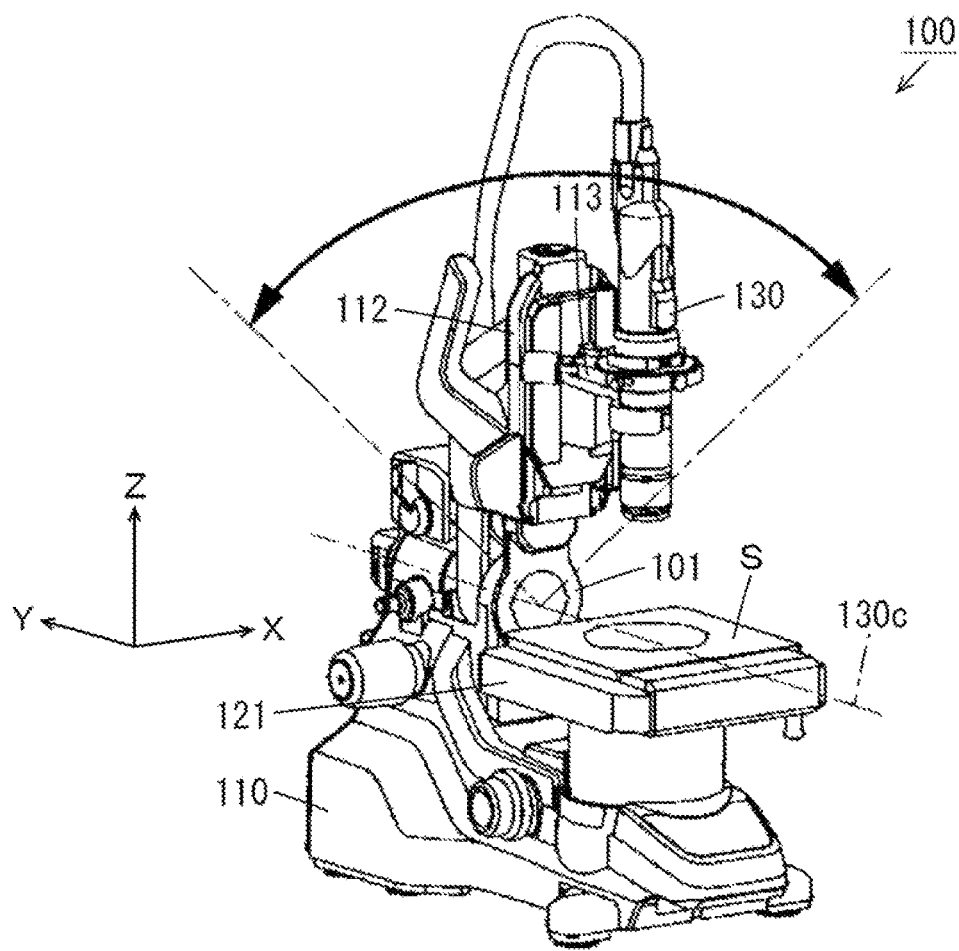
FIGS. 5A and 5B are an exterior perspective view of a measurement head and a schematic diagram showing the configuration of a lens barrel section.
Figure 5B:
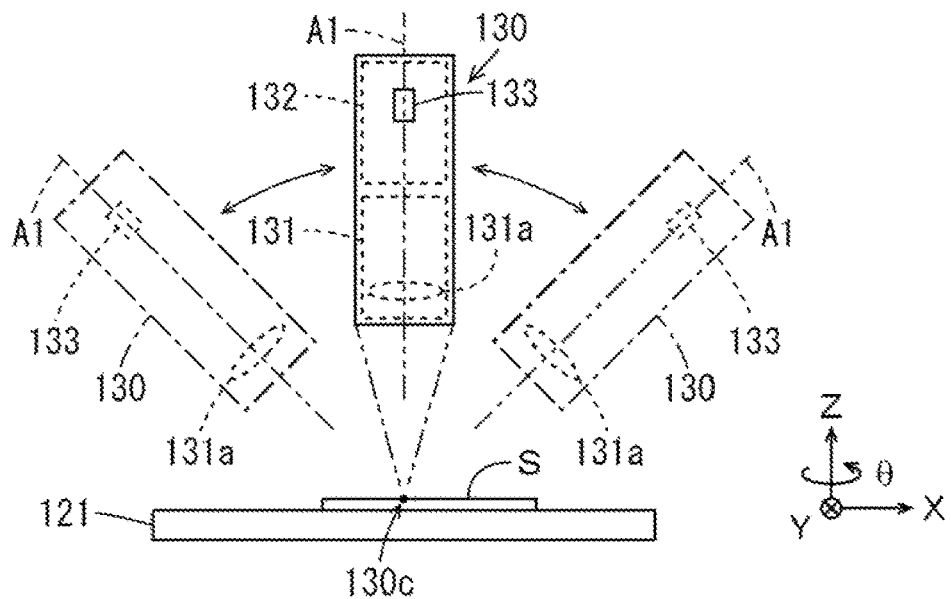

FIGS. 5A and 5B are respectively an exterior perspective views of the measurement head 100 and a schematic diagram showing the configuration of the lens barrel section 130. As shown in FIG. 5A, the measurement head 100 includes an inclining mechanism 101 for inclining the lens barrel section 130 with respect to the stage 121. The inclining mechanism 101 supports an upper part of the holding section 112 with respect to a lower part of the holding section 112 in a plane orthogonal to the Y direction. Consequently, the inclining mechanism 101 can incline the lens barrel section 130 with respect to the stage 121 around an inclination center 130c. In FIG. 5B, the lens barrel section 130 after the inclination is indicated by an alternate long and short dash line.

The stage 121 moves in the Z direction on the basis of control by the stage control section 540 shown in FIG. 2 such that the surface of the observation target S is located at height substantially the same as the height of the inclination center 130c of the lens barrel section 130. Therefore, even if the lens barrel section 130 is inclined, a eucentric relation in which a visual field of the imaging section 132 does not move is maintained. It is possible to prevent a desired observation region of the observation target S from deviating from the visual field of the imaging section 132.

As shown in FIG. 5B, the lens barrel section 130 includes the lens unit 131, the imaging section 132, and an inclination sensor 133. The imaging section 132 receives, via the lens unit 131, light from the observation target S placed on the placement surface of the stage 121 and generates original image data on the basis of control by the imaging control section 520 shown in FIG. 2.

The imaging control section 520 controls a light reception time, a gain, timing, and the like of the imaging section 132. For example, the imaging control section 520 adjusts a light reception time during irradiation of the directional illuminations on the basis of a light reception time during irradiation of the ring illumination. In this example, as explained above, the light amount of the ring illumination is approximately four times as large as the light amount of each of the directional illuminations. Therefore, the imaging control section 520 adjusts the light reception time during the irradiation of the directional illuminations to be four times as long as a light reception time during the irradiation of the ring illumination.

With this control, the imaging section 132 can generate original image data at high speed compared with when the light reception times during the irradiation of the directional illuminations are independently adjusted. The imaging section 132 can easily substantially equalize brightness of an image during the irradiation of the ring illumination and brightness of an image during the irradiation of the directional illuminations. Note that, in this example, control contents of the imaging section 132 during the irradiation of the plurality of directional illuminations are the same one another.

The imaging section 132 can generate a plurality of original image data in a state in which a light reception time is changed to a plurality of times by the imaging control section 520. The arithmetic processing section 600 shown in FIG. 2 can generate image data with an adjusted dynamic range by selectively combining the plurality of original image data generated in the state in which the light reception time of the imaging section 132 is changed to the plurality of times (DR (dynamic range) adjustment processing).

An inclination angle of the optical axis A1 of the objective lens 131a with respect to the Z direction (hereinafter referred to as inclination angle of the lens barrel section 130) is detected by the inclination sensor 133. An angle signal corresponding to the inclination angle is output to the control board 150 shown in FIG. 1. The control board 150 gives the angle signal output by the inclination sensor 133 to the arithmetic processing section 600 via the cable 203 and the imaging control section 520 shown in FIG. 2. The arithmetic processing section 600 calculates an inclination angle of the lens barrel section 130 on the basis of the angle signal. It is possible to cause the display section 430 shown in FIG. 1 to display the inclination angle calculated by the arithmetic processing section 600.

With the configuration explained above, it is possible to selectively perform a plane observation and an inclined observation of the observation target S placed on the placement surface of the stage 121. During the plane observation, the optical axis A1 of the objective lens 131a is parallel to the Z axis. That is, the inclination angle of the lens barrel section 130 is 0°. On the other hand, during the inclined observation, the optical axis A1 of the objective lens 131a inclines with respect to the Z direction. The user can perform observation of the observation target S in a state in which the lens barrel section 130 is detached from the stand section 110 shown in FIG. 1 and fixed by a hand or another fixing member. In the following explanation, the plane observation of the observation target S is performed.

(e) Focus Driving Section

The focus control section 530 shown in FIG. 2 controls the focus driving section 113 shown in FIG. 1 such that a focal position of light from the observation target S passed through the lens unit 131 changes in the Z direction relatively to the observation target S. Consequently, the imaging section 132 shown in FIG. 1 can generate a plurality of original image data indicating the observation target S in different positions in the Z direction.

In this processing, the user can designate a range in which the focus driving section 113 moves in the Z direction. When the moving range is designated, the focus control section 530 controls the focus driving section 113 such that a focal position of light changes in the Z direction in the designated moving range. Consequently, the imaging section 132 can generate, in a short time, the plurality of original image data indicating the observation target S in the different positions in the Z direction.

The arithmetic processing section 600 can determine a focus degree of each of pixels concerning each of the generated plurality of original image data indicating the observation target S in the different positions in the Z direction. The focus control section 530 can adjust the focus driving section 113 on the basis of a determination result of the focus degree by the arithmetic processing section 600 such that the imaging section 132 is focused on a specific portion of the observation target S (autofocus processing). Further, the arithmetic processing section 600 can generate image data focused on all portions of the observation target S by selectively combining the plurality of original image data for each of the pixels on the basis of the determination result of the focus degree (depth synthesis processing).

Figure 6:
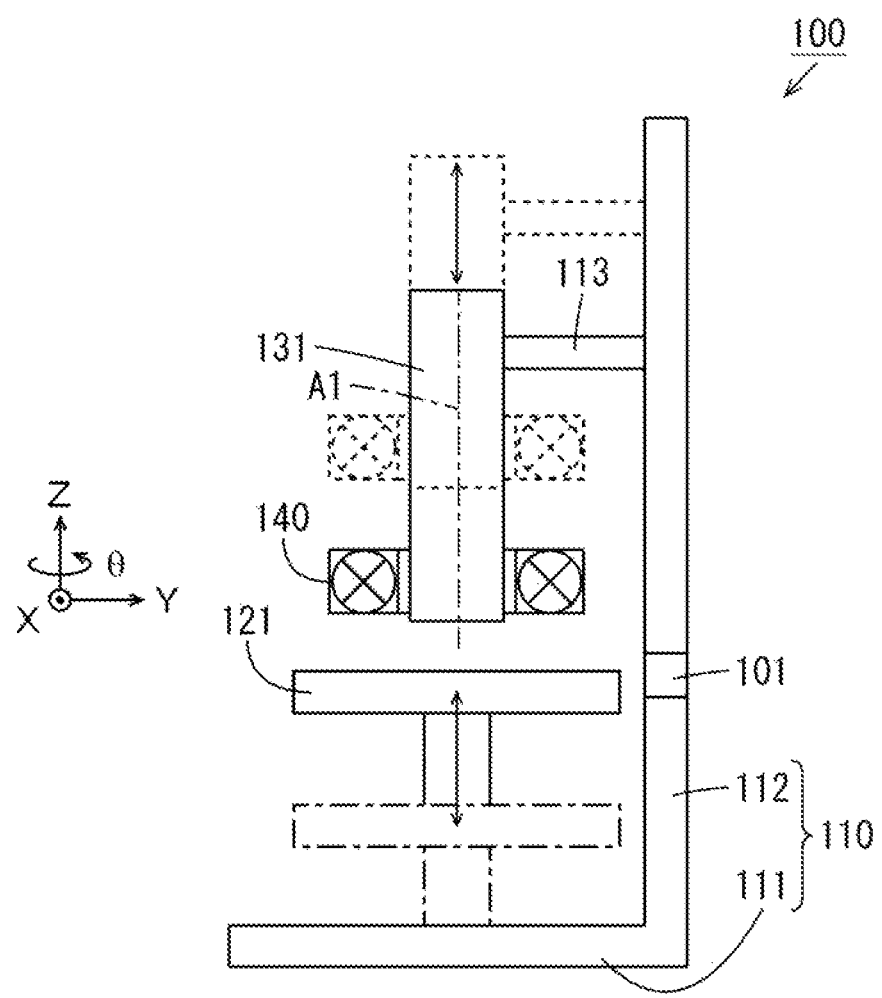
FIG. 6 is a schematic diagram showing a configuration example of a focus driving section.

FIG. 6 is a diagram showing a configuration example of the focus driving section 113. In this embodiment, the light projecting section 140 is attached to the lens unit 131. As indicated by a dotted line in FIG. 6, the lens unit 131 is moved in the Z direction integrally with the light projecting section 140 by the focus driving section 113. As indicated by an alternate long and short dash line in FIG. 6, the stage 121 is moved in the Z direction by the stage driving section 122 shown in FIG. 1. In this way, the lens unit 131 and the light projecting section 140 and the stage 121 are capable of relatively moving in the Z direction.

When a positional relation in the Z direction among the observation target S, the lens unit 131, and the light projecting section 140 changes, an angle of elevation of a light source that irradiates illumination on the observation target S (see FIG. 10 referred to below) changes.

In the example shown in FIG. 6, the light projecting section 140 is integrally provided in the lens barrel section 130. However, the present invention is not limited to this. The light projecting section 140 may be detachably attached to the lens barrel section 130 as a unit. In this case, a positioning mechanism for maintaining an angle relation between the light projecting section 140 and the lens unit 131 in the θ direction constant is desirably provided in the lens unit 131 or the light projecting section 140.

(f) Stage Device

Figure 7A:
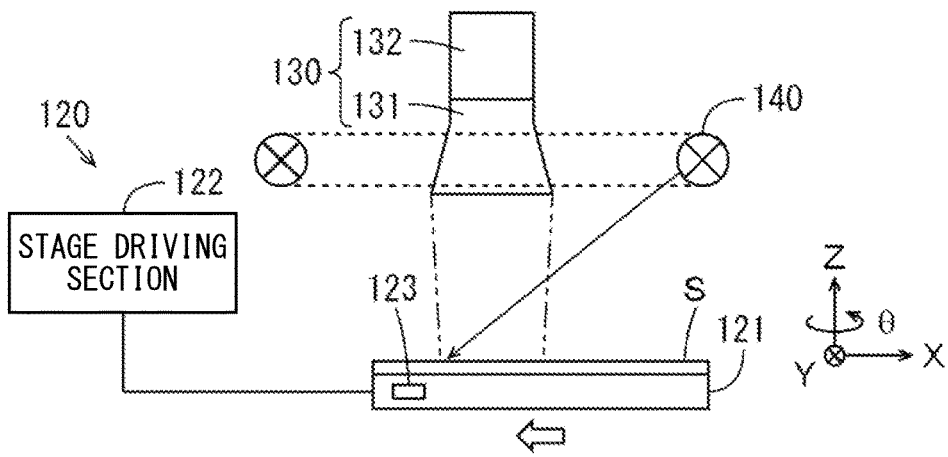
FIGS. 7A to 7C are schematic diagrams showing the configuration of a stage device.
Figure 7B:
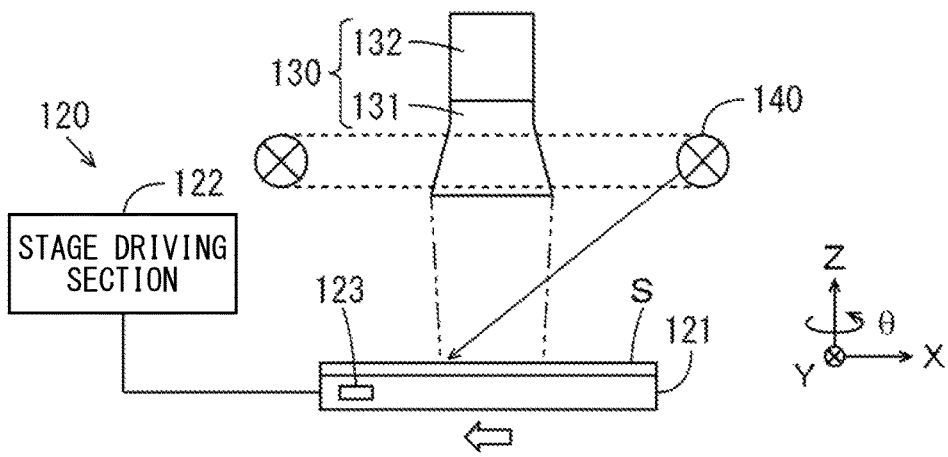
Figure 7C:
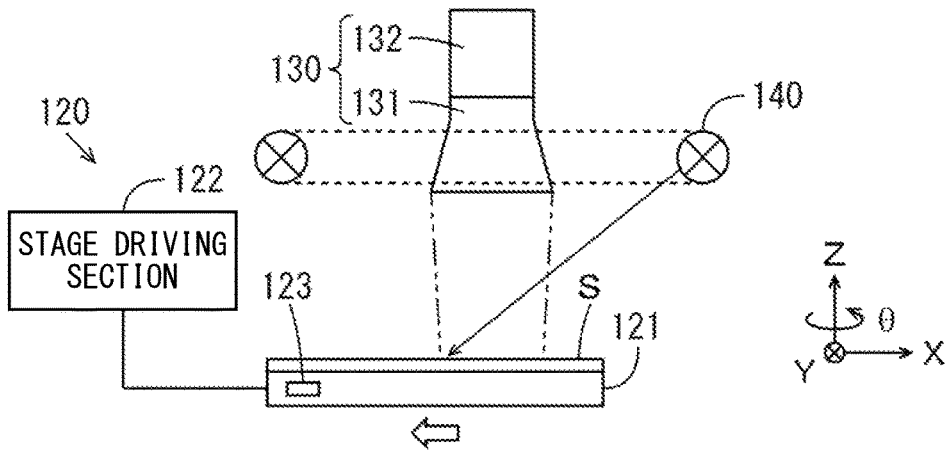

FIGS. 7A to 7C are diagrams showing the configuration of the stage device 120. As shown in FIGS. 7A to 7C, the stage device 120 includes the stage 121, the stage driving section 122, and a position sensor 123. The stage control section 540 shown in FIG. 2 controls the stage driving section 122 to move the stage 121 in the X direction, the Y direction, or the Z direction or rotate the stage 121 in the θ direction. In the example shown in FIGS. 7A to 7C, as indicated by a void arrow, the stage 121 is moved in the X direction. In the following explanation, positions in the X direction, the Y direction, and the Z direction and an angle in the θ direction of the stage 121 are simply referred to as positions of the stage 121.

The position sensor 123 includes, for example, a linear encoder or a rotary encoder and is attached to the stage 121. The position of the stage 121 is detected by the position sensor 123. A position signal indicating the position is output to the control board 150 shown in FIG. 1. The control board 150 gives the position signal output by the position sensor 123 to the arithmetic processing section 600 via the cable 203 and the stage control section 540 shown in FIG. 2. The arithmetic processing section 600 calculates a position of the stage 121 on the basis of the position signal. It is possible to cause the display section 430 shown in FIG. 1 to display the position calculated by the arithmetic processing section 600.

As explained above, the position sensor 123 is attached to the stage 121. However, the present invention is not limited to this. The position sensor 123 does not have to be attached to the stage 121. In this case, a scale indicating the position of the stage 121 may be added to the stage 121. When the arithmetic processing section 600 calculates the position of the stage 121 on the basis of the number of drive pulses from the control board 150 to the stage driving section 122 shown in FIG. 1, it is unnecessary to attach the position sensor 123 to the stage 121.

The arithmetic processing section 600 can generate image data indicating a region of the observation target S larger than a visual field (a unit region explained below) of the imaging section 132 by connecting a plurality of image data generated while the stage 121 is moved in the X direction or the Y direction (connection processing). The arithmetic processing section 600 can generate, by performing the connection processing of the plurality of image data, image data at the time when light is more uniformly irradiated on the observation target S.

Figure 8A:
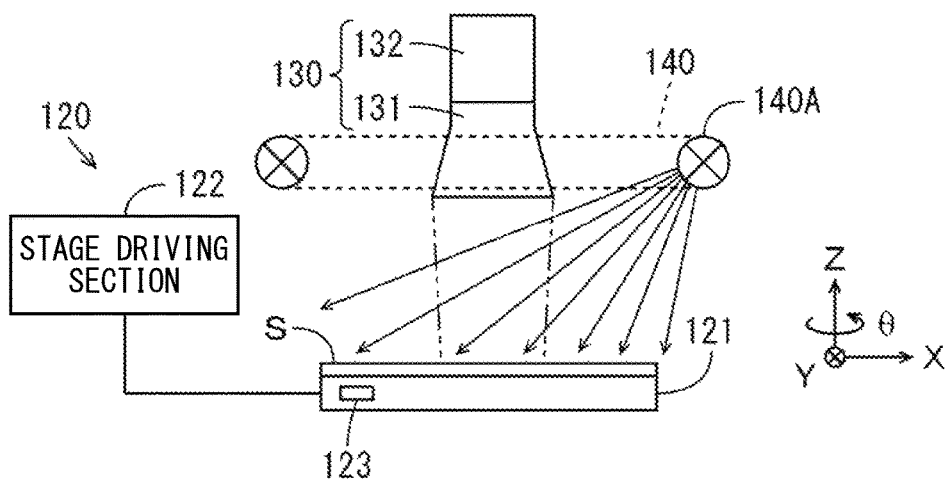
FIGS. 8A and 8B are diagrams for explaining the position of an imaginary light projecting section during connection of image data.
Figure 8B:
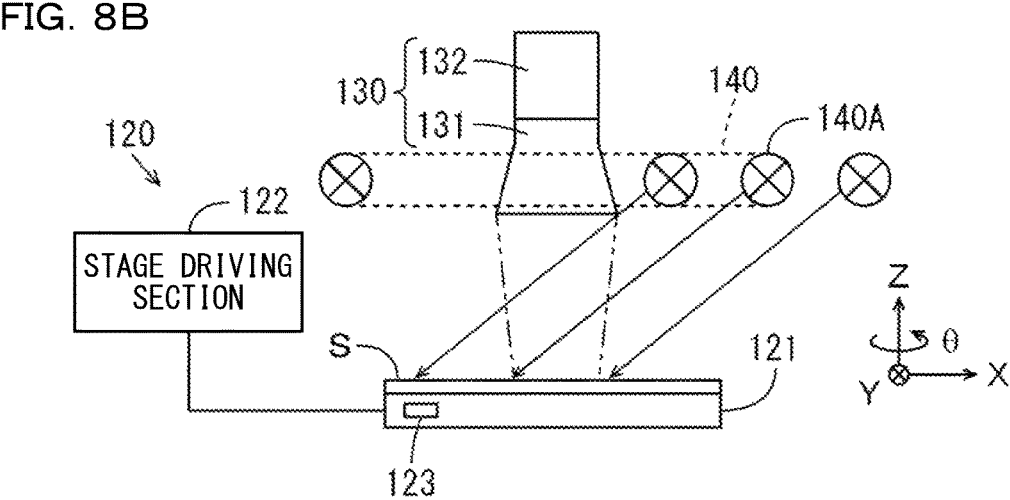

FIGS. 8A and 8B are diagrams for explaining the position of an imaginary light projecting section 140 during connection of image data. FIG. 8A shows an example in which the connection of the image data is not performed. FIG. 8B shows an example in which the connection of the image data is performed. In the examples shown in FIGS. 8A and 8B, light is irradiated on the observation target S from a part of a region (e.g., the region 140A shown in FIG. 3B) of the light projecting section 140.

A magnification of the lens unit 131 shown in FIG. 8A is lower than a magnification of the lens unit 131 shown in FIG. 8B. In this case, since a visual field of the imaging section 132 is large, the imaging section 132 can generate original image data indicating the entire observation target S. However, a difference between light amounts of irradiated lights is large in a portion of the observation target S close to the region 140A and a portion of the observation target S far from the region 140A. Therefore, it is difficult to generate image data at the time when light is uniformly irradiated on the observation target S.

On the other hand, in the example shown in FIG. 8B, although the visual field of the imaging section 132 is small, a plurality of original image data are generated while the stage 121 is moved. Therefore, it is possible to generate image data indicating the entire observation target S by connecting the plurality of original image data. In the example shown in FIG. 8B, a positional relation between portions of the observation target S and the region 140A during the generation of the original image data is substantially fixed. That is, it is possible to consider that parallel lights are irradiated on the entire observation target S from the region 140A imaginarily present at infinity. Consequently, it is possible to generate image data at the time when light is uniformly irradiated on the observation target S.

(g) Arithmetic Processing Section

Figure 9:
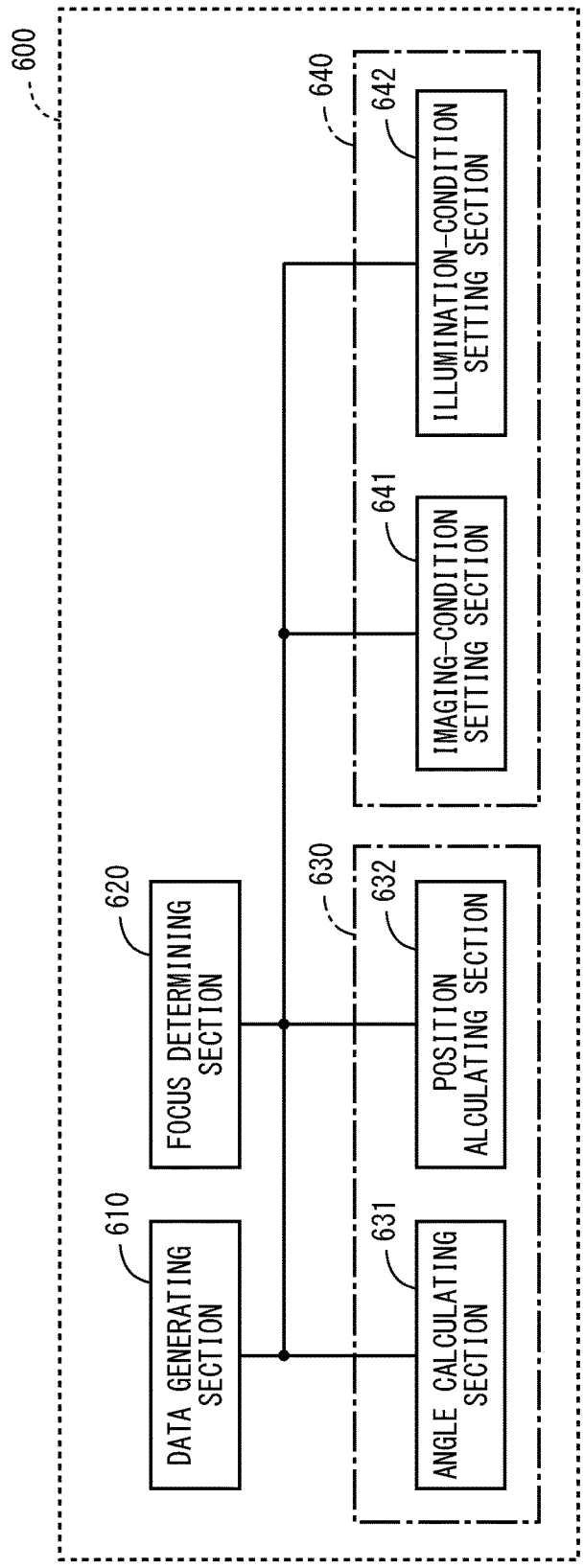
FIG. 9 is a block diagram showing the configuration of an arithmetic processing section shown in FIG. 2.

FIG. 9 is a block diagram showing the configuration of the arithmetic processing section 600 shown in FIG. 2. As shown in FIG. 9, the arithmetic processing section 600 includes a data generating section 610, a focus determining section 620, a calculating section 630, and a condition setting section 640.

The data generating section 610 generates image data for display on the basis of at least one of a plurality of original image data generated by the imaging section 132 shown in FIG. 1. The data generating section 610 performs DR adjustment processing, depth synthesis processing, connection processing, or halation reduction processing on image data according to an instruction of the user.

When the focus control section 530 shown in FIG. 2 performs the autofocus processing, the focus determining section 620 determines a focus degree of each of pixels concerning each of a plurality of original image data generated according to movement in the Z direction of the focus driving section 113. When the data generating section 610 performs the depth synthesis processing, the focus determining section 620 determines a focus degree of each of pixels concerning the plurality of original image data.

The calculating section 630 includes an angle calculating section 631 and a position calculating section 632. The angle calculating section 631 calculates an inclination angle of the lens barrel section 130 shown in FIG. 5B on the basis of an angle signal output by the inclination sensor 133 shown in FIG. 5B. The angle calculating section 631 causes, according to an instruction of the user, the display section 430 shown in FIG. 2 to display the calculated inclination angle of the lens barrel section 130.

The position calculating section 632 calculates a position of the stage 121 shown in FIGS. 7A to 7C on the basis of a position signal output from the position sensor 123 shown in FIGS. 7A to 7C. The position calculating section 632 may calculate the position of the stage 121 on the basis of the number of drive pulses from the control board 150 to the stage driving section 122 shown in FIG. 1. The position calculating section 632 causes, according to an instruction of the user, the display section 430 shown in FIG. 2 to display the calculated position of the stage 121. Further, the position calculating section 632 causes the storing section 420 shown in FIG. 2 to store position information indicating the position of the stage 121 at the time when original image data is generated by the imaging section 132 shown in FIG. 1.

The condition setting section 640 includes an imaging-condition setting section 641 and an illumination-condition setting section 642. The imaging-condition setting section 641 sets imaging conditions according to an instruction of the user. The condition setting section 640 causes the storing section 420 shown in FIG. 1 to store imaging information indicating the set imaging conditions. The imaging conditions include, for example, a light reception time of the imaging section 132 shown in FIG. 1, presence or absence of execution of the DR adjustment processing, presence or absence of execution of the depth synthesis processing, presence or absence of execution of the connection processing, and a range of a focal position of light in the Z direction. The driving control section 500 shown in FIG. 2 controls the operations of the measurement head 100 and the light generating section 300 shown in FIG. 1 on the basis of the imaging conditions set by the imaging-condition setting section 641.

The illumination-condition setting section 642 sets illumination conditions according to an instruction of the user. The illumination-condition setting section 642 causes the storing section 420 to store illumination information corresponding to the set illumination conditions. The illumination conditions include an imaginary emitting direction of light with respect to the observation target S. The data generating section 610 generates image data for display on the basis of the illumination conditions set by the illumination-condition setting section 642 and causes the storing section 420 to store the image data for display. An instruction method for illumination conditions by the user is explained below.

(2) Basic Operation of the Magnifying Observation Apparatus (a) Content of the Basic Operation A position where the optical axis A1 of the objective lens 131*a* crosses on the placement surface of the stage 121 is referred to as reference point. The observation target S is placed on the stage 121 such that an observation target portion is located on the reference point. In this state, the position in the Z direction of the lens unit 131 (FIG. 1) is adjusted such that the objective lens 131*a* is focused on at least a part of the observation target S. The stage 121 is adjusted in the X direction and the Y direction such that a desired portion of the observation target S can be observed. Further, imaging conditions such as a light reception time and a white balance of the imaging section 132 are adjusted.

In the following explanation, in order to distinguish the four directional illuminations, lights emitted from the respective regions 140A, 140B, 140C, and 140D of the light projecting section 140 are respectively referred to as first directional illumination, second directional illumination, third directional illumination, and fourth directional illumination. In the following explanation, a traveling direction of a ray obtained when a plurality of rays forming the ring illumination are combined in terms of a vector is referred to as ring emitting direction. The ring emitting direction is a direction perpendicular to the placement surface of the stage 121. A traveling direction of a ray obtained when a plurality of rays forming the first directional illumination are combined in terms of a vector is referred to as first emitting direction. A ray obtained when a plurality of rays forming the second directional illumination are combined in terms of a vector is referred to as second emitting direction. Further, a traveling direction of a ray obtained when a plurality of rays forming the third directional illumination are combined in terms of a vector is referred to as third emitting direction. A traveling direction of a ray obtained when a plurality of rays forming the fourth directional illumination are combined in terms of a vector is referred to as fourth emitting direction.

Figure 10:
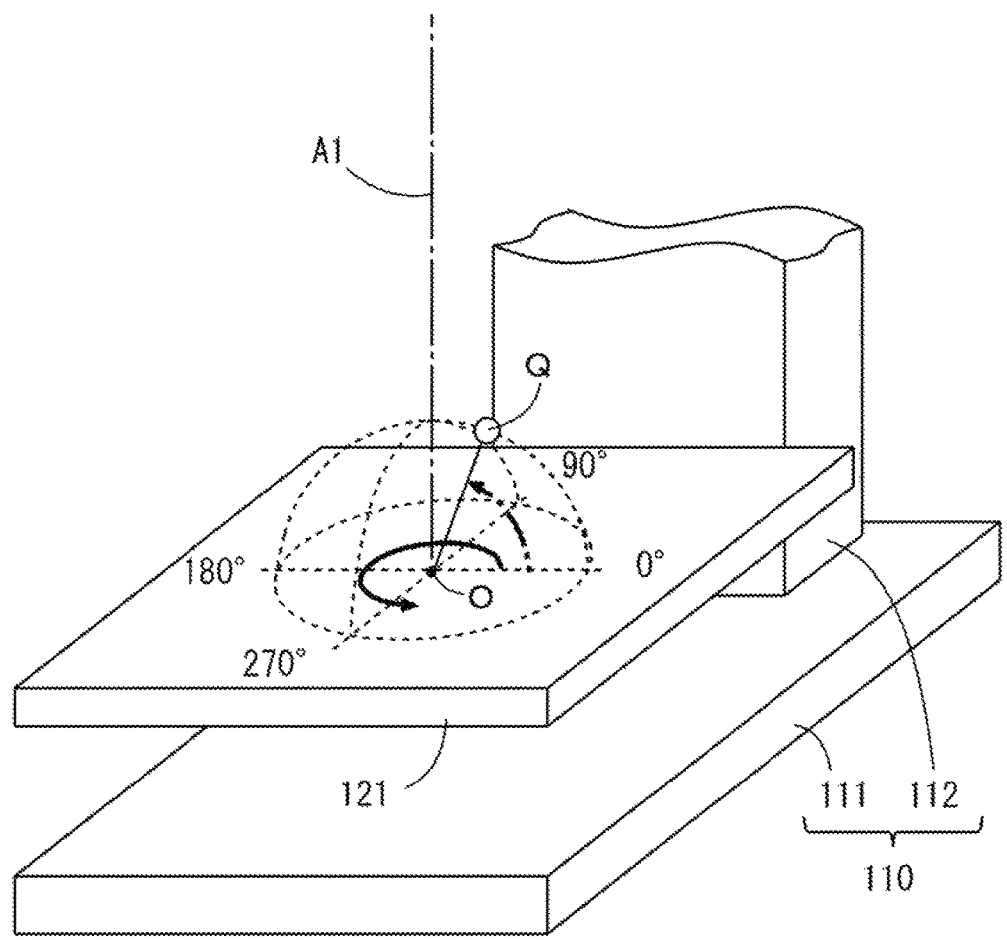
FIG. 10 is a diagram showing a polar coordinate system defined on a placement surface of a stage.

A polar coordinate system having the reference point as the origin is defined on the placement surface of the stage 121 such that it is possible to specify an emitting direction or an emitting position of light at the time when the light is irradiated on the observation target S placed on the reference point. FIG. 10 is a diagram showing the polar coordinate system defined on the placement surface of the stage 121. As shown in FIG. 10, the reference point on the placement surface of the stage 121 is defined as an origin O. As indicated by a thick solid line in FIG. 10, an azimuth angle is defined in a direction counterclockwise around the origin O in a state in which the placement surface of the stage 121 is viewed from above. In this example, a direction from the origin O to one side of the magnifying observation apparatus 1 is defined as a reference angle (0°) of the azimuth angle.

A point Q is assumed in any position on the placement surface or above the placement surface. In this case, as indicated by a thick alternate long and short dash line in FIG. 10, an angle between a straight line connecting the point Q and the origin O and the placement surface is defined as an angle of elevation of the point Q. When the point Q is present on the placement surface, the angle of elevation of the point Q is 0°. When the point Q is present above the placement surface and on the optical axis A1, the angle of elevation of the point Q is 90°. In FIG. 10, the azimuth angle on the placement surface of the stage 121 is shown at every 90°. In the following explanation, when any position above the placement surface of the stage 121, a direction of light irradiated on the observation target S, or the like is explained, the "angle of elevation" and the "azimuth angle" defined as explained above are used as appropriate.

In this example, center portions of the regions 140A, 140B, 140C, and 140D of the light projecting section 140 are respectively disposed at azimuth angles of 45°, 135°, 225°, and 315° around the optical axis A1. Note that the disposition of the light projecting section 140 is not limited to the example explained above. For example, the center portions of the regions 140A, 140B, 140C, and 140D may be respectively disposed at azimuth angles of 0°, 90°, 180°, and 270° around the optical axis A1. Sequentially imaging the observation target S using the ring illumination and the first to fourth directional illuminations is referred to as plural illumination imaging.

The components of the magnifying observation apparatus 1 perform the following basic operations in response to instruction for the plural illumination imaging. FIGS. 11A to 11J are schematic diagrams for explaining a basic operation of the magnifying observation apparatus 1 at the time when the plural illumination imaging is instructed. In FIGS. 11A to 11E, changes in illumination irradiated on the observation target S are shown in time series. In FIGS. 11A to 11E, a region of the light projecting section 140 that emits light is indicated by a thick solid line. The ring emitting direction and the first to fourth emitting directions are respectively indicated by thick solid line arrows. In FIGS. 11F to 11J, an image SI of the observation target S at the time when the illuminations shown in FIGS. 11A to 11E are irradiated on the observation target S is shown. In the following explanation, a display portion of the observation target S in an image in which the observation target S is displayed is referred to as target partial image sp.

Figure 11A:
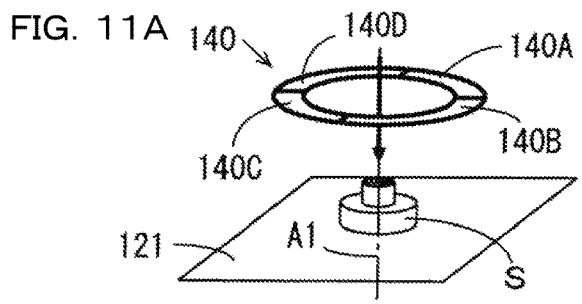
FIGS. 11A to 11J are schematic diagrams for explaining a basic operation of the magnifying observation apparatus at the time when plural illumination imaging is designated.
Figure 11F:
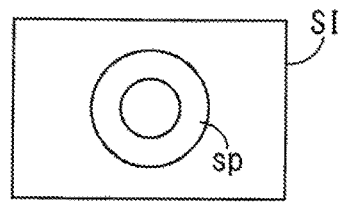

As shown in FIG. 11A, first, the ring illumination is irradiated on the observation target S and the observation target S is imaged. In this case, the first to fourth directional illuminations are simultaneously and uniformly irradiated on portions of the observation target S from all of the regions 140A to 140D surrounding the optical axis A1 of the objective lens 131*a*. Consequently, as shown in FIG. 11F, in the image SI of the observation target S imaged by the ring illumination, shadows due to the shape of the observation target S hardly occur in the target partial image sp. Therefore, it is possible to substantially entirely observe a surface state of a portion facing upward in the observation target S.

Figure 11B:
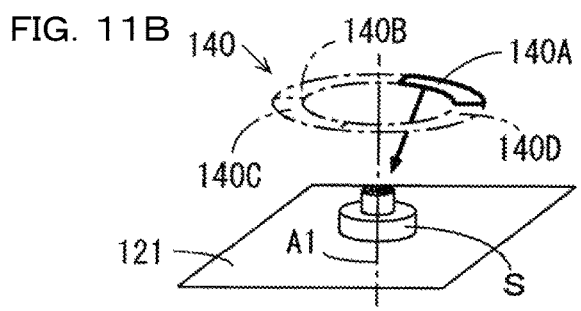

Subsequently, as shown in FIG. 11B, only the first directional illumination is irradiated on the observation target S.

Figure 11G:
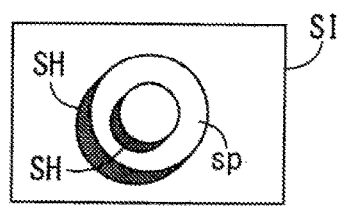

The observation target S is imaged. As shown in FIG. 11G, in the image SI of the observation target S imaged by the first directional illumination, shadows SH in the first emitting direction and in a direction from a position of the azimuth angle of 45° to a position of the azimuth angle of 225° corresponding to the shape of the observation target S occur in a part of the target partial image sp. Consequently, an uneven portion in the observation target S is strongly emphasized in the first emitting direction.

Figure 11C:
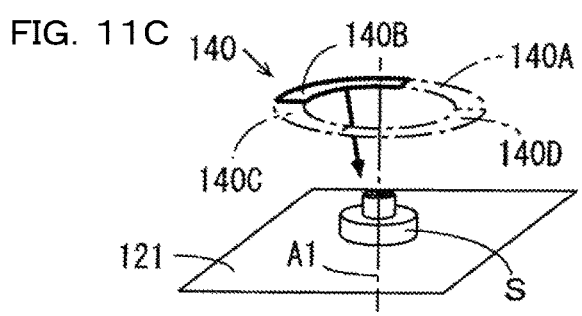
Figure 11H:
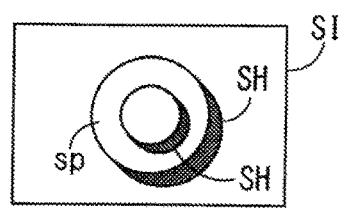

Subsequently, as shown in FIG. 11C, only the second directional illumination is irradiated on the observation target S. The observation target S is imaged. As shown in FIG. 11H, in the image SI of the observation target S imaged by the second directional illumination, the shadows SH in the second emitting direction and in a direction from a position of the azimuth angle of 135° to a position of the azimuth angle of 315° corresponding to the unevenness of the observation target S occur in a part of the target partial image sp. Consequently, the uneven portion in the observation target S is strongly emphasized in the second emitting direction.

Figure 11D:
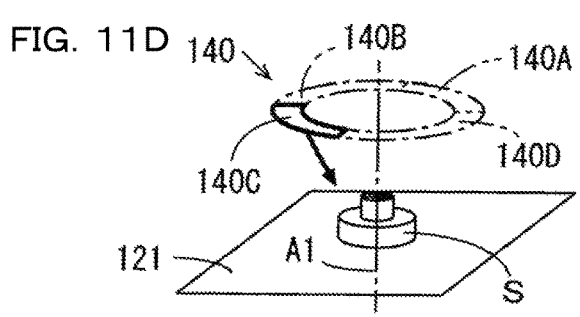
Figure 11I:
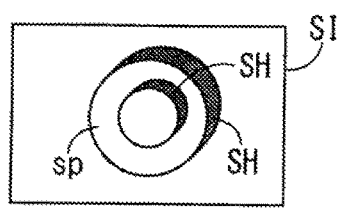

Subsequently, as shown in FIG. 11D, only the third directional illumination is irradiated on the observation target S. The observation target S is imaged. As shown in FIG. 11I, in the image SI of the observation target S imaged by the third directional illumination, the shadows SH in the third emitting direction and in a direction from a position of the azimuth angle of 225° to a position of the azimuth angle of 45° corresponding to the unevenness of the observation target S occur in a part of the target partial image sp. Consequently, the uneven portion in the observation target S is strongly emphasized in the third emitting direction.

Figure 11E:
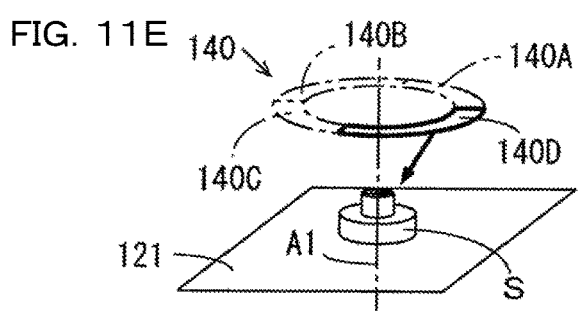
Figure 11J:
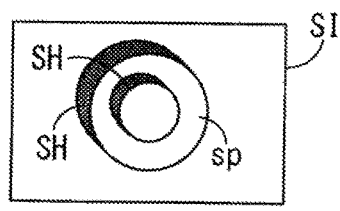

Subsequently, as shown in FIG. 11E, only the fourth directional illumination is irradiated on the observation target S. The observation target S is imaged. As shown in FIG. 11J, in the image SI of the observation target S imaged by the fourth directional illumination, the shadows SH in the fourth emitting direction and in a direction from a position of the azimuth angle of 315° to a position of the azimuth angle of 135° corresponding to the unevenness of the observation target S occur in a part of the target partial image sp. Consequently, the uneven portion in the observation target S is strongly emphasized in the fourth emitting direction.

The series of operation explained above is automatically performed by the control section 410 shown in FIG. 1 executing the system program stored in the storing section 420. However, the series of operation may be manually performed on the basis of operation by the user.

Figure 12:
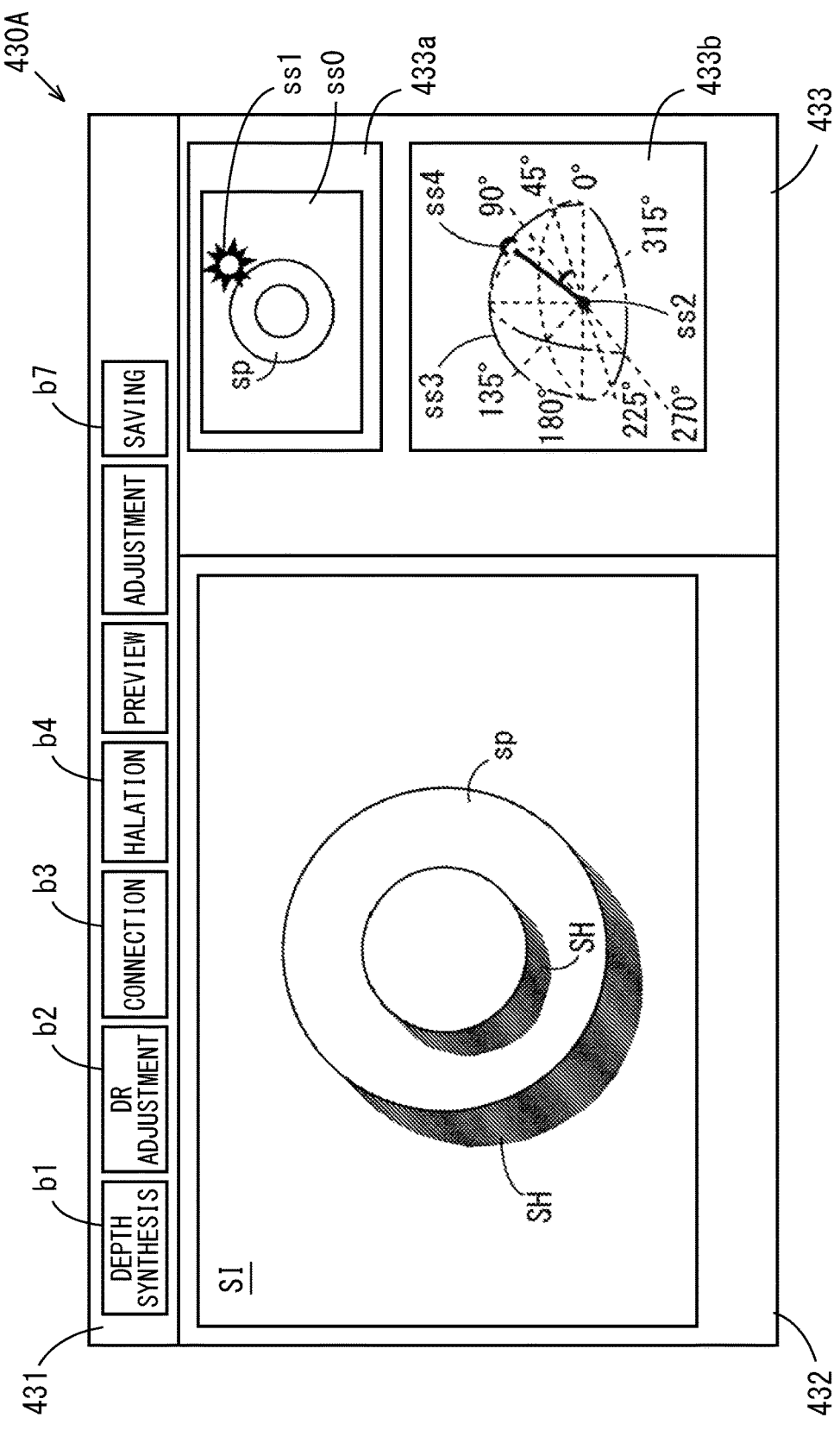
FIG. 12 is a diagram showing a display example of an observation screen.

When the plural illumination imaging is completed, an observation screen is displayed on the display section 430 shown in FIG. 1. FIG. 12 is a diagram showing a display example of the observation screen. As shown in FIG. 12, a function display region 431 is set in an upper part of an observation screen 430A. In the function display region 431, a depth synthesis button b1, a DR adjustment button b2, a connection button b3, a halation button b4, and a saving button b7 are displayed.

The user can operate the buttons displayed in the function display region 431 using the operation section 440 shown in FIG. 1. Contents of processing respectively executed by operating the depth synthesis button b1, the DR adjustment button b2, the connection button b3, the halation button b4, and the saving button b7 are explained below.

As shown in FIG. 12, a main display region 432 and a sub-display region 433 are set to be arranged side by side on the left and the right below the function display region 431. The main display region 432 has a large area compared with the function display region 431 and the sub-display region 433. In an initial state, any one of a plurality of images SI based on a plurality of original image data generated by the immediately preceding plural illumination imaging is displayed over substantially the entire main display region 432. In this example, the image SI (see FIGS. 11B and 11G) of the observation target S at the time when the first directional illumination is irradiated is displayed in the main display region 432.

In the sub-display region 433, an emitting-direction designation field 433a and an emitting-direction display field 433b are displayed. In the emitting-direction designation field 433a, a target position image ss0 indicating the position of the observation target S on the placement surface is displayed. A light icon ss1 indicating an emitting position of light with respect to the observation target S at the time when the observation target S is viewed from a position above the light projecting section 140 is superimposed and displayed on the target position image ss0.

In this case, a relative positional relation between the target partial image sp of the observation target S on the target position image ss0 and the light icon ss1 corresponds to an emitting direction of light that should be irradiated on the observation target S in order to obtain the image SI displayed in the main display region 432 (hereinafter referred to as an imaginary emitting direction of light).

The user can easily designate the imaginary emitting direction of light while grasping an imaginary emitting position of light by moving, using the operation section 440 shown in FIG. 1, the light icon ss1 shown in FIG. 12 relatively to the target partial image sp of the observation target S on the target position image ss0.

The imaginary emitting direction of light is designated by the user, whereby the image SI of the observation target S displayed in the main display region 432 is updated to the image SI of the observation target S that should be obtained when it is assumed that light in a designated emitting direction is irradiated on the observation target S. The update processing of the image SI is executed by the data generating section 610 shown in FIG. 9.

In the emitting-direction display field 433b, an image indicating the reference point on the placement surface is displayed as a reference point image ss2 and an image of an imaginary hemisphere covering the reference point on the stage 121 is stereoscopically displayed as a hemispherical image ss3. On the hemispherical image ss3, an image indicating an emitting direction of light corresponding to an imaginary emitting direction of light designated by the light icon ss1 is displayed as an emitting position image ss4.

Further, a straight line is displayed to connect the emitting position image ss4 and the reference point image ss2 on the hemispherical image ss3. In this case, a direction from the emitting position image ss4 to the reference point image ss2 on the straight line indicates the emitting direction of light designated by the light icon ss1. The user can easily and accurately recognize the virtual emitting direction of light designated by the light icon ss1 by visually recognizing the reference point image ss2, the hemispherical image ss3, and the emitting position image ss4 displayed in the emitting-direction display field 433b.

The magnifying observation apparatus 1 may be configured to be capable of selecting only a part of the ring illumination and the first to fourth directional illuminations as illumination used for the plural illumination imaging. When the plural illumination imaging is performed using only a part of the ring illumination and the first to fourth directional illuminations, a range of an emitting direction that can be designated by the light icon ss1 is sometimes limited.

In this case, in the hemispherical image ss3, the range of the emitting direction that can be designated by the light icon ss1 in the emitting-direction designation field 433a may be displayed to be distinguishable from a range of an emitting direction that cannot be designated. For example, when the range of the emitting direction that can be designated is limited to a range of a specific azimuth angle, a display form such as a color may be differentiated between a portion corresponding to a range of an azimuth angle that can be designated and a portion corresponding to a range of an azimuth angle that cannot be designated. Consequently, the user can easily recognize the range of the emitting direction that can be designated by the light icon ss1. Alternatively, in the hemispherical image ss3, instead of the example explained above, only the range of the emitting direction that can be designated by the light icon ss1 may be displayed.

In this example, in the emitting-direction display field 433b, the imaginary hemisphere covering the reference point is stereoscopically displayed as the hemispherical image ss3. However, the present invention is not limited to this. In the emitting-direction display field 433b, a plane hemispherical image obtained by viewing, from above, the imaginary hemisphere covering the reference point and a side hemispherical image obtained by viewing the imaginary hemisphere from one side may be displayed. In this case, the reference point image ss2 and the emitting position image ss4 may be displayed on the plane hemispherical image. The reference point image ss2 and the emitting position image ss4 may be displayed on the side hemispherical image.

Figure 13A:
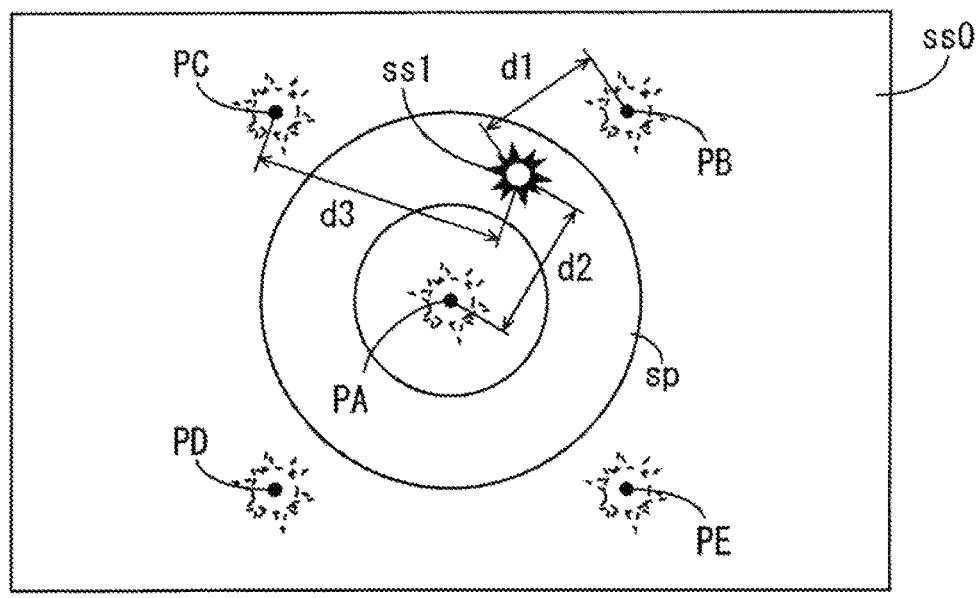
FIGS. 13A to 13C are schematic diagrams for explaining processing content at the time when an image of an observation target is updated in response to designation of an imaginary emitting direction of light.
Figure 13B:
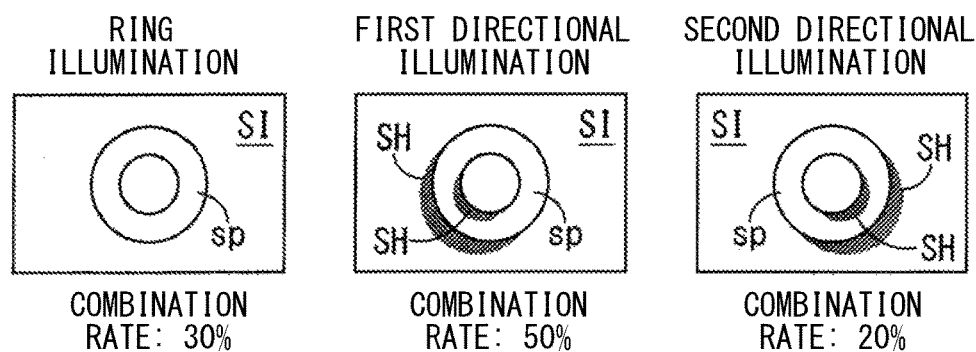
Figure 13C:
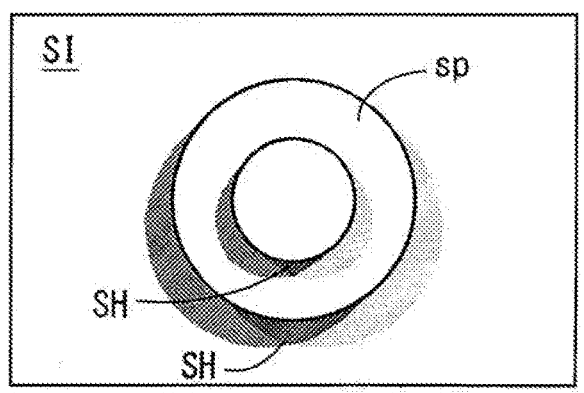

FIGS. 13A to 13C are schematic diagrams for explaining processing content at the time when the image SI of the observation target S is updated in response to the designation of the imaginary emitting direction of light.

In the magnifying observation apparatus 1, a plane coordinate system decided in advance concerning the target position images ss0 displayed in the sub-display region 433 shown in FIG. 12 is defined. Further, as shown in FIG. 13A, on the target position image ss0 shown in FIG. 12, points PA, PB, PC, PD, and PE indicating emitting positions of the ring illumination and lights respectively corresponding to the first, second, third, and fourth emitting directions are set in advance.

Positions of the points PA to PE are set, for example, on the basis of a relative positional relation between the light projecting section 140 and the stage 121. In this example, the point PA is located in the center of the target position image ss0. The points PB, PC, PD, and PE are arranged at equal angle intervals on a concentric circle centering on the point PA.

The control section 410 detects a position (a coordinate) on the target position image ss0 of the light icon ss1 at a cycle decided in advance and causes the display section 430 to display, in the main display region 432 shown in FIG. 12, the image SI of the observation target S corresponding to the position of the light icon ss1.

For example, the control section 410 causes the display section 430 to display, in the main display region 432 shown in FIG. 12, the image SI shown in FIG. 11F corresponding to the ring emitting direction when the light icon ss1 is located on the point PA shown in FIG. 13A. The control section 410 causes the display section 430 to display, in the main display region 432 shown in FIG. 12, the image SI shown in FIG. 11G corresponding to the first emitting direction when the light icon ss1 is located on the point PB shown in FIG. 13A. The control section 410 causes the display section 430 to display, in the main display region 432 shown in FIG. 12, the image SI shown in FIG. 11H corresponding to the second emitting direction when the light icon ss1 is located on the point PC shown in FIG. 13A. Further, the control section 410 causes the display section 430 to display, in the main display region 432 shown in FIG. 12, the image SI shown in FIG. 11I corresponding to the third emitting direction when the light icon ss1 is located on the point PD shown in FIG. 13A. The control section 410 causes the display section 430 to display, in the main display region 432 shown in FIG. 12, the image SI shown in FIG. 11J corresponding to the fourth emitting direction when the light icon ss1 is located on the point PE shown in FIG. 13A.

When the light icon ss1 is present in a position different from the points PA to PE, the control section 410 generates, according to a procedure explained below, the image SI of the observation target S that the control section 410 should cause the main display region 432 to display.

As shown in FIG. 13A, when the light icon ss1 is present in a position different from the points PA to PE, the control section 410 calculates distances between the points PA to PE and the light icon ss1. The control section 410 extracts the number of points decided in advance (in this example, three points) out of the plurality of points PA to PE in an ascending order of the calculated distances. In the example shown in FIG. 13A, a distance d1 between the light icon ss1 and the point PB is the shortest. A distance d2 between the light icon ss1 and the point PA is the second shortest. A distance d3 between the light icon ss1 and the point PC is the third shortest. Therefore, the control section 410 extracts the points PA, PB, and PC.

Subsequently, the control section 410 determines, on the basis of the distances d1, d2, and d3, combination rates of original image data corresponding to the point PA, original image data corresponding to the point PB, and original image data corresponding to the point PC.

The combination rates are, for example, ratios of inverses of values of the distances d1, d2, and d3. In this case, the combination rate is higher in original image data corresponding to a point, the distance to which from the light icon ss1 is shorter, and is lower in original image data corresponding to a point, the distance to which from the light icon ss1 is longer. In the example shown in FIG. 13B, the combination rates of the original image data corresponding to the point PA, the original image data corresponding to the point PB, and the original image data corresponding to the point PC are respectively determined as 30%, 50%, and 20%.

The control section 410 combines the three original image data respectively corresponding to the points PA, PB, and PC on the basis of the determined combination rates. Specifically, the control section 410 multiplies, for each of the original image data, value (pixel values) of all pixel data of the original image data with the combination rate and combines the three original image data after the multiplication to thereby generate image data for display. Thereafter, the control section 410 causes the display section 430 to display, in the main display region 432 shown in FIG. 12, the image SI based on the generated image data for display.

In FIG. 13C, an example of the image SI displayed in the main display region 432 according to the position of the light icon ss1 shown in FIG. 13A is shown. In the image SI shown in FIG. 13C, the three original image data respectively corresponding to the points PA, PB, and PC are combined, whereby the uneven portion in the observation target S is strongly emphasized in the imaginary emitting direction of light designated by the light icon ss1 shown in FIG. 13A.

As explained above, after the completion of the plural illumination imaging, the image data of the image SI displayed in the main display region 432 is generated on the basis of the generated plurality of original image data and the imaginary emitting direction of light designated by the user. Therefore, even if the imaginary emitting direction of light designated by the user continuously changes, a plurality of image data corresponding to the designated emitting direction are substantially continuously generated at speed corresponding to a processing ability of the control section 410. The image SI based on the generated plurality of image data is continuously displayed. Therefore, a video substantially the same as a video (a moving image) obtained by continuously performing imaging while changing the position of illumination is simulatively reproduced on the main display region 432. Consequently, the user visually recognizes the image SI on the main display region 432 while designating the imaginary emitting direction of light to thereby feel as if the light in the designated emitting direction is irradiated on the observation target S on a real time basis.

In the example explained above, the control section 410 extracts the three points among the points PA to PE corresponding to the ring illumination and the first to fourth directional illuminations and determines the combination rates of the three original image data corresponding to the extracted three points. However, the present invention is not limited to this. The control section 410 may determine combination rates concerning five original image data respectively corresponding to all the points PA to PE and combine the five original image data on the basis of the determined combination rates.

Note that, on the observation screen 430A shown in FIG. 12, a combination-rate input field in which combination rates concerning a plurality of original image data obtained by the plural illumination imaging can be input by the operation section 440 shown in FIG. 1 may be displayed. In this case, the control section 410 may combine a part or all of the plurality of original image data on the basis of values input to the combination-rate input field by the user.

Figure 14:
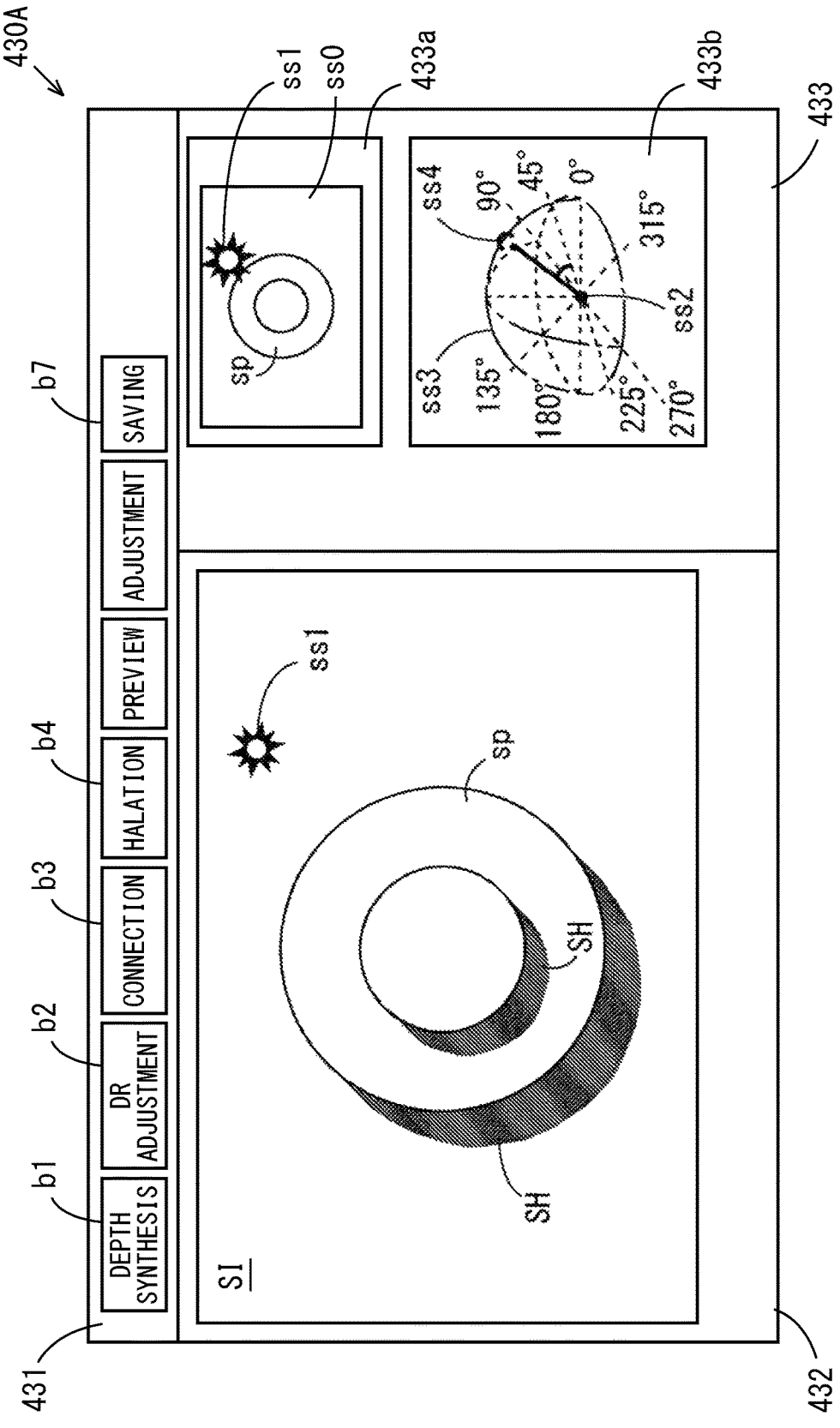
FIG. 14 is a diagram showing an example in which light icons are respectively displayed in a main display region and a sub-display region.

On the observation screen 430A shown in FIG. 12, the light icon ss1 is superimposed and displayed on the target position image ss0 displayed in the sub-display region 433. In this embodiment, in addition to the light icon ss1 on the target position image ss0, the light icon ss1 may also be superimposed and displayed on the image SI displayed in the main display region 432. FIG. 14 is a diagram showing an example in which the light icons ss1 are respectively displayed in the main display region 432 and the sub-display region 433.

In this case, the points PA to PE are set on the image SI of the observation target S as well. The user can move, on the observation screen 430A, one of the light icon ss1 on the image SI of the observation target S and the light icon ss1 on the target position image ss0, for example, using the operation section 440 shown in FIG. 1.

When the light icon ss1 on the target position image ss0 is moved, the control section 410 generates image data for display in a procedure same as the procedure in the example explained with reference to FIGS. 13A to 13C above and displays the image SI based on the generated image data for display in the main display region 432. At this point, the control section 410 adjusts the position of the light icon ss1 on the image SI to move the light icon ss1 to a position corresponding to the position of the light icon ss1 on the target position image ss0.

When the light icon ss1 on the image SI of the observation target S is moved, the control section 410 generates image data for display on the basis of a positional relation between the position of the light icon ss1 on the image SI and the points PA to PE set in the image SI and displays the image SI based on the generated image data for display in the main display region 432. At this point, the control section 410 adjusts the position of the light icon ss1 on the target position image ss0 to move the light icon ss1 to a position corresponding to the position of the light icon ss1 on the image SI.

According to the example shown in FIG. 14, the user can designate an imaginary emitting direction of light using a desired light icon ss1 of the two light icons ss1. Note that, in the example shown in FIG. 14, the two light icons ss1 do not always have to be simultaneously displayed. For example, when the various buttons, the light icon ss1, and the like displayed on the observation screen 430A are operated by a pointer, only one light icon ss1 of the two light icons ss1 may be displayed on the observation screen 430A according to the position of the pointer on the observation screen 430A. Specifically, when a mouse pointer is located on the main display region 432, only the light icon ss1 on the image SI of the observation target S may be displayed. The light icon ss1 on the target position image ss0 does not have to be displayed. When the mouse pointer is located on the sub-display region 433, only the light icon ss1 on the target position image ss0 may be displayed. The light icon ss1 on the image SI of the observation target S does not have to be displayed.

Note that the light icon ss1 on the target position image ss0 may be displayed irrespective of the position of the mouse pointer. Consequently, the user can easily grasp an imaginary emitting position of light.

A specific example is explained concerning a change in the observation screen 430A at the time when an imaginary emitting direction of light is designated by the light icon ss1 in a state in which the observation screen 430A shown in FIG. 12 is displayed on the display section 430.

Figure 15:
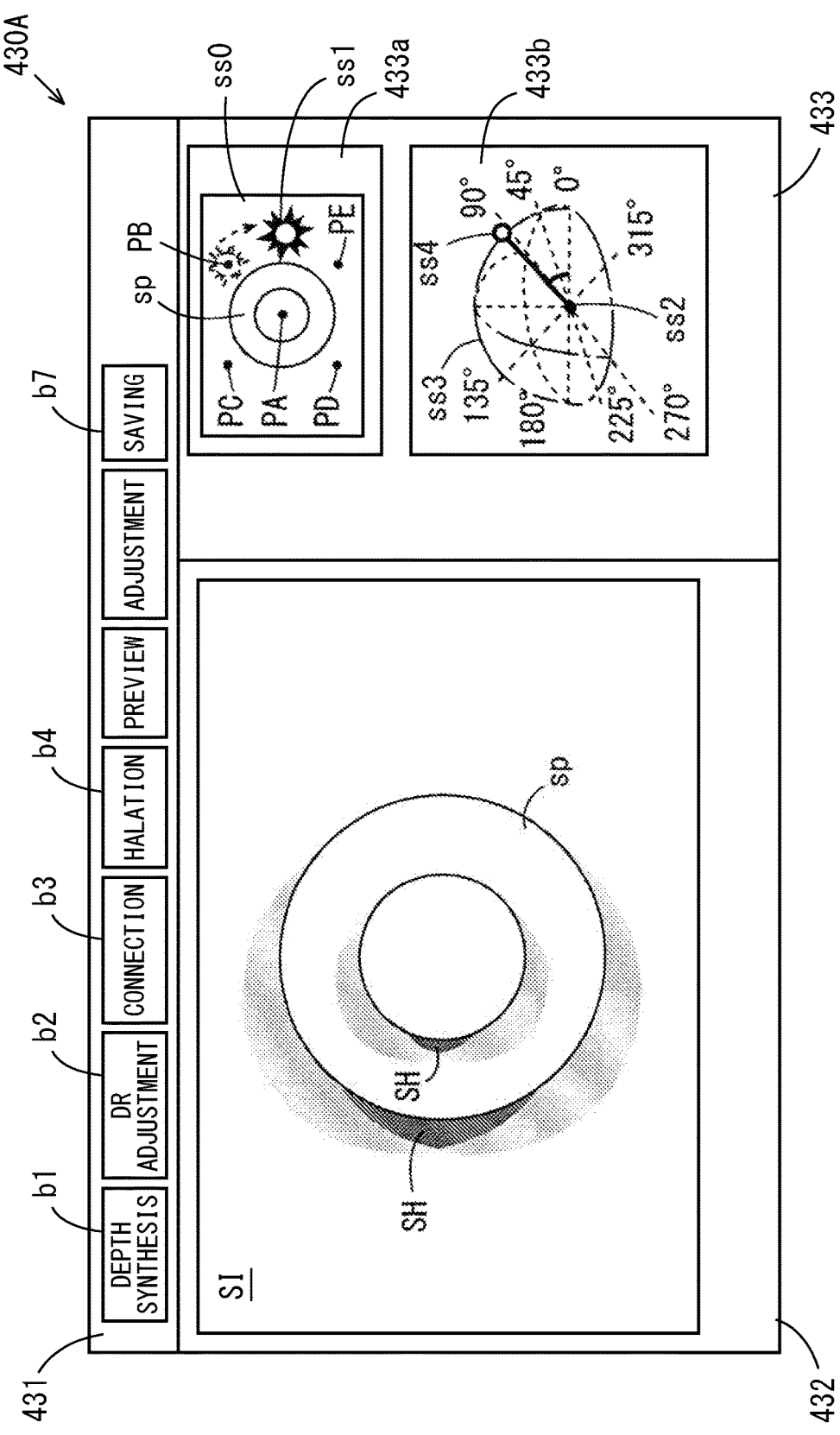
FIG. 15 is a diagram showing another display example of the observation screen.

FIG. 15 is a diagram showing another display example of the observation screen 430A. In FIG. 15, in order to facilitate understanding of the following explanation, the five points PA to PE shown in FIG. 13A are shown on the target position image ss0 displayed in the emitting-direction designation field 433a.

As indicated by a dotted line in the emitting-direction designation field 433a shown in FIG. 15, for example, the light icon ss1 is moved from the position of the point PB to the position between the points PB and PE on a concentric circle centering on the point PA on which the points PB to PE are arranged. In this case, the control section 410 generates image data for display by combining a part of the plurality of original image data respectively corresponding to the points PA to PE as in the example explained above. The control section 410 causes the display section 430 to display, in the main display region 432, the image SI of the observation target S based on the generated image data for display.

In the image SI displayed in the main display region 432 shown in FIG. 15, the uneven portion in the observation target S is strongly emphasized in an imaginary emitting direction of light designated by the light icon ss1 in the emitting-direction designation field 433a.

The imaginary emitting direction of light includes components of an azimuth angle and an angle of elevation. In this example, the light icon ss1 is moved on the concentric circle centering on the point PA on which the points PB to PE are arranged. The user can designate an azimuth angle of the imaginary emitting direction of light by moving the light icon ss1 on the target position image ss0 to rotate with respect to the center of the target position image ss0. Consequently, the azimuth angle of the imaginary emitting direction of light is changed to the azimuth angle designated by the light icon ss1. In this way, the user can designate the azimuth angle of the imaginary emitting direction of light in a desired direction by operating the light icon ss1. As a result, in the image SI displayed in the main display region 432, the user can easily change a direction in which the uneven portion in the observation target S is emphasized to the 0 direction.

Figure 16:
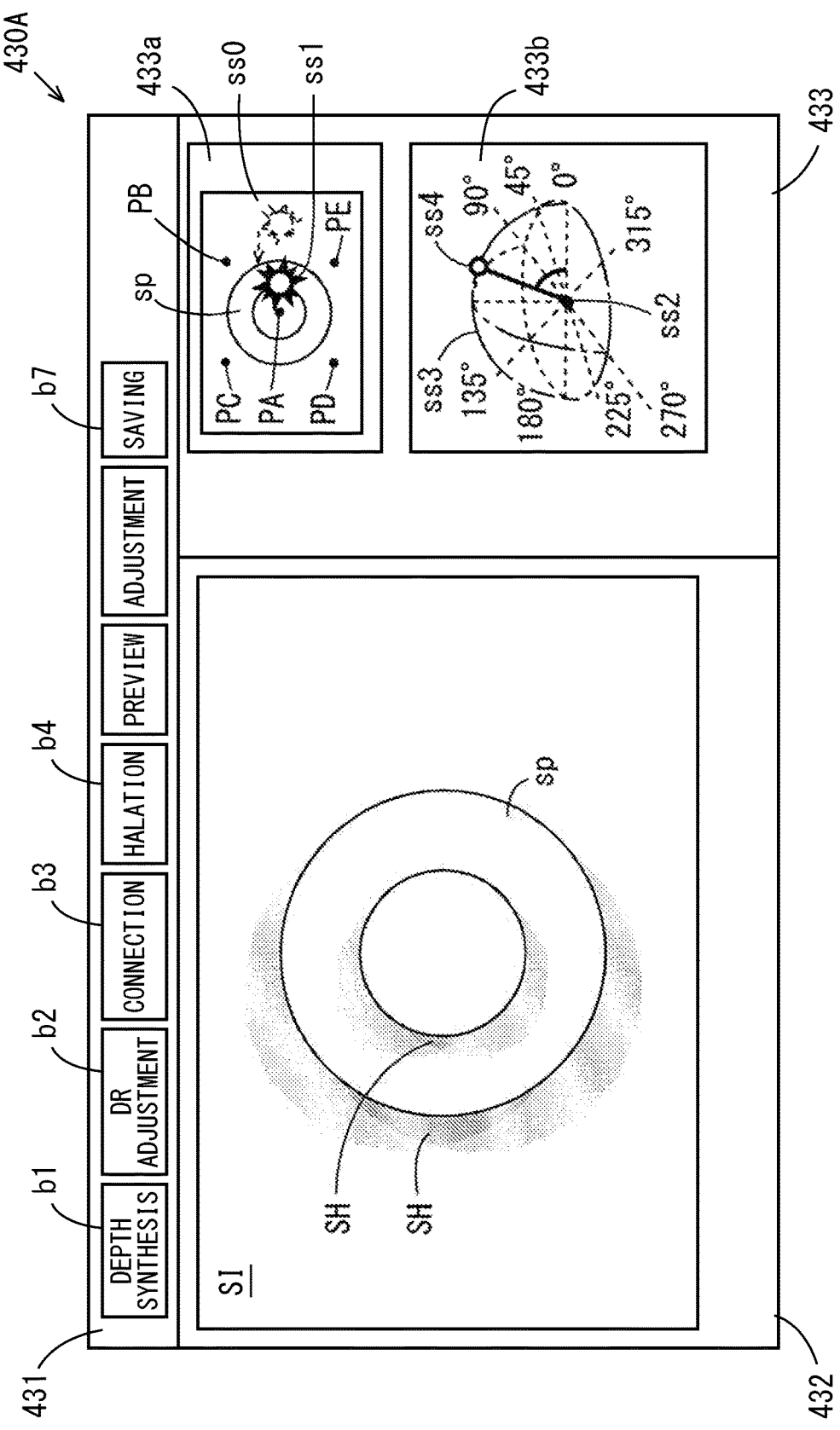
FIG. 16 is a diagram showing still another display example of the observation screen.

FIG. 16 is a diagram showing still another display example of the observation screen 430A. In FIG. 16, as in the example shown in FIG. 15, the five points PA to PE shown in FIG. 13A are shown on the target position image ss0 displayed in the emitting-direction designation field 433a. As indicated by a dotted line in the emitting-direction designation field 433a shown in FIG. 16, the light icon ss1 is moved to be closer to the point PA from the position shown in the emitting-direction designation field 433a shown in FIG. 15. In this case, the control section 410 generates image data for display by combining a part of the plurality of original image data respectively corresponding to the points PA to PE as in the example explained above. The control section 410 causes the display section 430 to display, in the main display region 432, the image SI of the observation target S based on the generated image data for display.

In the image SI displayed in the main display region 432 shown in FIG. 16, the uneven portion in the observation target S is weakly emphasized compared with the image SI displayed in the main display region 432 shown in FIG. 15.

In this example, the light icon ss1 is moved from the concentric circle on which the points PB to PE are arranged centering on the point PA toward the point PA. The user can designate an angle of elevation of the imaginary emitting direction of light from the placement surface by moving the light icon ss1 close to or away from the center of the target position image ss0 on the target position image ss0. Consequently, the angle of elevation of the imaginary emitting direction of light from the placement surface is changed to the angle of elevation designated by the light icon ss1. In this way, the user can designate the angle of elevation of the imaginary emitting direction of light in a desired angle by operating the light icon ss1. As a result, in the image SI displayed in the main display region 432, the user can easily change a degree of the emphasis of the uneven portion in the observation target S.

In the example explained above, on the observation screen 430A of the display section 430, the main display region 432 for displaying the image SI based on the image data for display and the sub-display region 433 for operating the light icon ss1 are set. Consequently, the image SI of the observation target S and the light icon ss1 do not overlap. Therefore, it is easy to visually recognize the image SI of the observation target S and the light icon ss1.

The user operates the saving button b7 shown in FIG. 12 using the operation section 440 shown in FIG. 1 in a state in which the imaginary emitting direction of light is designated in the desired direction concerning the image SI of the observation target S. In this case, the image data for display of the image SI displayed in the main display region 432 is stored in the storing section 420 together with a plurality of data concerning the image data for display. The plurality of data include a plurality of original image data related to the image data for display, imaging information, illumination information, and lens information.

In the example explained above, one of the plurality of images SI based on the plurality of original image data generated by the immediately preceding plural illumination imaging is displayed in the main display region 432 of the observation screen 430A in the initial state after the completion of the plural illumination imaging. However, the present invention is not limited to this. In the magnifying observation apparatus 1, for example, before the plural illumination imaging is started, an imaginary emitting direction of light corresponding to the image SI that should be displayed in the initial state in advance may be able to be designated. Alternatively, the imaginary emitting direction of light corresponding to the image SI that should be displayed in the initial state in advance may be designated by a manufacturer in advance during factory shipment of the magnifying observation apparatus 1. An image (a moving image) in which an emitting direction with respect to the image SI smoothly changes such that the imaginary emitting direction of light corresponding to the image SI changes may be displayed in the main display region 432 of the observation screen 430A in the initial state after the completion of the plural illumination imaging until operation by the user is received.

In this case, the control section 410 generates, when the plural illumination imaging is completed, image data for display corresponding to an emitting direction designated on the basis of the imaginary emitting direction of light designated in advance and the plurality of original image data generated by the plural illumination imaging. The control section 410 causes the display section 430 to display, in the main display region 432, the image SI based on the generated image data for display.

(b) Example of Plural Illumination Imaging Processing

The system program stored in the storing section 420 shown in FIG. 2 includes a plural illumination imaging program and an image-for-display generating program. The control section 410 shown in FIG. 2 performs plural illumination imaging processing and image-for-display generation processing by executing the plural illumination imaging program and the image-for-display generating program. The series of basic operation explained above is realized by the plural illumination imaging processing and the image-for-display generation processing. Consequently, even if the user is unskilled, the user can easily generate original image data.

Figure 17:
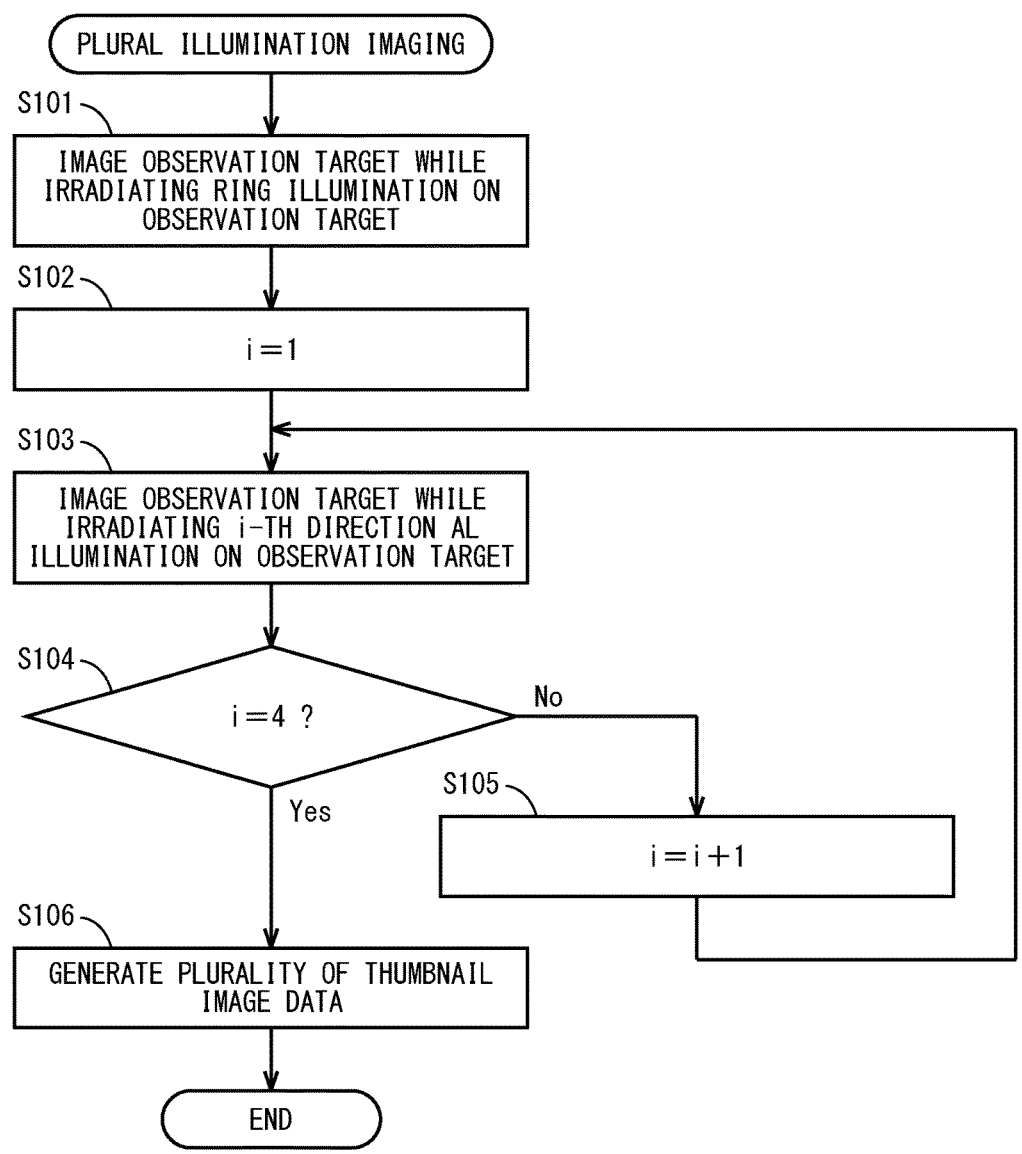
FIG. 17 is a flowchart for explaining an example of plural illumination imaging processing.

FIG. 17 is a flowchart for explaining an example of the plural illumination imaging processing. The plural illumination imaging processing is started in response to an instruction for the plural illumination imaging by the user. When the plural illumination imaging processing is started, the control section 410 irradiates the ring illumination on the observation target S according to imaging conditions set in advance and images the observation target S with the imaging section 132 (step S101). Original image data generated by the imaging is stored in the storing section 420.

Subsequently, the control section 410 sets i to 1 (step S102). In this step, i indicates numbers of a plurality of directional illuminations. Subsequently, the control section 410 irradiates i-th directional illumination on the observation target S and images the observation target S with the imaging section 132 (step S103). Original image data obtained by the imaging is stored in the storing section 420.

Subsequently, the control section 410 determines whether i is 4 (step S104). If i is not 4, the control section 410 updates i to i+1 (step S105) and returns to the processing in step S103.

If i is 4 in step S104, the control section 410 generates a plurality of thumbnail image data respectively corresponding to a plurality of original image data (step S106). The generated plurality of thumbnail image data are stored in the storing section 420. Consequently, the plural illumination imaging processing ends.

In the above explanation, the processing in step S106 may be omitted when it is unnecessary to display a thumbnail image on the display section 430. Consequently, a processing time is reduced.

In the above explanation, a part of the processing may be performed at other points in time. For example, the processing in step S101 may be executed later than the processing in steps S102 to S105.

(c) Example of the Image-for-Display Generation Processing

Figure 18:
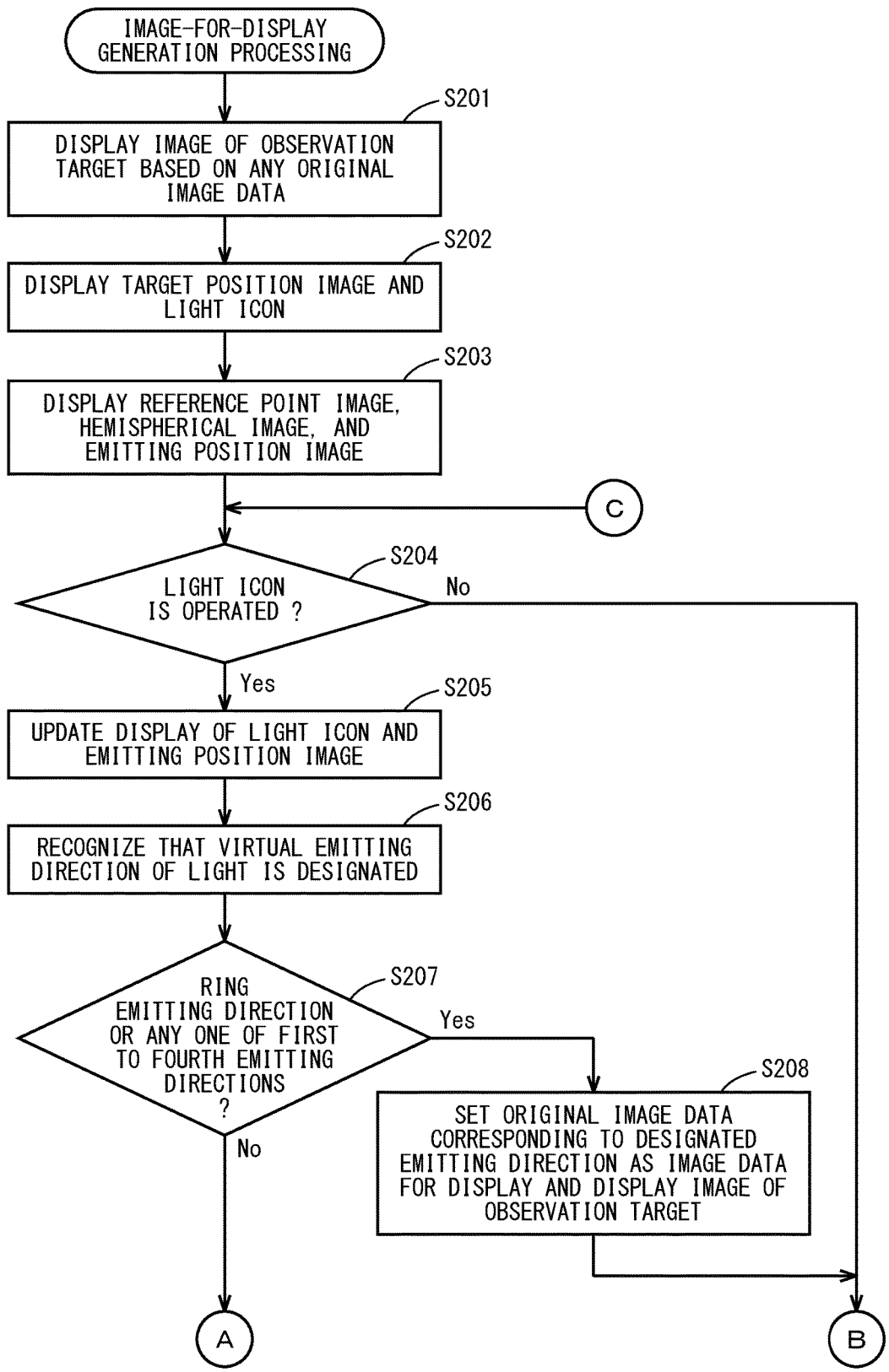
FIG. 18 is a flowchart for explaining an example of image-for-display generation processing.
Figure 19:
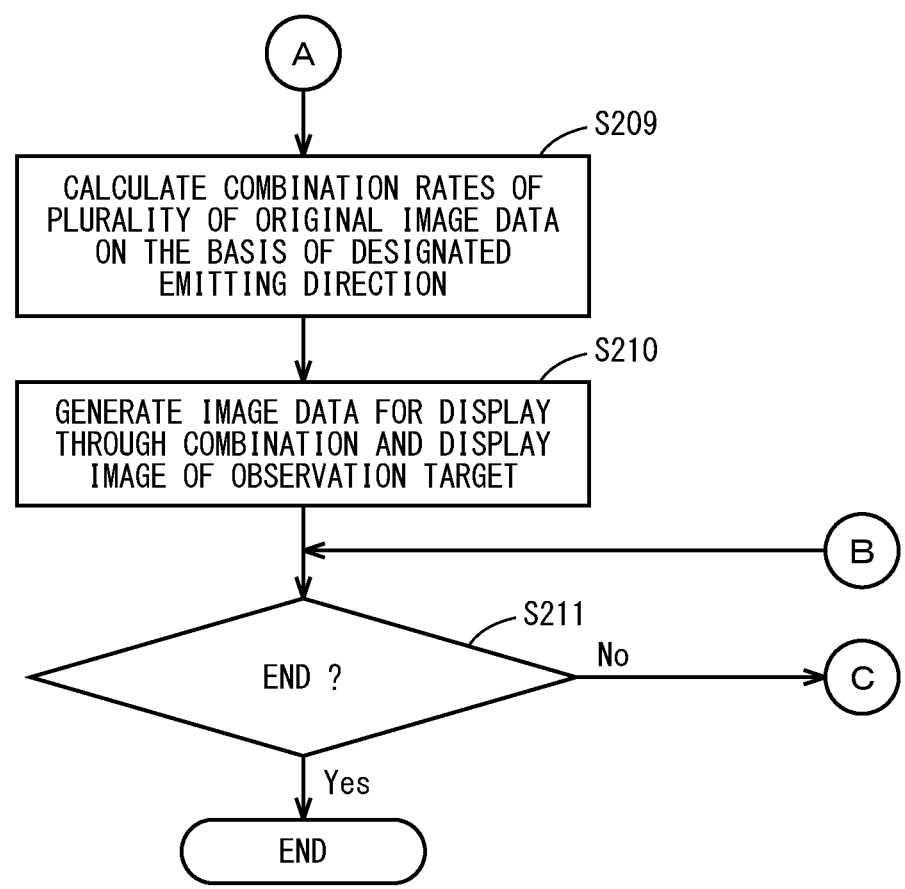
FIG. 19 is a flowchart for explaining the example of the image-for-display generation processing.

FIGS. 18 and 19 are flowcharts for explaining an example of the image-for-display generation processing. In this embodiment, the control section 410 starts the image-for-display generation processing after the end of the plural illumination imaging processing.

First, the control section 410 causes the display section 430 to display, in the main display region 432, the image SI of the observation target S based on any original image data among the plurality of original image data generated by the plural illumination imaging processing (step S201). The control section 410 causes the display section 430 to display the target position image ss0 and the light icon ss1 in the emitting-direction designation field 433a (step S202). Further, the control section 410 causes the display section 430 to display the reference point image ss2, the hemispherical image ss3, and the emitting position image ss4 in the emitting-direction display field 433b (step S203).

Thereafter, the control section 410 determines whether the light icon ss1 is operated (step S204). If the light icon ss1 is not operated, the control section 410 proceeds to processing in step S210 explained below.

If the light icon ss1 is operated, the control section 410 updates the display of the light icon ss1 and the emitting position image ss4 in response to the operation of the light icon ss1 (step S205). The control section 410 recognizes that an imaginary emitting direction of light is designated by the operation of the light icon ss1 (step S206) and determines whether the designated emitting direction is the ring emitting direction or anyone of the first to fourth emitting directions (step S207). The determination processing in step S207 is executed on the basis of a positional relation between the points PA to PE set on the target position image ss0 and the light icon ss1.

If the designated emitting direction is the ring emitting direction or any one of the first to fourth emitting directions, the control section 410 sets the original image data corresponding to the designated emitting direction as image data for display and causes the display section 430 to display the image SI of the observation target S based on the image data for display in the main display region 432 (step S208). Thereafter, the control section 410 proceeds to processing in step S210 explained below.

If the designated emitting direction is not the ring emitting direction or all of the first to fourth emitting directions in step S207, the control section 410 calculates combination rates of the plurality of original image data on the basis of the designated emitting direction (step S209). Like the processing in step S207, the calculation processing in step S209 is executed on the basis of the positional relation between the points PA to PE set on the target position image ss0 and the light icon ss1.

Thereafter, the control section 410 generates image data for display by combining the plurality of original image data on the basis of the combination rates calculated in step S209 and causes the display section 430 to display the image SI of the observation target S based on the image data for display in the main display region 432 (step S210).

In this embodiment, the user can instruct an end of the observation of the observation target S by operating the operation section 440 shown in FIG. 1. After the processing in step S209, the control section 410 determines whether the end of the observation of the observation target S is instructed (step S211). If the end of the observation of the observation target S is instructed, the control section 410 ends the image-for-display generation processing. On the other hand, if the end of the observation of the observation target S is not instructed, the control section 410 returns to the processing in step S204.

In the image-for-display generation processing shown in FIGS. 18 and 19, during or after the processing in step S209, the control section 410 may calculate at least one of an azimuth angle and an angle of elevation of the designated imaginary emitting direction of light. In this case, the control section 410 may cause the display section 430 to display the calculated at least one of the azimuth angle and the angle of elevation. Consequently, the user can easily recognize information concerning the designated imaginary emitting direction of light.

In the image-for-display generation processing explained above, the image SI of the observation target S based on any original image data among the plurality of original image data generated in the plural illumination imaging processing is displayed on the display section 430 in the processing in step S201. However, the present invention is not limited to this. In the processing in step S201, the control section 410 may cause the display section 430 to display the image SI based on original image data corresponding to illumination decided in advance (e.g., the ring illumination) instead of the any original image data. Alternatively, the control section 410 may omit the processing in step S201.

In the example explained above, the image-for-display generation processing is executed after the end of the plural illumination imaging processing. However, the present invention is not limited to this. When the plural illumination imaging processing is continuously or intermittently executed at a fixed cycle, the image-for-display generation processing may be executed in parallel to the plural illumination imaging processing. In this case, the image-for-display generation processing can be executed on the basis of a latest plurality of original image data stored in the storing section 420 by the immediately preceding plural illumination imaging processing.

n the magnifying observation apparatus 1 according to this embodiment, the user can designate, using the operation section 440 shown in FIG. 1, apart of the plurality of original image data stored in the storing section 420. In this case, the control section 410 may respond to the designation of the original image data by the user, read the designated original image data, and perform the image-for-display generation processing based on the read original image data.

(3) Depth Synthesis Processing
(a) Processing Content

The user can give an instruction for the depth synthesis processing to the control section 410 shown in FIG. 1 by operating the depth synthesis button b1 shown in FIG. 12 using the operation section 440 shown in FIG. 1.

In the depth synthesis processing, it is desirable that a range of a focal position of light and a moving pitch of the focal position in the Z direction are set in advance as imaging conditions for the depth synthesis processing. In this case, the focus driving section 113 shown in FIG. 1 does not need to change the focal position of the light in an excessively large range. Therefore, it is possible to generate a plurality of original image data at high speed. The imaging conditions are set, for example, on the basis of operation of the operation section 440 by the user. Note that the range of the focal position of the light and the moving pitch of the focal position in the Z direction may be automatically set according to, for example, magnification of the objective lens 131a used for imaging. In the following explanation, it is assumed that imaging conditions for the depth synthesis processing are set in advance.

Figure 20:
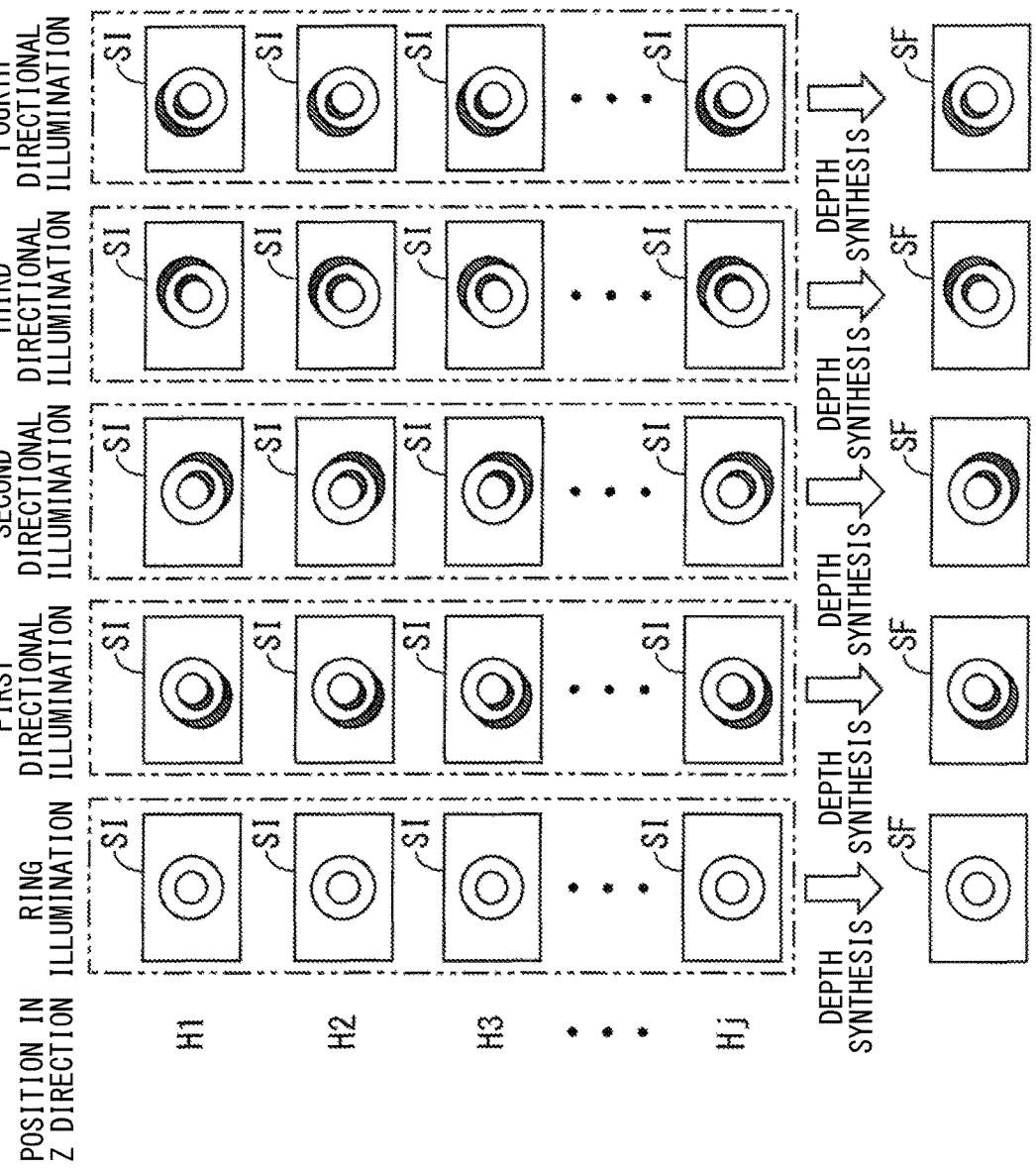
FIGS. 20A and 20B are conceptual diagrams of depth synthesis processing.

FIGS. 20A and 20B are conceptual diagrams of the depth synthesis processing. In FIG. 20A, a positional relation among the lens unit 131, the light projecting section 140, and the stage 121 is shown. In this example, in a state in which the stage 121 stands still, the lens unit 131 is moved in the Z direction integrally with the light projecting section 140. In this case, positions H1 to Hj (j is a natural number) in the Z direction to which the lens unit 131 (the objective lens 131a) should move are decided on the basis of the range of the focal position of the light and the moving pitch of the focal position in the Z direction designated in advance.

In the depth synthesis processing, the observation target S is imaged using the ring illumination and the first to fourth directional illuminations in a state in which the lens unit 131 is positioned in each of the positions H1 to Hj. Consequently, pluralities of (j) original image data respectively corresponding to the positions H1 to Hj are generated using the ring illumination and the first to fourth directional illuminations. In FIG. 20B, pluralities of images SI of the observation target S respectively corresponding to the positions H1 to Hj are shown for each of the illuminations.

A focus degree of each of pixels is determined concerning each of the plurality of original image data obtained by the imaging using the ring illumination. The plurality of original image data are selectively combined on the basis of a determination result of the focus degree. Consequently, depth synthesis image data focused on all portions of the observation target S on which the ring illumination is irradiated is generated. Depth synthesis image data corresponding to the directional illuminations are generated on the basis of the pluralities of original image data corresponding to the directional illuminations and mask image data explained below. An image based on the depth synthesis image data is referred to as depth synthesis image. In FIG. 20B, a plurality of depth synthesis images SF of the observation target S respectively corresponding to the ring illumination and the first to fourth directional illuminations are shown.

The control section 410 executes the image-for-display generation processing on the basis of a plurality of depth synthesis image data generated by the depth synthesis processing instead of the plurality of original image data. Consequently, the user can easily cause the display section 430 to display a depth synthesis image SF of the observation target S that should be obtained when it is assumed that light is irradiated on the observation target S from a desired direction.

In the depth synthesis processing explained above, pluralities of original image data respectively corresponding to the positions H1 to Hj are generated for each of the illuminations. An operation button for designating only the generation of the pluralities of original image data may be displayed on the observation screen 430A shown in FIG. 12. When only the generation of the pluralities of original image data is designated, after performing only the generation of the pluralities of original image data, the control section 410 may receive designation by the user concerning a position in the Z direction of a focus and execute the image-for-display generation processing using a plurality of original image data corresponding to the designated position in the Z direction.

In the depth synthesis processing explained above, mask image data is generated when the depth synthesis image data corresponding to the ring illumination is generated. Pluralities of depth synthesis image data respectively corresponding to the first to fourth directional illuminations are generated using the generated mask image data. The mask image data is explained.

Numbers corresponding to the focal positions H1 to Hj of light in the Z direction are given to respective pluralities of original image data generated in processing for imaging the observation target S while changing the positions in the Z direction of the lens barrel section 130 and the stage 121. The data generating section 610 shown in FIG. 9 generates mask image data indicating a corresponding relation between pixels of the depth synthesis image data corresponding to the ring illumination and numbers of the original image data.

FIG. 21 is a schematic diagram visually showing the mask image data. Small squares in FIG. 21 are equivalent to pixel data of the depth synthesis image data corresponding to the ring illumination. Numbers given to the squares indicate numbers of original image data from which data are extracted that indicate a pixel value of pixel data generated in which position among the focal positions H1 to Hj of the light in the Z direction is optimum in pixels corresponding to the squares, that is, in which focal position of the light a brightness value is the highest without being saturated. That is, in an example shown in FIG. 21, it is indicated that pixel data at the uppermost left is extracted from original image data in a focal position H12 of the light and pixel data at the lowermost right is extracted from original image data in a focal position H85 of the light.

The data generating section 610 generates, on the basis of the generated mask image data, depth synthesis image data corresponding to the respective first to fourth directional illuminations. In this case, the focus determining section 620 shown in FIG. 9 does not need to determine a focus degree of each of pixels concerning the original image data when generating the depth synthesis image data corresponding to the respective first to fourth directional illuminations. Consequently, it is possible to increase the speed of the depth synthesis processing.

In the above explanation, the depth synthesis image data is generated first for each of the ring illumination and the first to fourth directional illuminations. The image data for display is generated on the basis of the generated plurality of depth synthesis image data. However, the present invention is not limited to this. Pluralities of image data for display respectively corresponding to the plurality of positions H1 to Hj in the Z direction may be generated on the basis of the imaginary emitting direction of light designated by the user. Depth synthesis image data for display may be generated on the basis of the generated pluralities of image data for display. In this case, the mask image data is unnecessary.

Note that, in the above explanation, the mask image data is generated on the basis of the image data at the time when the ring illumination is emitted. However, the present invention is not limited to this. The mask image data may be generated on the basis of each of image data at the time when the ring illumination is emitted and image data at the time when the directional illumination is emitted. The mask image data at the time when the directional illumination is emitted may be generated for each of the plurality of directional illuminations. This configuration is useful when an optimum position in the Z direction is different because, for example, light amounts are different in the ring illumination and the directional illumination.

(b) Example of the Depth Synthesis Processing

The system program stored in the storing section 420 shown in FIG. 2 includes a depth synthesis program. The control section 410 shown in FIG. 2 performs the depth synthesis processing by executing the depth synthesis program.

Figure 22:
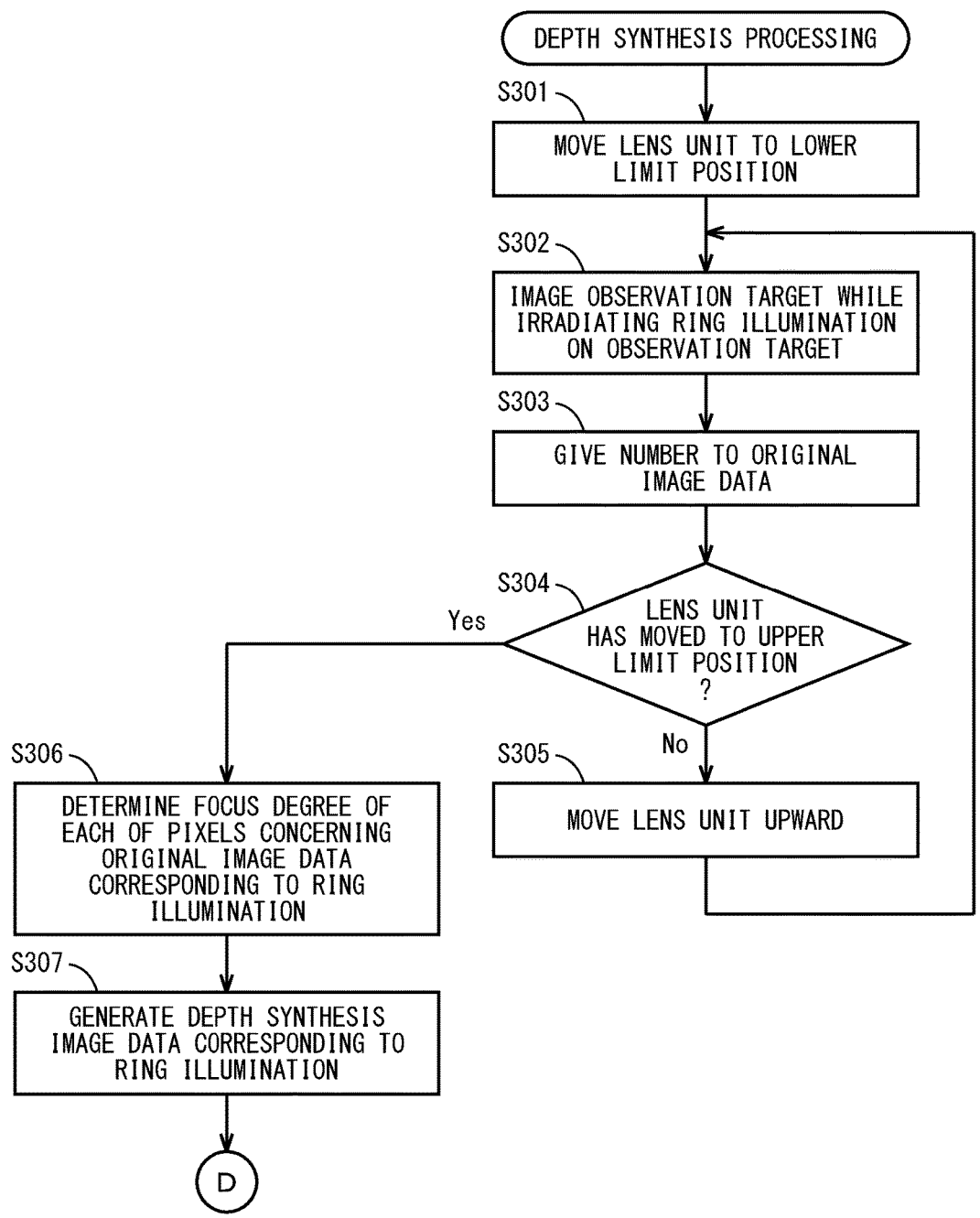
FIG. 22 is a flowchart for explaining an example of the depth synthesis processing.
Figure 23:
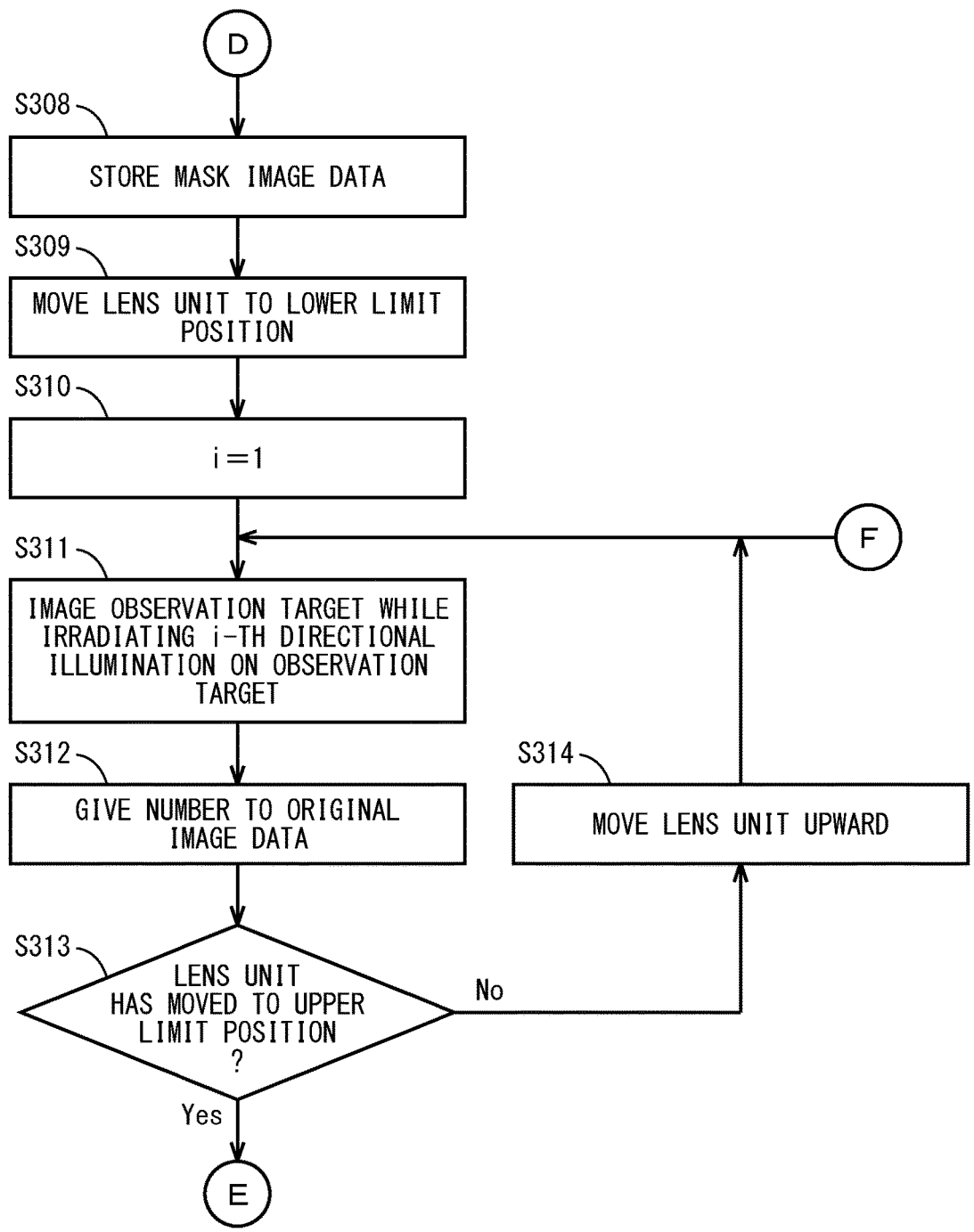
FIG. 23 is a flowchart for explaining the example of the depth synthesis processing.
Figure 24:
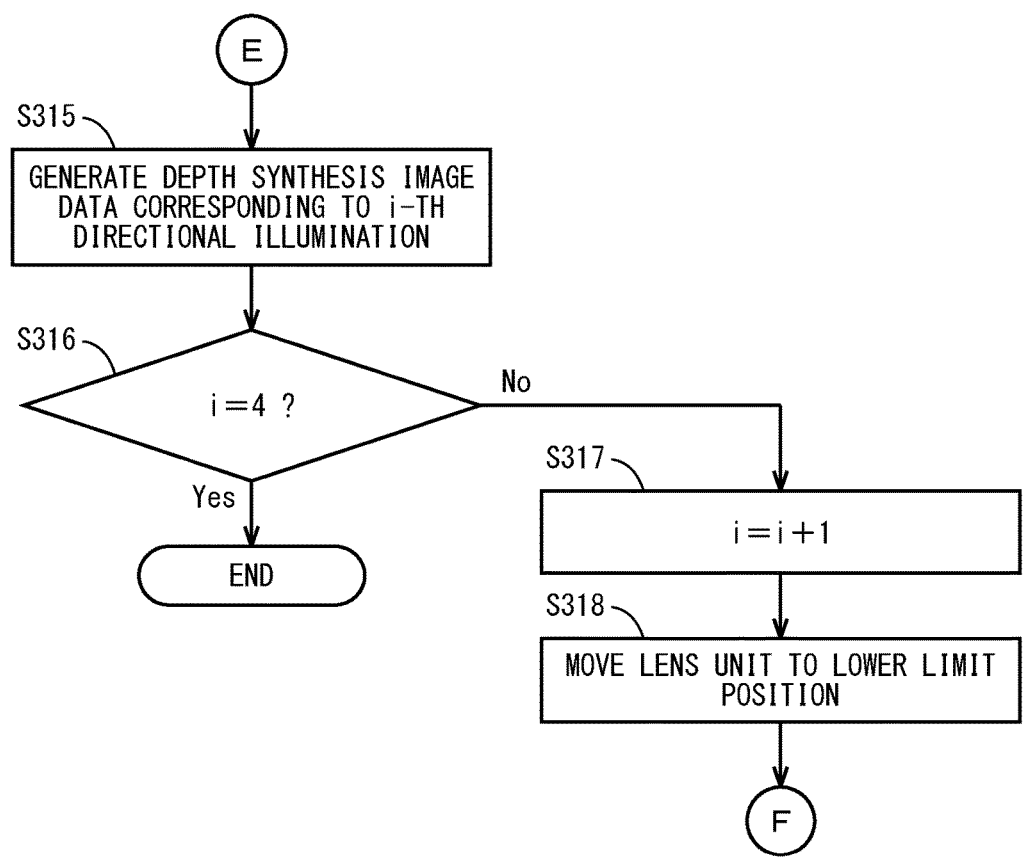
FIG. 24 is a flowchart for explaining the example of the depth synthesis processing.

FIGS. 22, 23, and 24 are flowcharts for explaining an example of the depth synthesis processing. The control section 410 moves the lens unit 131 to a lower limit position (step S301). Subsequently, the control section 410 irradiates the ring illumination on the observation target S with the light projecting section 140 and images the observation target S with the imaging section 132 (step S302). The control section 410 gives a number corresponding to the position in the Z direction of the lens unit 131 to generated original image data (step S303). Subsequently, the control section 410 determines whether the lens unit 131 has moved to an upper limit position (step S304).

If the lens unit 131 has not moved to the upper limit position in step S304, the control section 410 moves the lens unit 131 upward by a predetermined amount (a moving pitch set in advance) (step S305). Thereafter, the control section 410 returns to the processing in step S302. The control section 410 repeats the processing in steps S302 to S305 until the lens unit 131 moves to the upper limit position.

If the lens unit 131 has moved to the upper limit position in step S304, the control section 410 determines a focus degree of each of pixels concerning original image data corresponding to the ring illumination (step S306). Subsequently, the control section 410 generates depth synthesis image data corresponding to the ring illumination by combining pixel data of a plurality of original image data on the basis of a determination result of the focus degree (step S307). The control section 410 generates mask image data indicating a correspondence relation between pixels of combined image data and numbers of the original image data and causes the storing section 420 to store the mask image data (step S308).

Thereafter, the control section 410 moves the lens unit 131 to the lower limit position (step S309). Subsequently, the control section 410 sets i to 1 (step S310). In this step, i indicates numbers of a plurality of directional illuminations. Subsequently, the control section 410 irradiates the i-th directional illumination on the observation target S with the light projecting section 140 and images the observation target S with the imaging section 132 (step S311). The control section 410 gives a number corresponding to the position in the Z direction of the lens unit 131 to generated original image data (step S312). Subsequently, the control section 410 determines whether the lens unit 131 has moved to the upper limit position (step S313).

If the lens unit 131 has not moved to the upper limit position in step S313, the control section 410 moves the lens unit 131 upward by a predetermined amount (a moving pitch set in advance) (step S314). Thereafter, the control section 410 returns to the processing in step S311. The control section 410 repeats the processing in steps S311 to S314 until the lens unit 131 moves to the upper limit position.

If the lens unit 131 has moved to the upper limit position in step S313, the control section 410 generates depth synthesis image data corresponding to the i-th directional illumination by combining pixel data of the plurality of original image data on the basis of the mask image data stored in the storing section 420 (step S315).

Subsequently, the control section 410 determines whether i is 4 (step S316). If i is not 4 in step S316, the control section 410 updates i to i+1 (step S317). Thereafter, the control section 410 moves the lens unit 131 to the lower limit position (step S318) and returns to the processing in step S311. The control section 410 repeats the processing in steps S311 to S318 until i reaches 4. Consequently, pluralities of original image data corresponding to the respective first to fourth directional illuminations are generated. Depth synthesis image data corresponding to the respective first to fourth directional illuminations are generated. If i is 4 in step S316, the control section 410 ends the processing.

In the above explanation, a part of the processing may be performed at another point in time. For example, the processing in steps S306 to S308 may be executed in parallel to steps S309 to S314. The processing in step S315 corresponding to the i-th directional illumination may be executed in parallel to steps S311 to S314 corresponding to (i+1)-th directional illumination. In these cases, it is possible to increase the speed of the depth synthesis processing.

Alternatively, the processing in steps S306 to S308 may be executed later than the processing in steps S309 to S314. The processing in step S315 corresponding to the i-th directional illumination may be executed later than the processing in steps S311 to S314 corresponding to the (i+1)-th directional illumination.

(c) Another Example of the Depth Synthesis Processing

Figure 25:
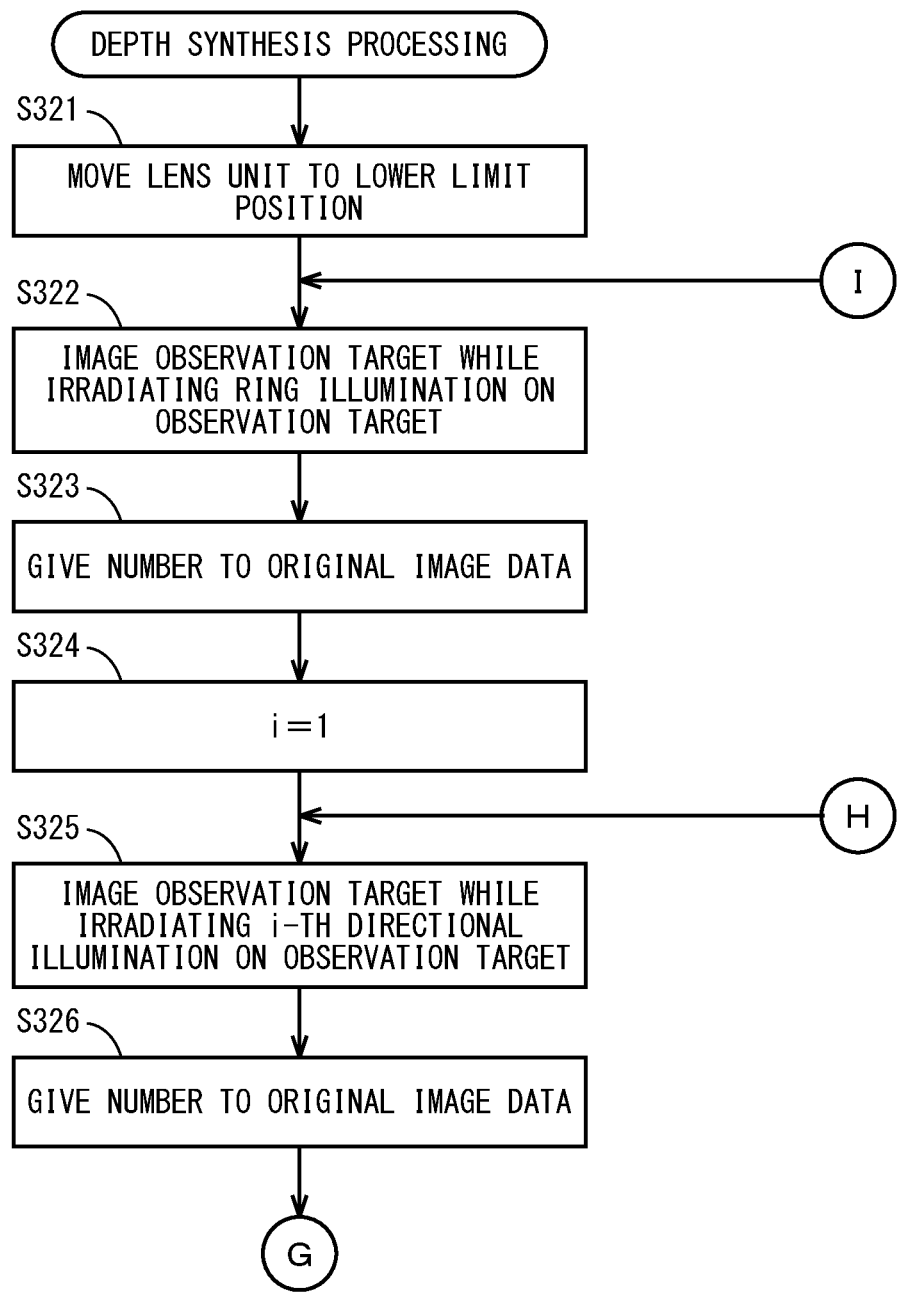
FIG. 25 is a flowchart for explaining another example of the depth synthesis processing.
Figure 26:
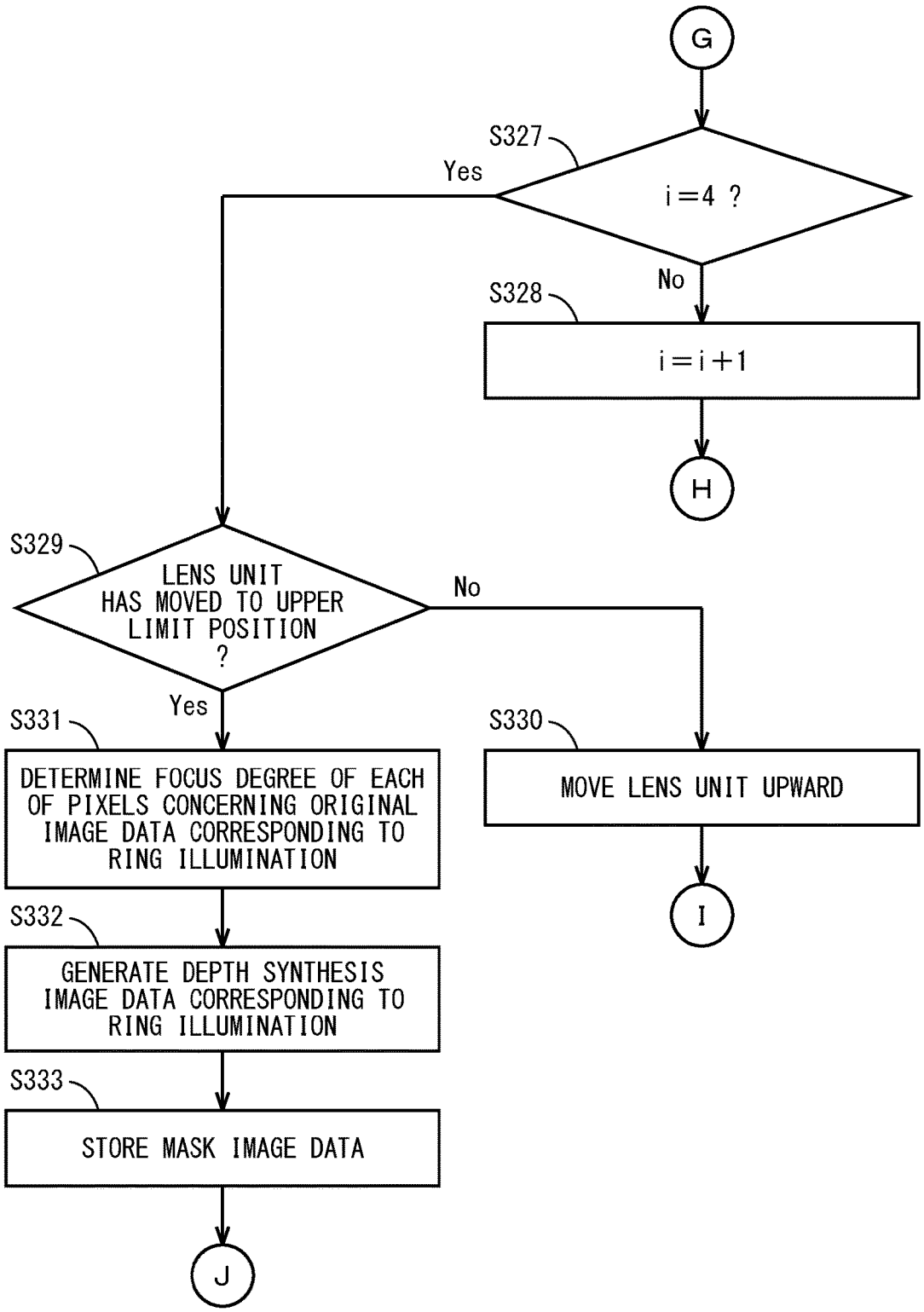
FIG. 26 is a flowchart for explaining the other example of the depth synthesis processing.
Figure 27:
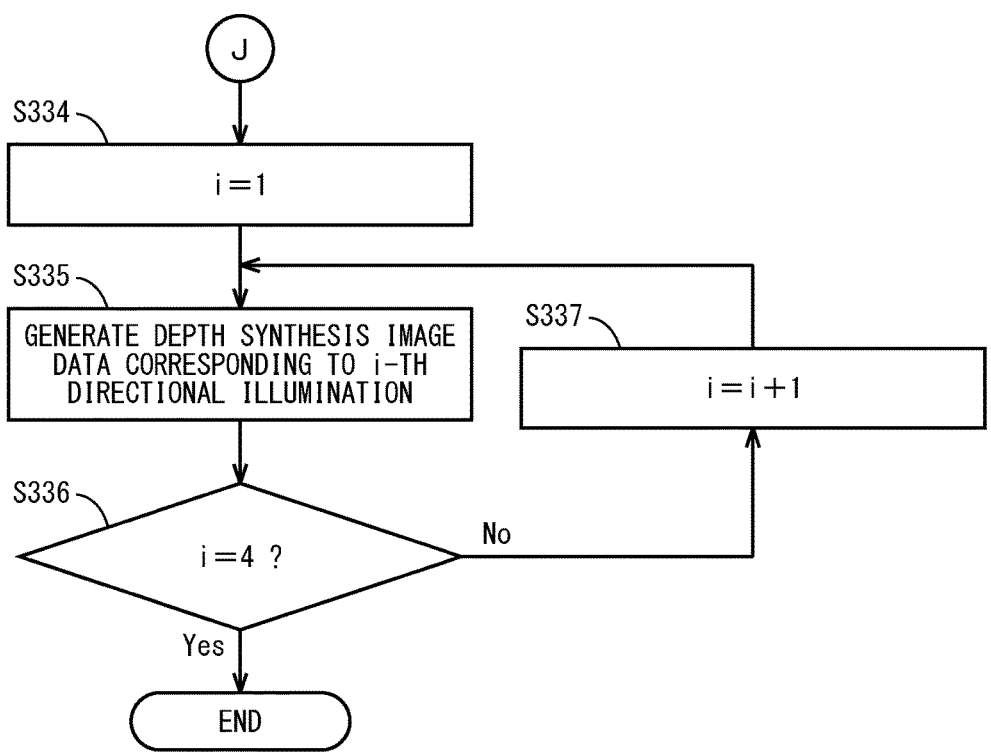
FIG. 27 is a flowchart for explaining the other example of the depth synthesis processing.

FIGS. 25, 26, and 27 are flowcharts for explaining another example of the depth synthesis processing. The control section 410 moves the lens unit 131 to the lower limit position (step S321). Subsequently, the control section 410 irradiates the ring illumination on the observation target S with the light projecting section 140 and images the observation target S with the imaging section 132 (step S322). The control section 410 gives a number corresponding to the position in the Z direction of the lens unit 131 to generated original image data (step S323).

Subsequently, the control section 410 sets i to 1 (step S324). In this step, i indicates numbers of a plurality of directional illuminations. Thereafter, the control section 410 irradiates the i-th directional illumination on the observation target S with the light projecting section 140 and images the observation target S with the imaging section 132 (step S325). The control section 410 gives a number corresponding to the position in the Z direction of the lens unit 131 to generated original image data (step S326). Subsequently, the control section 410 determines whether i is 4 (step S327).

If i is not 4 in step S327, the control section 410 updates i to i+1 (step S328). Thereafter, the control section 410 returns to the processing in step S325. The control section 410 repeats the processing in steps S325 to S328 until i reaches 4. Consequently, pluralities of original image data corresponding to the respective first to fourth directional illuminations are generated. If i is 4 in step S327, the control section 410 determines whether the lens unit 131 has moved to the upper limit position (step S329).

If the lens unit 131 has not moved to the upper limit position in step S329, the control section 410 moves the lens unit 131 upward by a predetermined amount (step S330). Thereafter, the control section 410 returns to the processing in step S322. The control section 410 repeats the processing insteps S322 to S330 until the lens unit 131 moves to the upper limit position.

If the lens unit 131 has moved to the upper limit position in step S329, the control section 410 determines a focus degree of each of pixels concerning the original image data corresponding to the ring illumination (step S331). Subsequently, the control section 410 generates depth synthesis image data corresponding to the ring illumination by combining pixel data of the plurality of original image data on the basis of a determination result of the focus degree (step S332). The control section 410 generates mask image data indicating a correspondence relation between pixels of combined image data and numbers of the original image data and causes the storing section 420 to store the mask image data (step S333).

Subsequently, the control section 410 sets i to 1 again (step S334). Thereafter, the control section 410 generates depth synthesis image data corresponding to the i-th directional illumination by combining the pixel data of the plurality of original image data on the basis of the mask image data stored in the storing section 420 (step S335).

Subsequently, the control section 410 determines whether i is 4 (step S336). If i is not 4 in step S316, the control section 410 updates i to i+1 (step S337). Thereafter, the control section 410 returns to the processing in step S335. The control section 410 repeats the processing in steps S335 to S337 until i reaches 4. Consequently, depth synthesis image data corresponding to the respective first to fourth directional illuminations are generated. If i is 4 in step S336, the control section 410 ends the processing.

In the above explanation, a part of the processing may be performed at another point in time. For example, a part of the processing in steps S331 to S337 may be executed in parallel to steps S321 to S330. In this case, it is possible to increase the speed of the depth synthesis processing. The processing in steps S322 and S323 may be executed later than the processing in steps S324 to S328.

In the example and the other example of the depth synthesis processing, the lens unit 131 is moved upward to the upper limit position by the predetermined amount at a time after being moved to the lower limit position serving as the initial position. However, the present invention is not limited to this. In the depth synthesis processing, the lens unit 131 may be moved downward to the lower limit position by the predetermined amount at a time after being moved to the upper limit position serving as the initial position.

Note that, in the above explanation, the pluralities of original image data respectively corresponding to the positions H1 to Hj are combined in the depth synthesis processing. However, the present invention is not limited to this. The pluralities of original image data respectively corresponding to the positions H1 to Hj may be independently used without being combined.

For example, original image data in which a focus of the imaging section 132 coincides with a specific portion of the observation target S most may be extracted from the pluralities of original image data respectively corresponding to the positions H1 to Hj on the basis of the determination result by the focus determining section 620 shown in FIG. 9. In this case, it is possible to generate, at high speed, image data for display indicating an image having a large focus degree as a whole on the basis of the plurality of original image data respectively extracted according to the ring illumination and the first to fourth directional illuminations.

(4) DR Adjustment Processing
(a) Processing Content

The user can give an instruction for the DR adjustment processing to the arithmetic processing section 600 by operating the DR adjustment button b2 shown in FIG. 12 using the operation section 440 shown in FIG. 1.

In the DR adjustment processing, in a state in which the light reception time of the imaging section 132 is changed to a plurality of values decided in advance, the observation target S at the time when the ring illumination and the first to fourth directional illuminations are respectively irradiated is imaged. Consequently, a plurality of original image data respectively corresponding to the ring illumination and the first to fourth directional illuminations are generated by the data generating section 610 shown in FIG. 9 in every light reception time of the imaging section 132. An overall pixel value of the original image data generated when the light reception time of the imaging section 132 is short is relatively small. An overall pixel value of the original image data generated when the light reception time of the imaging section 132 is long is relatively large.

The plurality of original image data corresponding to the ring illumination are combined by the data generating section 610. Consequently, it is possible to adjust a dynamic range of the original image data corresponding to the ring illumination. Similarly, the pluralities of original image data corresponding to the directional illuminations are combined by the data generating section 610. Consequently, it is possible to adjust a dynamic range of the original image data corresponding to the directional illuminations.

The adjustment of the dynamic range includes expansion and reduction of the dynamic range. It is possible to reduce black solid and halation (white void) in an image by combining the pluralities of original image data to expand the dynamic range. On the other hand, a difference in light and shade of an image is increased by combining the pluralities of original image data to reduce the dynamic range. Consequently, it is possible to precisely observe unevenness of the observation target S having a smooth surface.

In the above explanation, the original image data are combined first such that the dynamic range is adjusted for each of the ring illumination and the first to fourth directional illuminations. The image data for display is generated on the basis of the combined pluralities of original image data. However, the present invention is not limited to this. The image data for display may be generated first on the basis of the pluralities of original image data in every light reception time of the imaging section 132. The image data for display generated in every light reception time of the imaging section 132 may be combined such that the dynamic range is adjusted.

(b) Example of the DR Adjustment Processing

The system program stored in the storing section 420 shown in FIG. 2 includes a DR adjustment program. The control section 410 shown in FIG. 2 performs the DR adjustment processing by executing the DR adjustment program.

Figure 28:
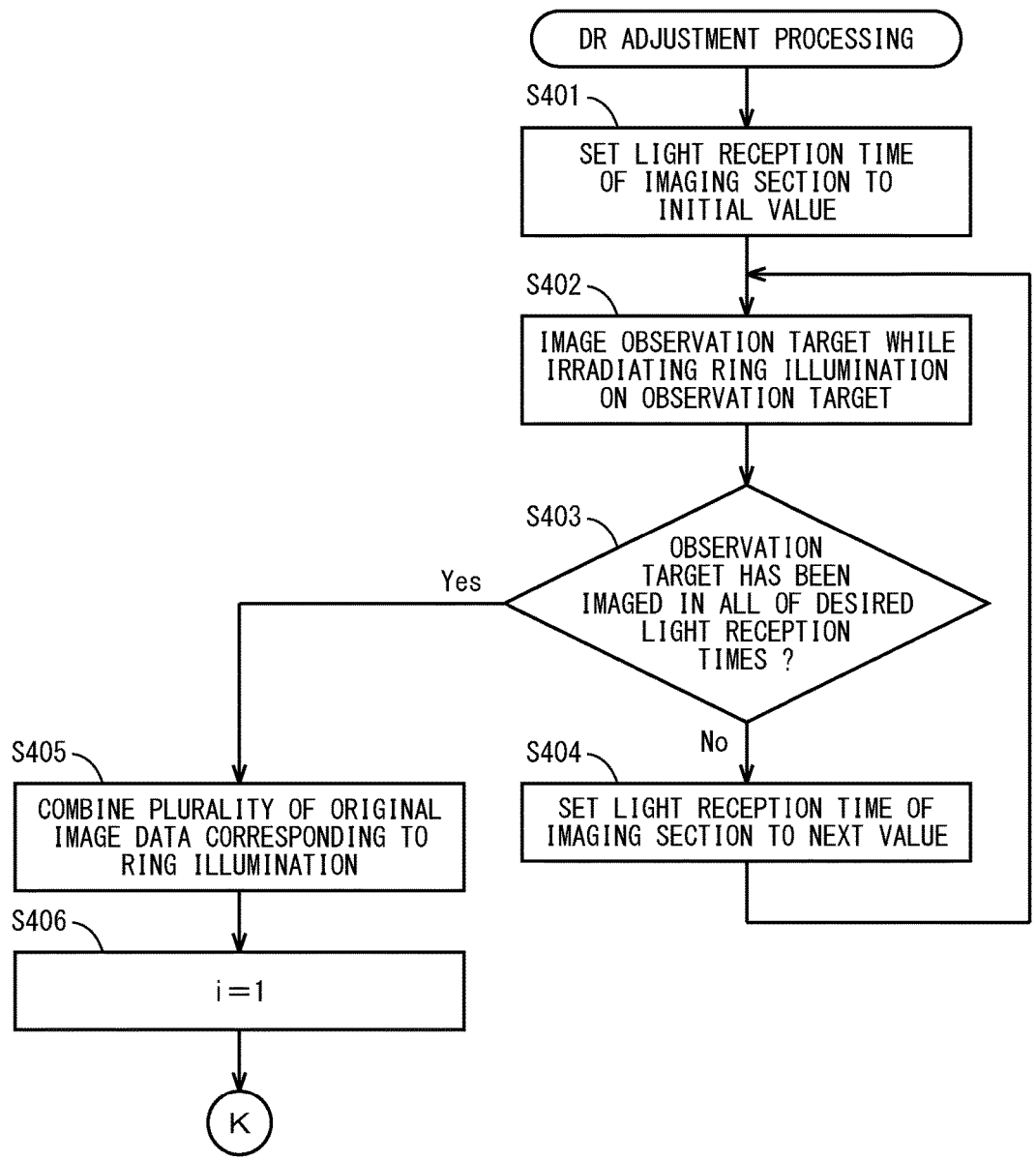
FIG. 28 is a flowchart for explaining an example of DR adjustment processing.
Figure 29:
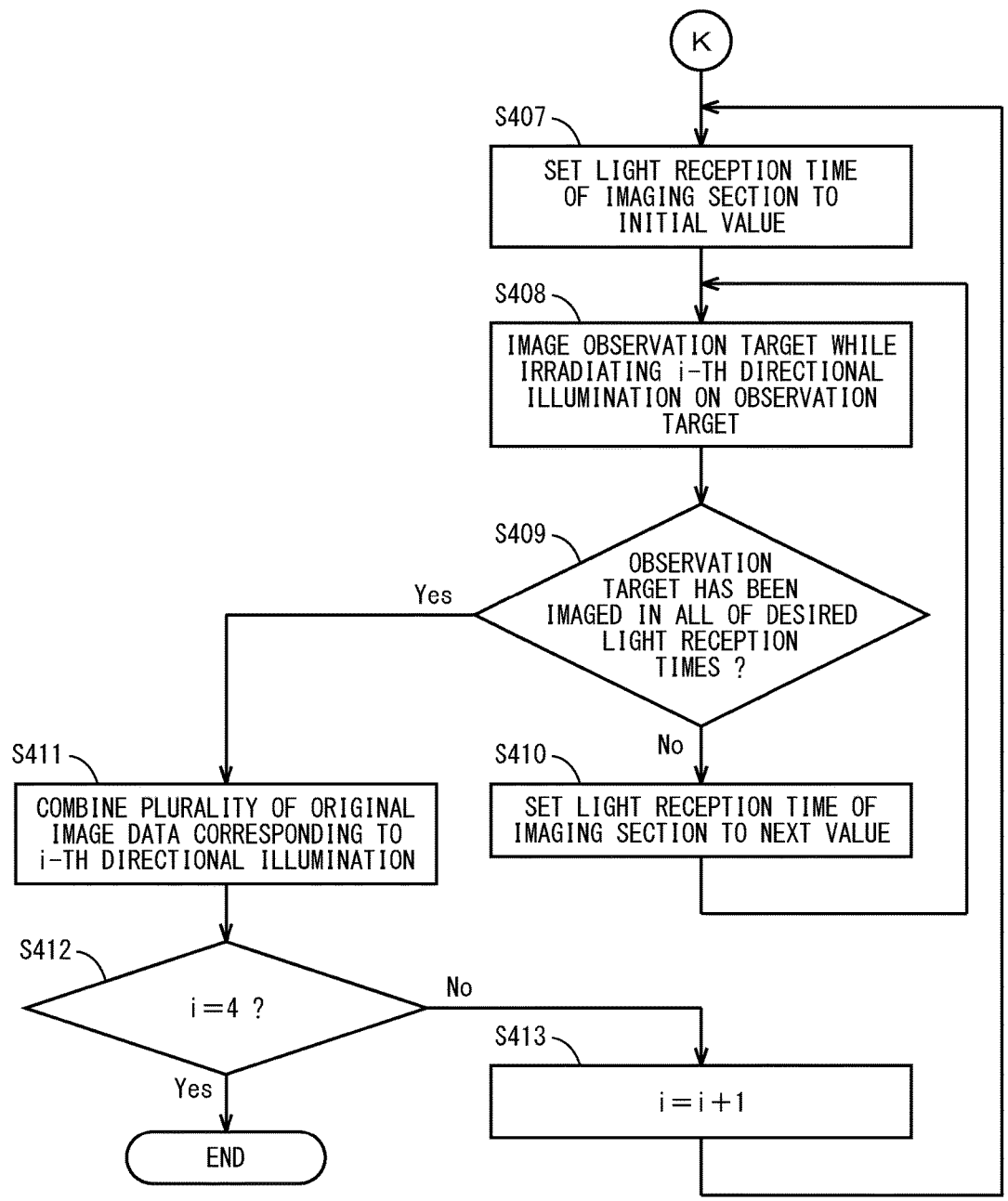
FIG. 29 is a flowchart for explaining the example of the DR adjustment processing.

FIGS. 28 and 29 are flowcharts for explaining an example of the DR adjustment processing. The control section 410 sets the light reception time of the imaging section 132 to an initial value decided in advance (step S401). In this state, the control section 410 irradiates the ring illumination on the observation target S with the light projecting section 140 and images the observation target S with the imaging section 132 (step S402). Subsequently, the control section 410 determines whether the observation target S has been imaged in all of desired light reception times of the imaging section 132 in a state in which the ring illumination is irradiated (step S403).

If the observation target S has been imaged in not all of the desired light reception times of the imaging section 132 in step S403, the control section 410 sets the light reception time of the imaging section 132 to the next value decided in advance (step S404). Thereafter, the control section 410 returns to the processing in step S402. The control section 410 repeats the processing in steps S402 to S404 until the observation target S is imaged in all of the desired light reception times of the imaging section 132.

If the observation target S has been imaged in all of the desired light reception times of the imaging section 132 in step S403, the control section 410 combines a generated plurality of original image data corresponding to the ring illumination (step S405). Consequently, a dynamic range of the original image data corresponding to the ring illumination is adjusted.

Thereafter, the control section 410 sets i to 1 (step S406). In this step, i indicates numbers of a plurality of directional illuminations. Subsequently, the control section 410 sets the light reception time of the imaging section 132 to an initial value decided in advance (step S407). In this state, the control section 410 irradiates the i-th directional illumination on the observation target S with the light projecting section 140 and images the observation target S with the imaging section 132 (step S408). Subsequently, the control section 410 determines whether the observation target S has been imaged in all of the desired light reception times of the imaging section 132 in a state in which the i-th directional illumination is irradiated (step S409).

If the observation target S has been imaged in not all of the desired light reception times of the imaging section 132 in step S409, the control section 410 sets the light reception time of the imaging section 132 to the next value decided in advance (step S410). Thereafter, the control section 410 returns to the processing in step S408. The control section 410 repeats the processing in steps S408 to S410 until the observation target S is imaged in all of the desired light reception times of the imaging section 132.

If the observation target S has been imaged in all of the desired light reception times of the imaging section 132 in step S409, the control section 410 combines a generated plurality of original image data corresponding to the i-th directional illumination (step S411). Consequently, a dynamic range of the original image data corresponding to the i-th directional illumination is adjusted.

Subsequently, the control section 410 determines whether i is 4 (step S412). If i is not 4 in step S412, the control section 410 updates i to i+1 (step S413). Thereafter, the control section 410 returns to the processing in step S407. The control section 410 repeats the processing in steps S407 to S413 until i reaches 4. Consequently, pluralities of original image data corresponding to the respective first to fourth directional illuminations are generated and combined to adjust a dynamic range. If i is 4 in step S412, the control section 410 ends the processing.

In the above explanation, a part of the processing may be performed at another point in time. For example, the processing in step S405 may be executed in parallel to the processing in steps S406 to S413. The processing in step S411 corresponding to the i-th directional illumination may be executed in parallel to steps S407 to S410 corresponding to the (i+1)-th directional illumination. In these cases, it is possible to increase the speed of the DR adjustment processing.

Alternatively, the processing in steps S401 to S405 may be executed later than the processing in steps S406 to S413. The processing in step S411 corresponding to the i-th directional illumination may be executed later than the processing insteps S407 to S410 corresponding to the (i+1)-th directional illumination.

(c) Another Example of the DR Adjustment Processing

Figure 30:
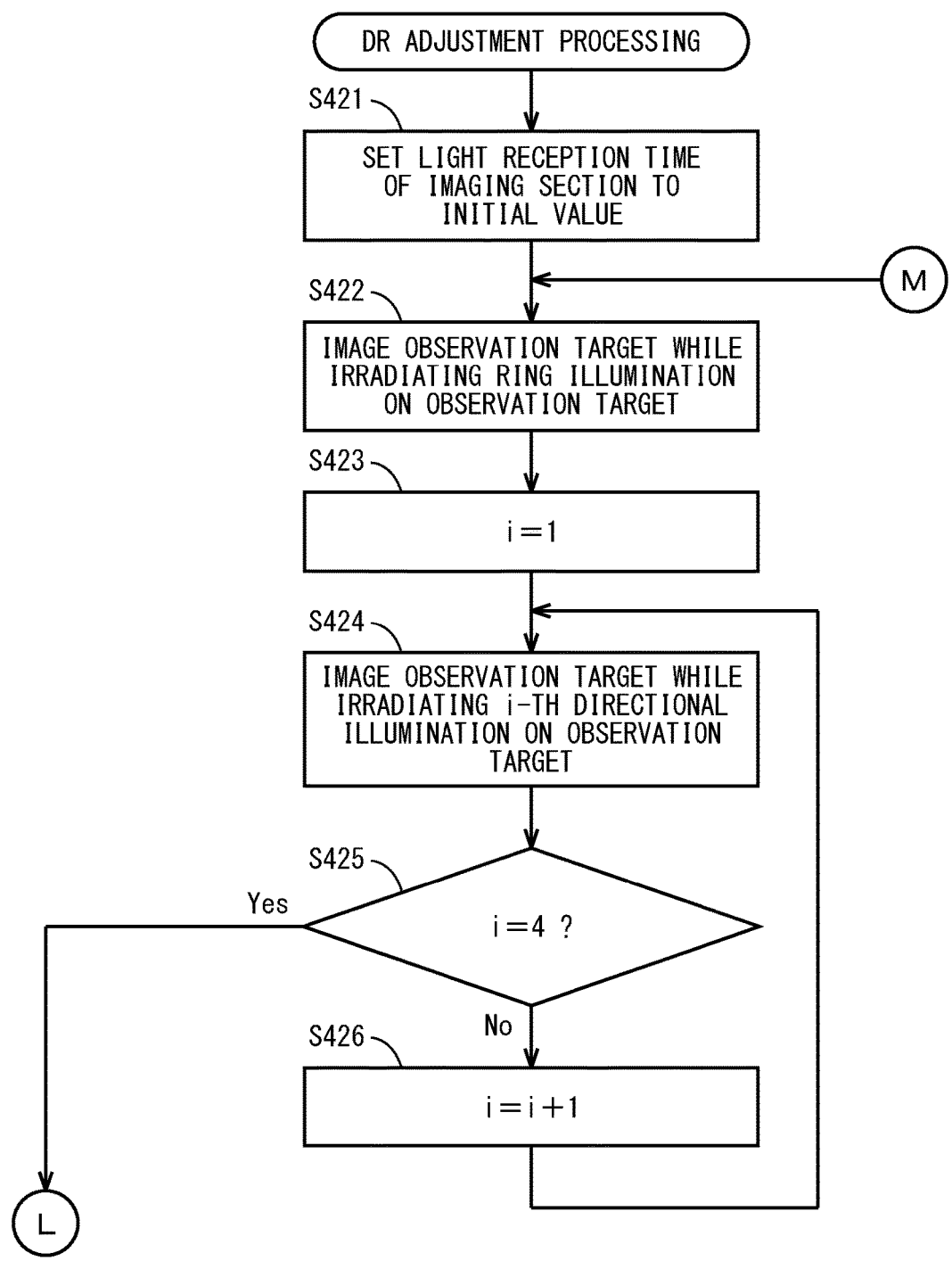
FIG. 30 is a flowchart for explaining another example of the DR adjustment processing.
Figure 31:
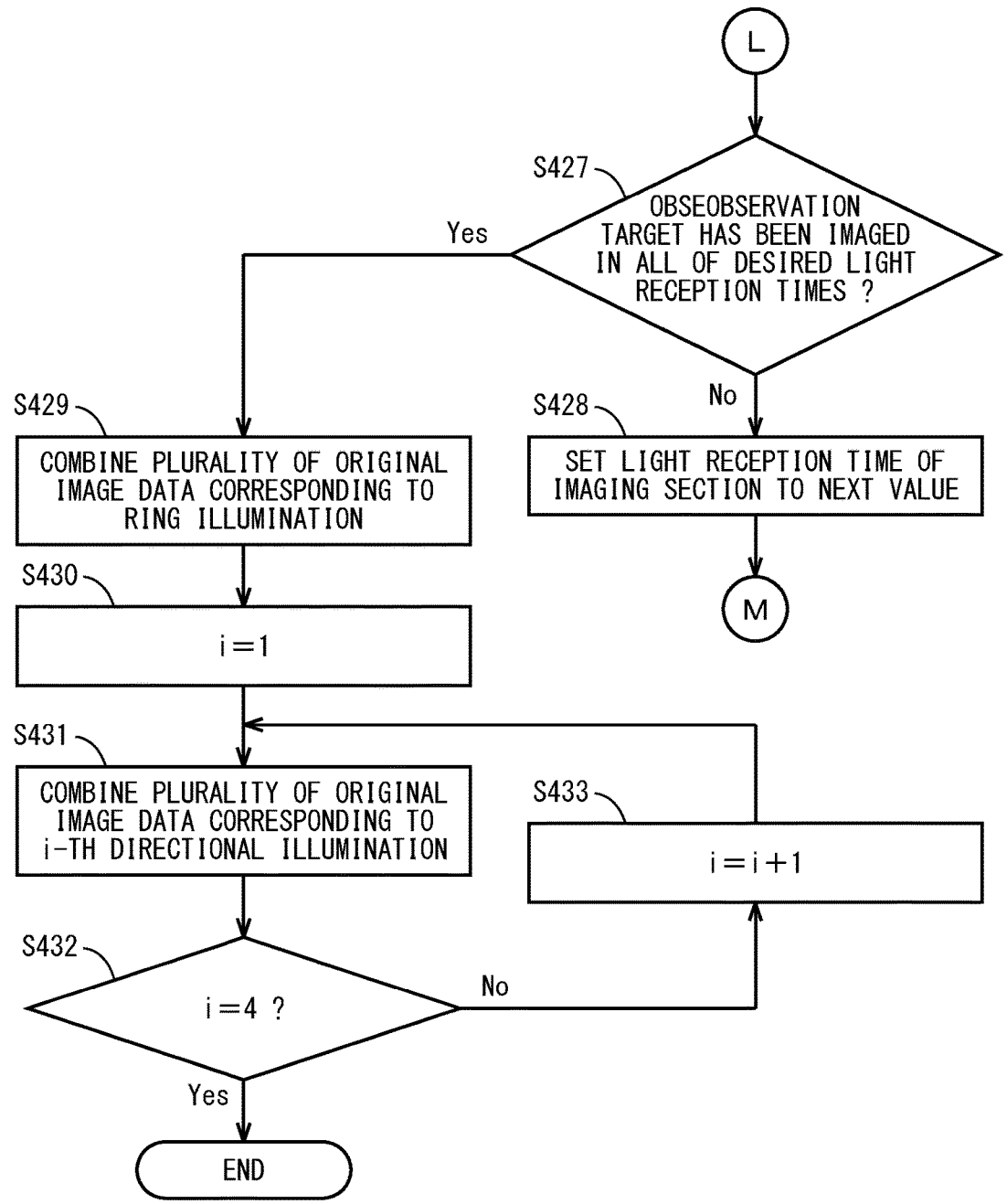
FIG. 31 is a flowchart for explaining the other example of the DR adjustment processing.

FIGS. 30 and 31 are flowcharts for explaining another example of the DR adjustment processing. The control section 410 sets the light reception time of the imaging section 132 to an initial value decided in advance (step S421). In this state, the control section 410 irradiates the ring illumination on the observation target S with the light projecting section 140 and images the observation target S with the imaging section 132 (step S422).

Subsequently, the control section 410 sets i to 1 (step S423). In this step, i indicates numbers of a plurality of directional illuminations. Thereafter, the control section 410 irradiates the i-th directional illumination on the observation target S with the light projecting section 140 and images the observation target S with the imaging section 132 (step S424).

Subsequently, the control section 410 determines whether i is 4 (step S425). If i is not 4 in step S425, the control section 410 updates i to i+1 (step S426). Thereafter, the control section 410 returns to the processing in step S424. The control section 410 repeats the processing in steps S424 to S426 until i reaches 4. Consequently, pluralities of original image data corresponding to the respective first to fourth directional illuminations are generated. Subsequently, the control section 410 determines whether the observation target S has been imaged in all of the desired light reception times of the imaging section 132 (step S427).

If the observation target S has been imaged in not all of the desired light reception times of the imaging section 132 in step S427, the control section 410 sets the light reception time of the imaging section 132 to the next value decided in advance (step S428). Thereafter, the control section 410 returns to the processing in step S422. The control section 410 repeats the processing in steps S422 to S428 until the observation target S is imaged in all of the desired light reception time of the imaging section 132.

If the observation target S has been imaged in all of the desired light reception times of the imaging section 132 in step S427, the control section 410 combines a generated plurality of original image data corresponding to the ring illumination to adjust a dynamic range (step S429). Consequently, a dynamic range of the original image data corresponding to the ring illumination is adjusted.

Thereafter, the control section 410 sets i to 1 again (step S430). Subsequently, the control section 410 combines a generated plurality of original image data corresponding to the i-th directional illumination (step S431). Consequently, a dynamic range of the original image data corresponding to the i-th directional illumination is adjusted. Subsequently, the control section 410 determines whether i is 4 (step S432).

If i is not 4 in step S432, the control section 410 updates i to i+1 (step S433). Thereafter, the control section 410 returns to the processing in step S431. The control section 410 repeats the processing in steps S431 to S433 until i reaches 4. Consequently, the pluralities of original image data corresponding to the respective first to fourth directional illuminations are combined to adjust a dynamic range. If i is 4 in step S432, the control section 410 ends the processing.

In the above explanation, a part of the processing may be performed at another point in time. For example, a part of the processing in steps S429 to S433 may be performed in parallel to the processing in steps S421 to S428. In this case, it is possible to increase the speed of the DR adjustment processing. The processing in step S422 may be executed later than the processing in steps S423 to S426. Further, the processing in step S429 may be executed later than the processing in steps S430 to S433.

(5) Connection Processing (a) Processing Content

The surface of the observation target S, original image data of which is generated by imaging performed by the imaging section 132 shown in FIG. 1 once, is referred to as unit region. The observation target S is imaged while the stage 121 shown in FIG. 1 is moved in the X direction or the Y direction, whereby a plurality of original image data adjacent to one another in the X direction or the Y direction are generated by the imaging section 132. The data generating section 610 shown in FIG. 9 can generate connected image data indicating a region of the observation target S larger than the unit region by connecting the plurality of original image data adjacent to one another.

Figure 32A:
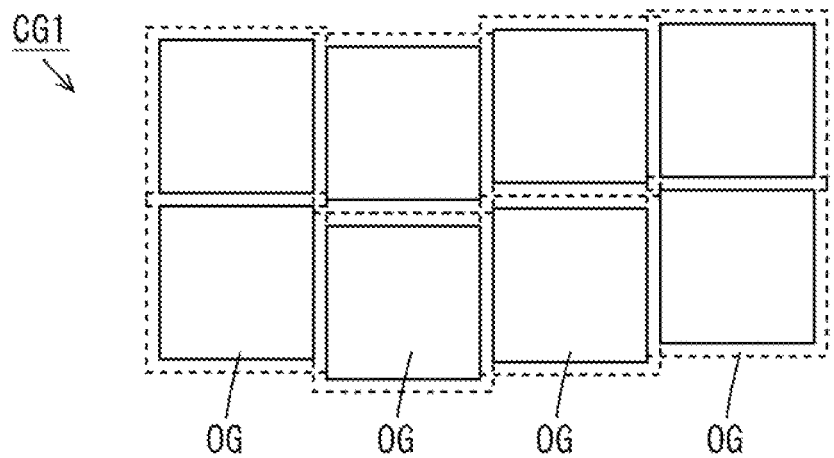
FIGS. 32A to 32C are diagrams visually showing connected image data.
Figure 32B:
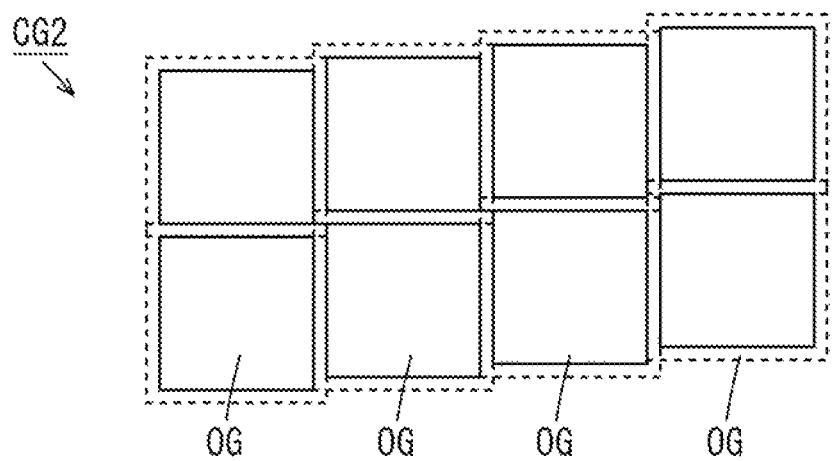
Figure 32C:
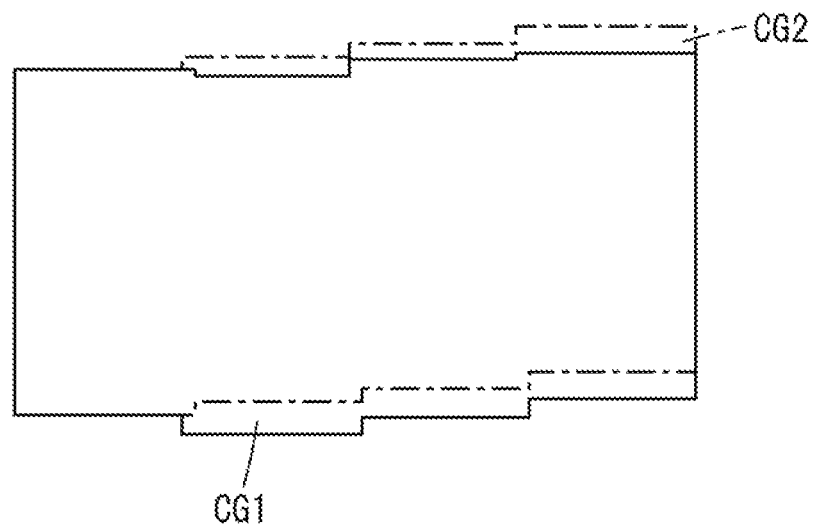
Figure 33A:
FIGS. 33A to 33E are diagrams for explaining connection processing.
Figure 33B:
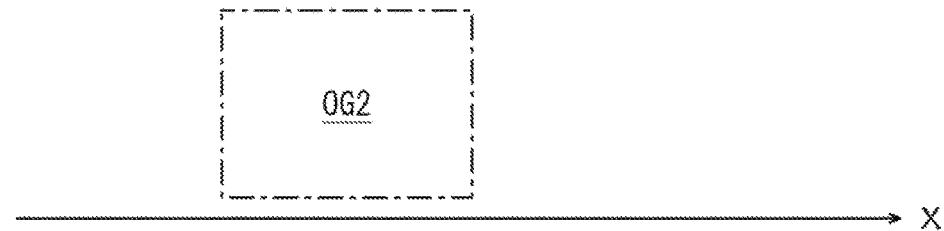
Figure 33C:
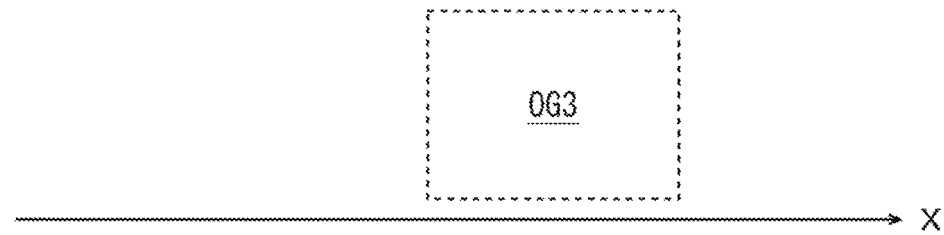
Figure 33D:
Figure 33E:
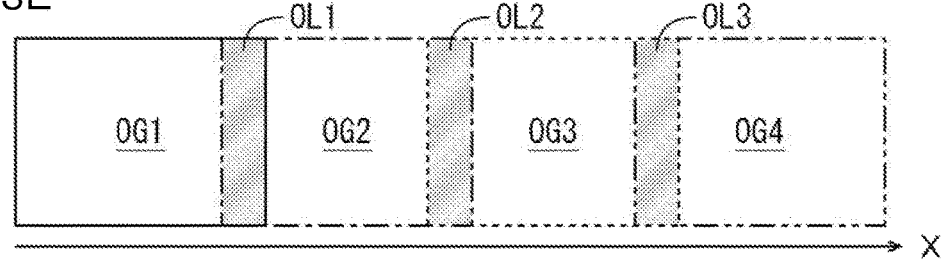

FIGS. 32A to 32C are diagrams visually showing connected image data. Connected image data respectively corresponding to the ring illumination and the plurality of directional illuminations are generated. FIGS. 32A and 32B show connected image data CG1 and CG2 respectively corresponding to any two illuminations among the ring illumination and the plurality of directional illuminations. The connected image data CG1 and CG2 are generated by connecting pluralities of original image data OG adjacent to one another. Overlapping portions serving as overlap widths are provided in the original image data OG adjacent to one another. In FIGS. 32A and 32B, the overlapping portions are indicated by dotted lines.

It is possible to generate image data for display by combining the pluralities of connected image data including the connected image data CG1 and CG2. An irradiating position of illumination and an overlapping portion are sometimes different for each of the connected image data. In this case, as shown in FIG. 32C, the sizes of the pluralities of connected image data do not coincide with one another. In FIG. 32C, the connected image data CG1 and CG2 are respectively indicated by a solid line and an alternate long and short dash line. In such a case, it is difficult to accurately generate image data for display. In order to prevent the difficulty, in this embodiment, connection processing explained below is executed.

The user can give an instruction for the connection processing to the arithmetic processing section 600 by operating the connection button b3 shown in FIG. 12 using the operation section 440 shown in FIG. 1.

FIGS. 33A to 33E are diagrams for explaining the connection processing. As shown in FIGS. 33A to 33D, the stage 121 is sequentially moved in the X direction while the ring illumination is irradiated on the observation target S. The movement of the stage 121 is repeated until all of desired regions of the observation target S are imaged. In this state, original image data OG1, OG2, OG3, and OG4 are sequentially generated by the imaging section 132. In an example shown in FIGS. 33A to 33E, the original image data OG1, OG2, OG3, and OG4 are respectively indicated by a solid line, an alternate long and short dash line, a dotted line, and an alternate long and two short dashes line.

The stage 121 is moved such that parts of the original image data OG1 to OG4 adjacent to one another overlap one another. In the example shown in FIGS. 33A to 33E, overlapping portions OL1, OL2, and OL3 are respectively formed between the original image data OG1 and OG2, between the original image data OG2 and OG3, and between the original image data OG3 and OG4. The overlapping portions OL1 to OL3 serve as overlap widths in connecting the original image data OG1 to OG4 adjacent to one another.

Positions of the stage 121 at the time when the original image data OG1 to OG4 are generated are calculated by the position calculating section 632 shown in FIG. 9. Position information indicating the positions is stored in the storing section 420 shown in FIG. 2. Overlapping region information indicating the overlapping portions OL1 to OL3 among the original image data OG1 to OG4 is stored in the storing section 420. The data generating section 610 shown in FIG. 9 connects the original image data OG1 to OG4 adjacent to one another by performing pattern matching concerning the overlapping portions OL1 to OL3. Consequently, the original image data OG1 to OG4 are connected at high accuracy.

Similarly, the stage 121 is sequentially moved in the X direction while the directional illuminations are irradiated on the observation target S. In this state, a plurality of original image data adjacent to one another in the X direction are sequentially generated by the imaging section 132. The data generating section 610 corrects the positions of the generated original image data on the basis of the position information and the overlapping region information stored in the storing section 420 and connects the original image data adjacent to one another after the correction.

With this procedure of the connection processing, it is possible to connect, at high accuracy, the original image data adjacent to one another corresponding to the directional illuminations without performing the pattern matching. Since it is unnecessary to perform the pattern matching, it is possible to increase the speed of the connection processing. Further, the sizes of the image data after the connection corresponding to the directional illuminations coincide with the sizes of the image data after the connection corresponding to the ring illumination. Consequently, it is possible to easily generate image data for display indicating a region of the observation target S larger than the unit region using a plurality of image data after the connection.

In the connection processing, the plurality of image data after the connection are generated first. The image data for display indicating the region of the observation target S larger than the unit region is generated using the generated plurality of image data after the connection. However, the present invention is not limited to this. Image data for display in a plurality of positions of the stage 121 may be generated first. The image data for display indicating the region of the observation target S larger than the unit region may be generated by connecting the generated plurality of image data for display. In this case, a plurality of image data for display are desirably connected using the pattern matching. The plurality of image data for display are desirably connected using overlapping region information at the time when the ring illumination is emitted.

(b) Example of the Connection Processing

The system program stored in the storing section 420 shown in FIG. 2 includes a connection program. The control section 410 shown in FIG. 2 performs the connection processing by executing the connection program.

Figure 34:
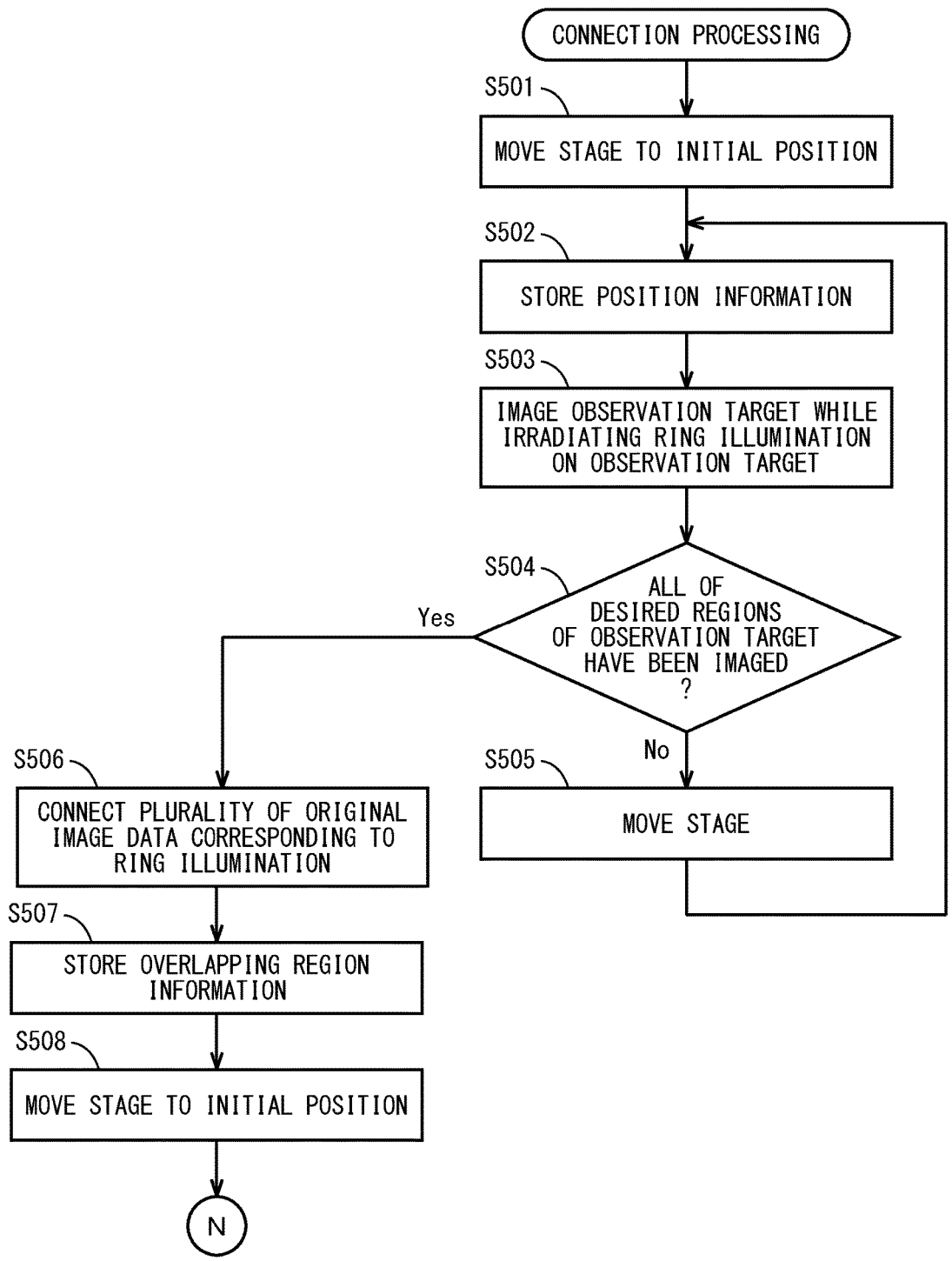
FIG. 34 is a flowchart for explaining an example of the connection processing.
Figure 35:
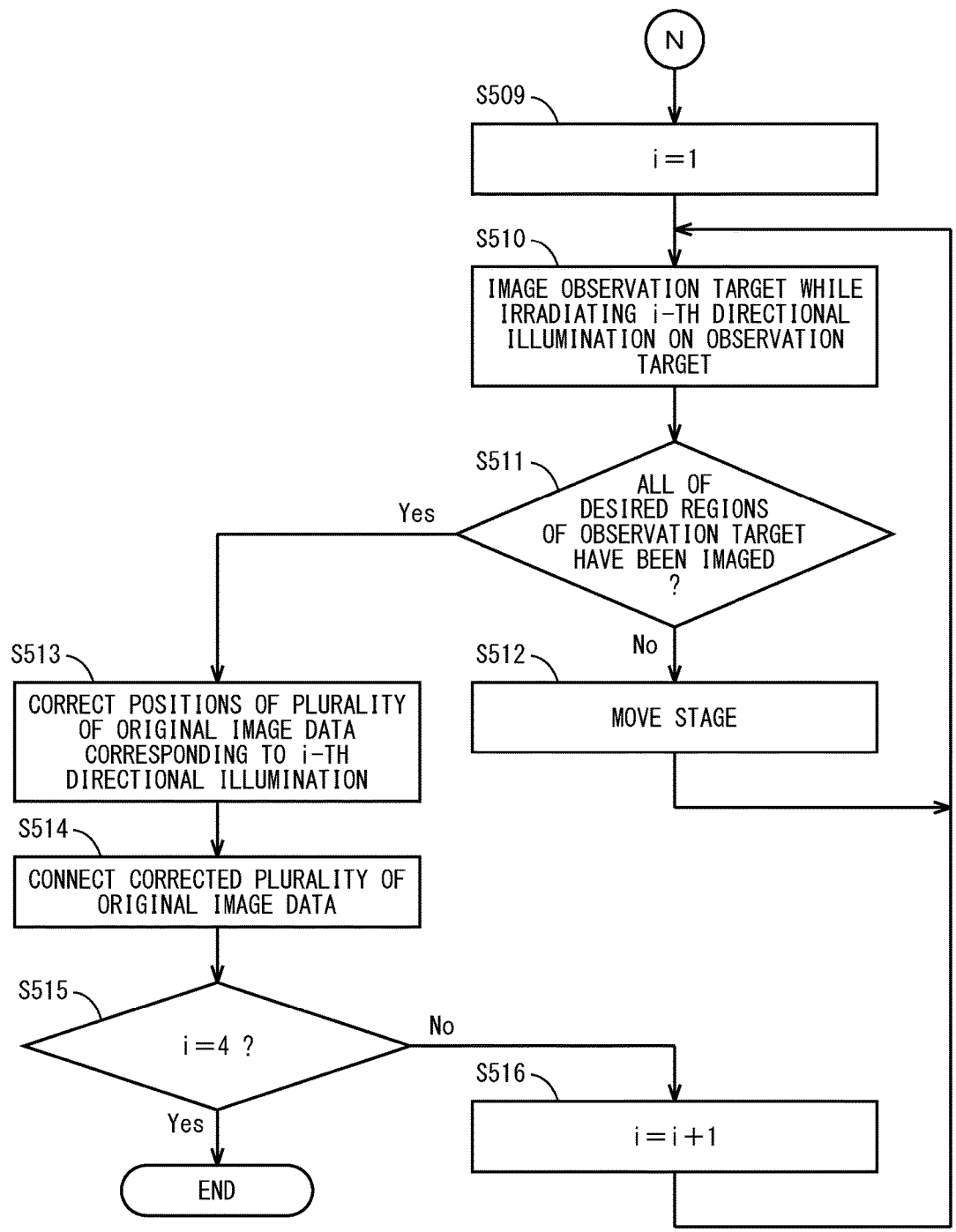
FIG. 35 is a flowchart for explaining the example of the connection processing.

FIGS. 34 and 35 are flowcharts for explaining an example of the connection processing. The control section 410 moves the stage 121 to an initial position (step S501). The control section 410 calculates a position of the stage 121 after the movement and causes the storing section 420 to store position information indicating the position (step S502). Subsequently, the control section 410 irradiates the ring illumination on the observation target S with the light projecting section 140 and images the observation target S with the imaging section 132 (step S503). Subsequently, the control section 410 determines whether all of the desired regions of the observation target S have been imaged in a state in which the ring illumination is irradiated (step S504).

If not all of the desired regions of the observation target S have been imaged in step S504, the control section 410 moves the stage 121 by a predetermined amount (step S505). Thereafter, the control section 410 returns to the processing in step S502. The control section 410 repeats the processing in steps S502 to S505 until all of the desired regions of the observation target S are imaged.

If all of the desired regions of the observation target S have been imaged in step S504, the control section 410 connects a generated plurality of original image data corresponding to the ring illumination (step S506). The control section 410 causes the storing section 420 to store overlapping region information indicating overlapping regions at the time when the original image data adjacent to one another are connected (step S507).

Thereafter, the control section 410 moves the stage 121 to the initial position (step S508). Subsequently, the control section 410 sets i to 1 (step S509). In this step, i indicates numbers of a plurality of directional illuminations. Subsequently, the control section 410 irradiates the i-th directional illumination on the observation target S with the light projecting section 140 and images the observation target S with the imaging section 132 (step S510). Subsequently, the control section 410 determines whether all of the desired regions of the observation target S have been imaged in a state in which the i-th directional illumination is irradiated (step S511).

If not all of the desired regions of the observation target S have been imaged in step S511, the control section 410 moves the stage 121 by a predetermined amount (step S512). Thereafter, the control section 410 returns to the processing in step S510. The control section 410 repeats the processing in steps S510 to S512 until all of the desired regions of the observation target S are imaged.

If all of the desired regions of the observation target S have been imaged in step S511, the control section 410 corrects the positions of a generated plurality of original image data corresponding to the i-th directional illumination on the basis of the position information and the overlapping region information stored in the storing section 420 (step S513). The control section 410 connects the corrected plurality of original image data (step S514).

Subsequently, the control section 410 determines whether i is 4 (step S515). If i is not 4 in step S515, the control section 410 updates i to i+1 (step S516). Thereafter, the control section 410 returns to the processing in step S510. The control section 410 repeats the processing in steps S510 to S516 until i reaches 4. Consequently, a plurality of original image data corresponding to the respective first to fourth directional illuminations are generated. The plurality of original image data are connected on the basis of the position information and the overlapping region information stored in the storing section 420. If i is 4 in step S515, the control section 410 ends the processing.

In the above explanation, a part of the processing may be performed at another point in time. For example, the processing in steps S506 and S507 may be executed in parallel to steps S508 to S512. The processing in steps S513 and S514 corresponding to the i-th directional illumination may be executed in parallel to steps S510 to S512 corresponding to the (i+1)-th directional illumination. In these cases, it is possible to increase the speed of the connection processing.

Alternatively, the processing in steps S506 and S507 may be executed later than the processing in steps S508 to S512. The processing insteps S513 and S514 corresponding to the i-th directional illumination may be executed later than the processing in steps S510 to S512 corresponding to the (i+1)-th directional illumination.

(c) Another Example of the Connection Processing

Figure 36:
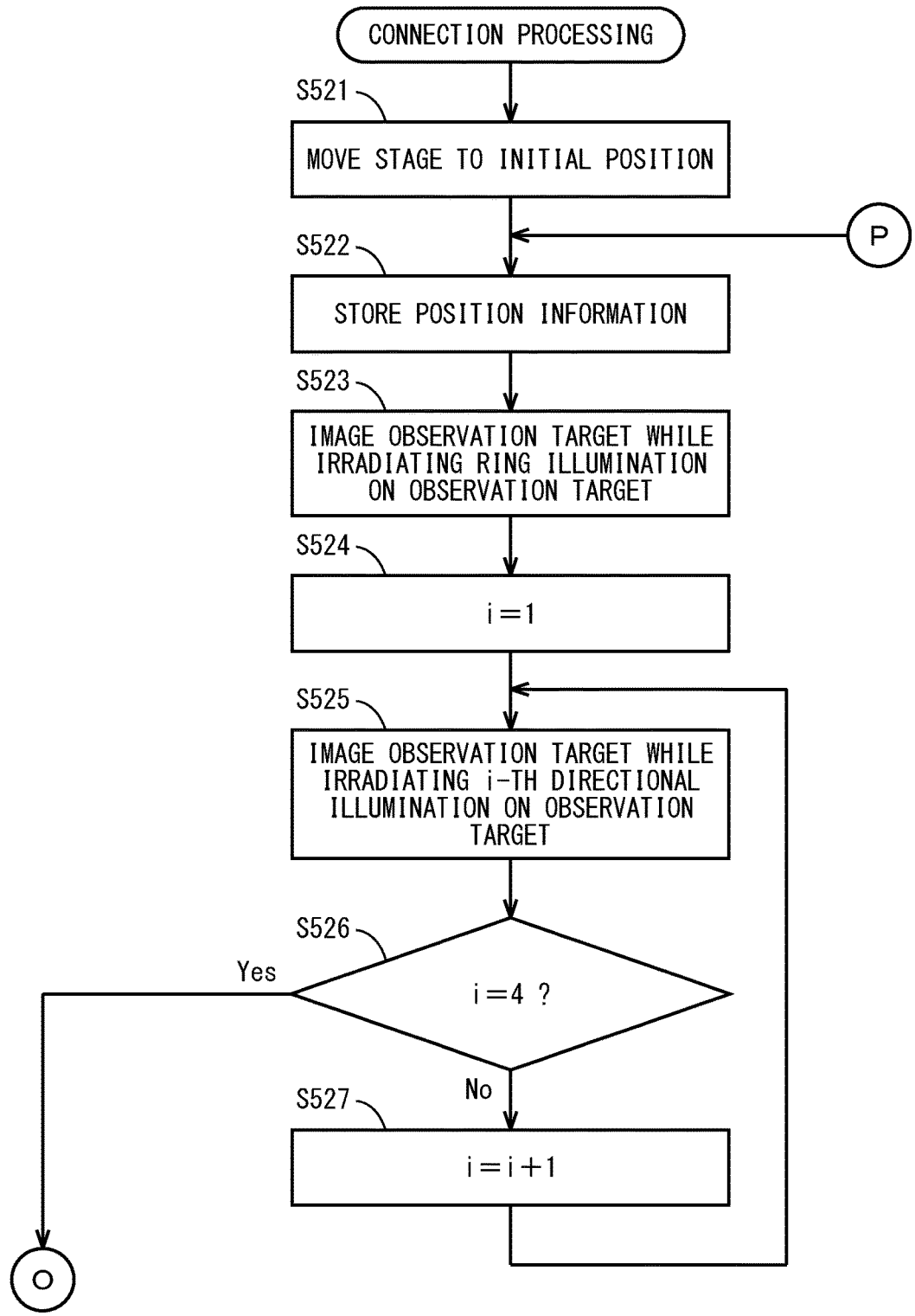
FIG. 36 is a flowchart for explaining another example of the connection processing.
Figure 37:
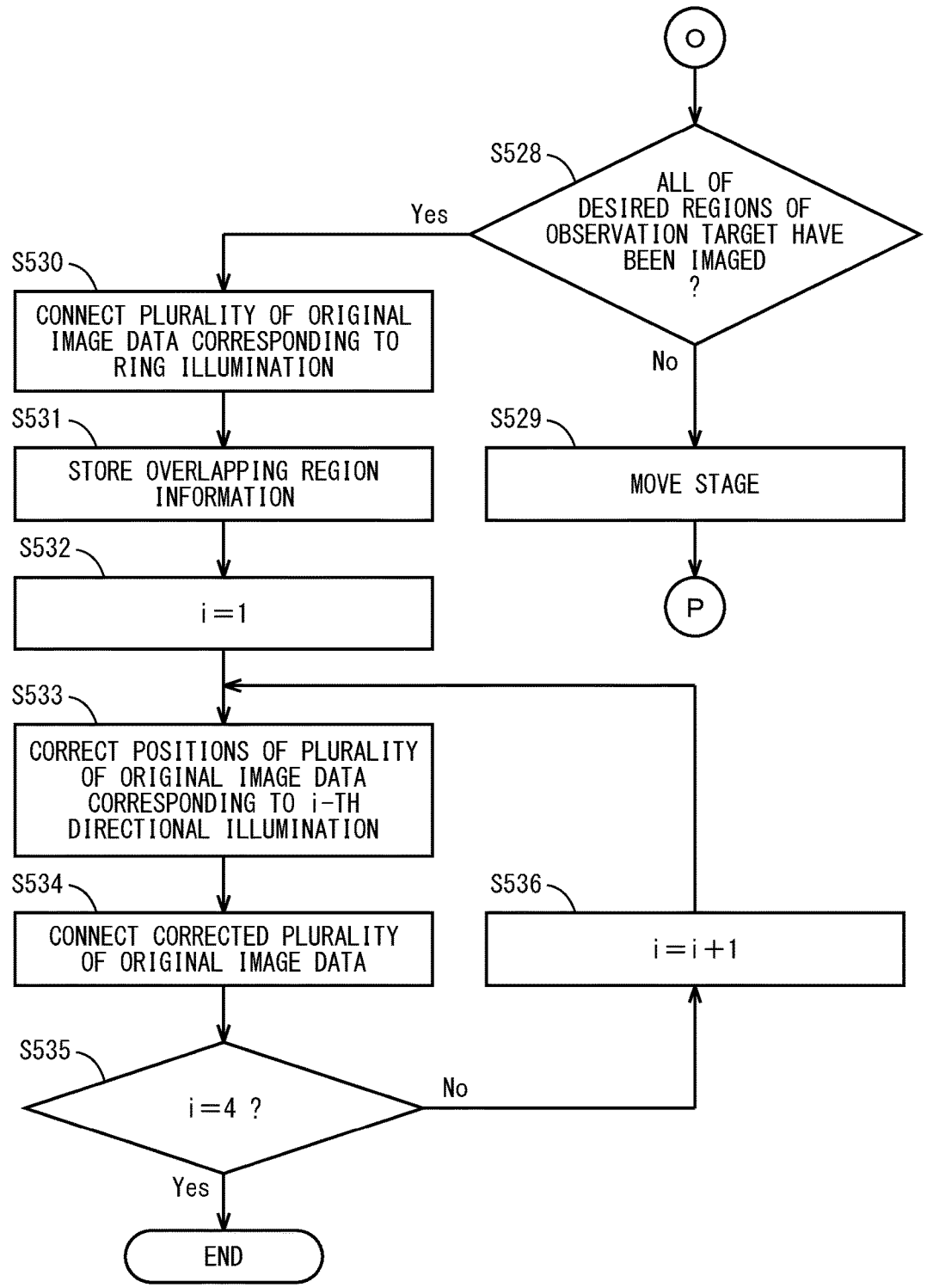
FIG. 37 is a flowchart for explaining the other example of the connection processing.
Figure 38A:
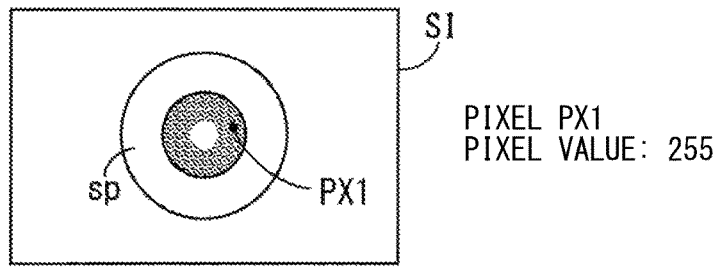
FIGS. 38A to 38E are diagrams showing examples in which halation occurs in a part of a plurality of images of the observation target acquired by the plural illumination imaging.
Figure 38B:
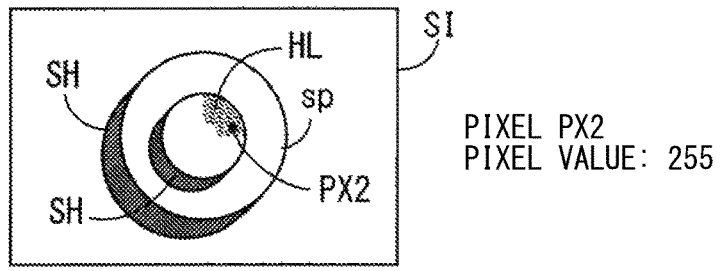
Figure 38C:
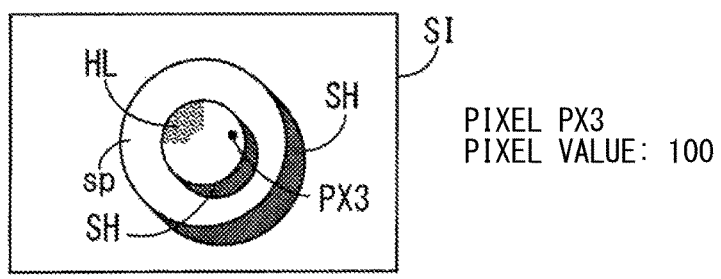
Figure 38D:
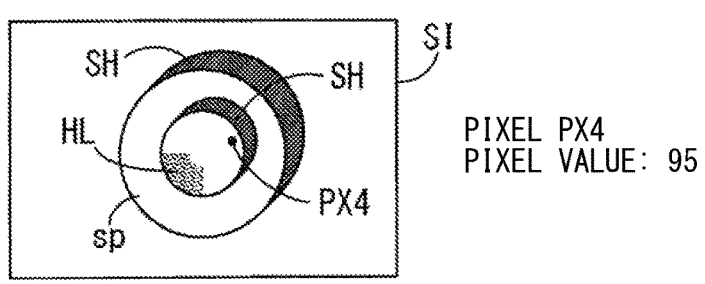
Figure 38E:
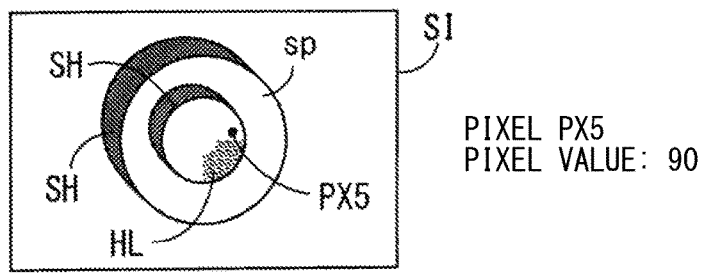

FIGS. 36 and 37 are flowcharts for explaining another example of the connection processing. The control section 410 moves the stage 121 to the initial position (step S521). The control section 410 calculates a position of the stage 121 after the movement and causes the storing section 420 to store position information indicating the position (step S522). Subsequently, the control section 410 irradiates the ring illumination on the observation target S with the light projecting section 140 and images the observation target S with the imaging section 132 (step S523).

Subsequently, the control section 410 sets i to 1 (step S524). In this step, i indicates numbers of a plurality of directional illuminations. Thereafter, the control section 410 irradiates the i-th directional illumination on the observation target S with the light projecting section 140 and images the observation target S with the imaging section 132 (step S525). Subsequently, the control section 410 determines whether i is 4 (step S526).

If i is not 4 in step S526, the control section 410 updates i to i+1 (step S527). Thereafter, the control section 410 returns to the processing in step S525. The control section 410 repeats the processing in steps S525 to S527 until i becomes 4. Consequently, pluralities of original image data corresponding to the respective first to fourth directional illuminations are generated. If i is 4 in step S526, the control section 410 determines whether all of the desired regions of the observation target S have been imaged (step S528).

If not all of the desired regions of the observation target S have been imaged in step S528, the control section 410 moves the stage 121 by a predetermined amount (step S529). Thereafter, the control section 410 returns to the processing in step S522. The control section 410 repeats the processing in steps S522 to S528 until all of the desired regions of the observation target S are imaged.

If all of the desired regions of the observation target S have been imaged in step S528, the control section 410 connects a generated plurality of original image data corresponding to the ring illumination (step S530). The control section 410 causes the storing section 420 to store overlapping region information indicating overlapping regions at the time when the original image data adjacent to one another are connected (step S531).

Subsequently, the control section 410 sets i to 1 again (step S532). Thereafter, the control section 410 corrects the positions of a generated plurality of original image data corresponding to the i-th directional illumination on the basis of the position information and the overlapping region information stored in the storing section 420 (step S533). The control section 410 connects the corrected plurality of original image data (step S534). Subsequently, the control section 410 determines whether i is 4 (step S535).

If i is not 4 in step S535, the control section 410 updates i to i+1 (step S536). Thereafter, the control section 410 returns to the processing in step S533. The control section 410 repeats the processing in steps S533 to S536 until i reaches 4. Consequently, pluralities of original image data corresponding to the respective first to forth directional illuminations are connected on the basis of the position information and the overlapping region information stored in the storing section 420. If i is 4 in step S535, the control section 410 ends the processing.

In the above explanation, a part of the processing may be performed at another point in time. For example, a part of the processing in steps S530 to S536 may be executed in parallel to the processing in steps S521 to S529. In this case, it is possible to increase the speed of the connection processing. The processing in step S523 may be executed later than the processing in steps S524 to S527.

(6) Halation Reduction Processing (a) Specific Content of the Halation Reduction Processing As explained above, in the present invention, a plurality of original image data are generated. Consequently, it is possible to generate image data for display. On the other hand, the generated plurality of original image data can also be used for use other than the generation of the image data for display. As an example of the use of the plurality of original image data, there is generation of image data with reduced halation. Halation reduction processing is explained below.

Values (pixel values) of a plurality of pixel data generated in the imaging section 132 change according to an intensity distribution of lights made incident on a plurality of pixels. When light having high intensity is made incident on the imaging section 132, a pixel value output from a pixel that receives the light having the high intensity reaches an upper limit value of a detectable value (saturates). Consequently, halation (white void) occurs in the image SI of the observation target S.

FIGS. 38A to 38E are diagrams showing an example in which halation occurs in a part of a plurality of images SI of the observation target S acquired by the plural illumination imaging. In FIGS. 38A to 38E, a plurality of images SI of the observation target S respectively corresponding to the ring illumination and the first to fourth directional illuminations are respectively shown. Halation HL that occurs in the images SI is indicated by a dot pattern.

As shown in FIGS. 38A to 38E, an occurrence position of the halation HL and occurrence positions of the shadows SH greatly depend on an emitting direction of light irradiated on the observation target S. Depending on the shape and the like of the observation target S, even if an imaginary emitting direction of light is changed, it is sometimes difficult to reduce halation in the image SI displayed in the main display region 432.

The user operates the halation button b4 shown in FIG. 12 using the operation section 440 shown in FIG. 1. Consequently, the user can give an instruction for the halation reduction processing to the control section 410.

In the halation reduction processing, on the basis of a plurality of original image data generated by the plural illumination imaging, saturation reduced image data with a halation component reduced compared with the original image data is generated as image data for display. Details of the halation reduction processing are explained.

In the following explanation, it is assumed that an upper limit value of a pixel value is "255" and a lower limit value of the pixel value is "0". In this case, the position of a pixel indicating the pixel value "255" corresponds to the occurrence position of the halation HL and the position of a pixel indicating the pixel value "0" corresponds to the occurrence positions of the shadows SH.

In the halation reduction processing, the magnitudes of pixel values are compared for each of a plurality of pixels corresponding to one another of the plurality of original image data. Ranks are given to the plurality of pixels on the basis of the magnitudes of the pixel values. For example, as shown in FIGS. 38A to 38E, it is assumed that pixel values of a plurality of pixels PX1, PX2, PX3, PX4, and PX5 corresponding to one another of the plurality of images SI are respectively "255", "255", "100", "95", and "90".

In this case, first and second ranks are respectively given to the pixels PX1 and PX2 indicating the highest pixel value "255". A third rank is given to the pixel PX3 indicating the next highest pixel value "100". A fourth rank is given to the pixel PX4 indicating the pixel value "95". A fifth rank is given to the pixel PX5 indicating the lowest pixel value "90".

In this embodiment, during the start of the halation reduction processing, selection order is designated on the basis of operation of the operation section 440 shown in FIG. 1 by the user. Numbers that can be designated as the selection order are natural numbers equal to or smaller than a total number of illuminations irradiated on the observation target S by the plural illumination imaging. After the ranks are given to the plurality of pixels PX1 to PX5, one pixel among the plurality of pixels PX1 to PX5 is selected on the basis of the selection order. For example, when the selection order is designated as "3" by the user, the third pixel PX3 among the plurality of pixels PX1 to PX5 is selected.

In this way, the selection of the pixel based on the magnitude of the pixel value is performed concerning all of the pixels of the plurality of images SI. Thereafter, saturation reduced image data is generated by combining the selected plurality of pixels.

In the image SI of the observation target S based on the saturation reduced image data, a reduction degree of the halation component changes according to a value of the selection order. For example, when the selection order is designated as "1", a pixel having a highest pixel value among a plurality of pixels corresponding to one another is selected. In this case, all pixels indicating a saturated pixel value "255" are selected. Therefore, the halation component is not reduced.

When the selection order is designated as "3", a pixel indicating an intermediate pixel value among the plurality of pixels corresponding to one another is selected. In this case, possibility that a pixel indicating the pixel value "255" is selected is low. Therefore, saturation reduced image data with the halation component reduced to an intermediate degree compared with the original image data is generated.

When the selection order is designated as "5", a pixel indicating a lowest pixel value among the plurality of pixels corresponding to one another is selected. In this case, the possibility that the pixel indicating the pixel value "255" is selected is extremely low. Therefore, saturation reduced image data with the halation component more greatly reduced compared with the original image data is generated. Note that, when the selection order is designated as "5", a pixel having a lowest pixel value among the plurality of pixels corresponding to one another is selected. In this case, all pixels indicating the pixel value "0" are selected. Therefore, the shadows SH and black solid easy occur. The image SI is dark as a whole.

As explained above, the reduction degree of the halation component in the halation reduction processing decreases as the value of the selection order decreases. The reduction degree increases as the value of the selection order increases. Therefore, the user can adjust the reduction degree of the halation component and the overall brightness of the image SI by designating the selection order.

Figure 39:
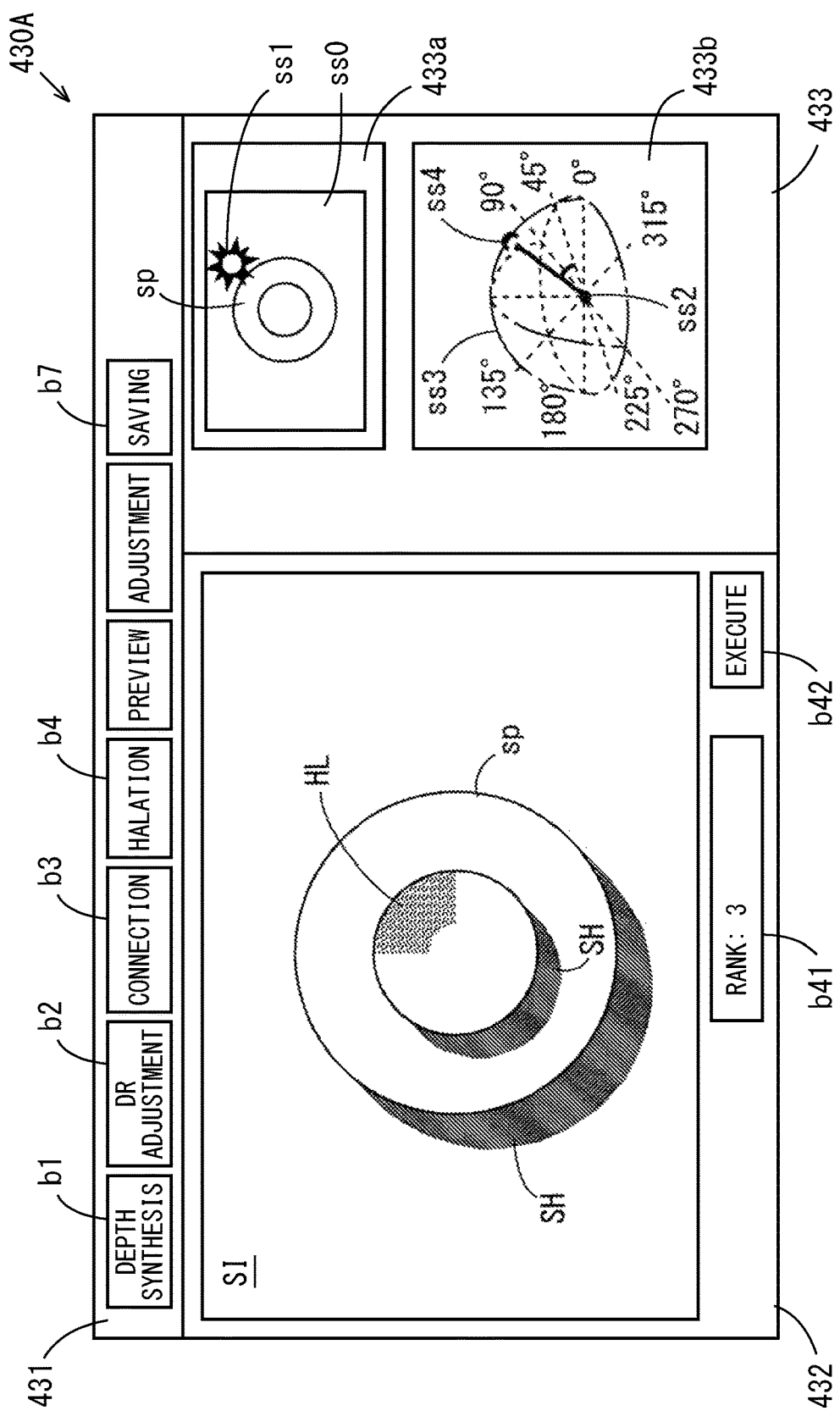
FIG. 39 is a diagram showing an example of a display state of the observation screen at the time when halation reduction processing is instructed.

FIG. 39 is a diagram showing an example of a display state of the observation screen 430A at the time when the halation reduction processing is instructed. When the halation reduction processing is instructed, an order designation field b41 and an execution button b42 are displayed in the main display region 432 together with the image SI of the observation target S.

The user can input desired selection order to the order designation field b41 using the operation section 440 shown in FIG. 1. The user can designate the selection order input to the order designation field b41 by operating the execution button b42 using the operation section 440 shown in FIG. 1.

Figure 40:
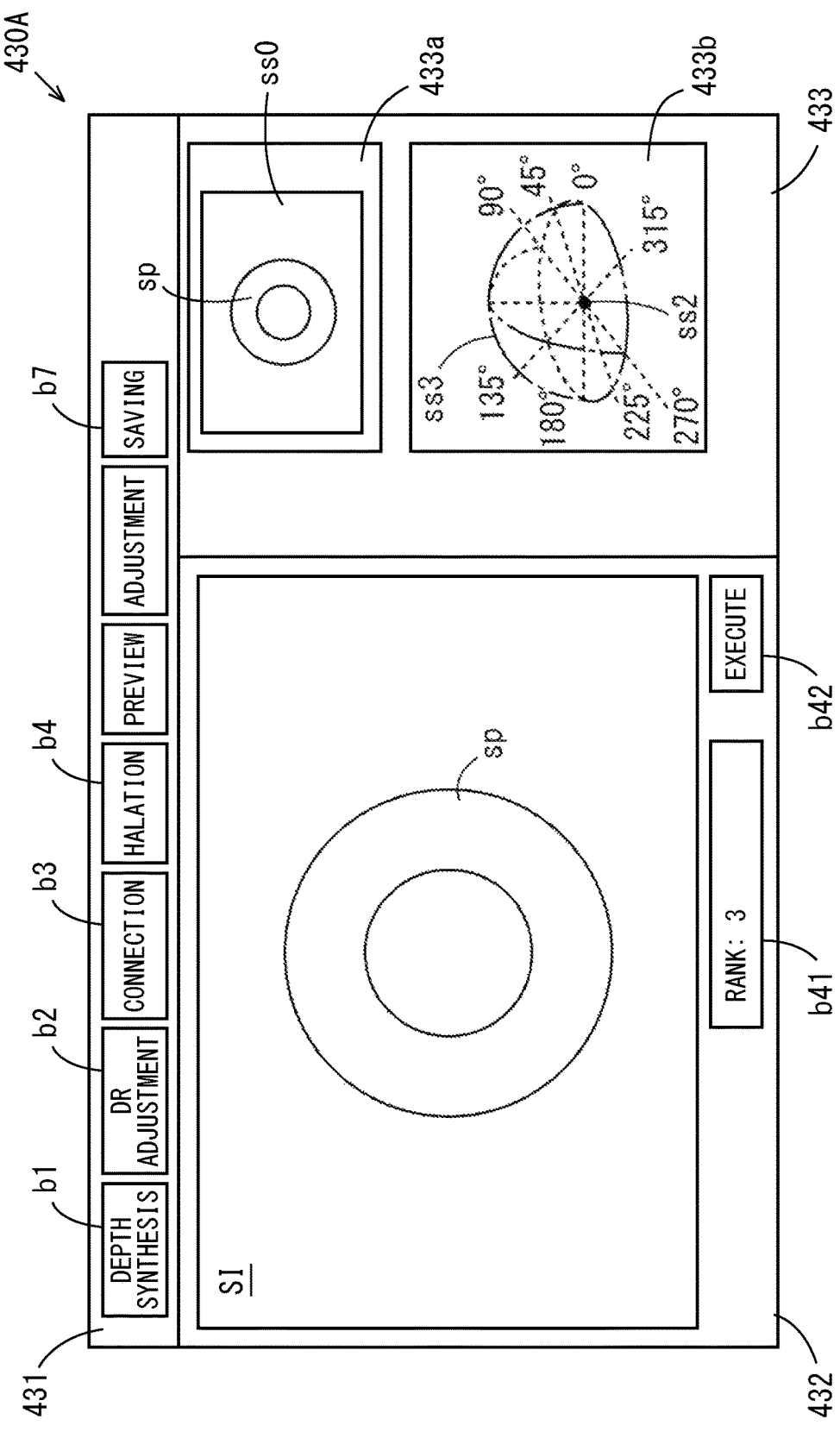
FIG. 40 is a diagram showing an example of a display state of the observation screen after the halation reduction processing.

Saturation reduced image data is generated by operating the execution button b42 shown in FIG. 39. FIG. 40 is a diagram showing an example of a display state of the observation screen 430A after the halation reduction processing. As shown in FIG. 40, the image SI of the observation target S based on the saturation reduced image data is displayed in the main display region 432.

With the halation reduction processing, the saturation reduced image data with the reduced halation component is generated on the basis of the plurality of original image data acquired by the plural illumination imaging. Therefore, it is possible to acquire, in a short time, the image SI of the observation target S with the reduced halation component.

The halation reduction processing is executed on the basis of the five original image data generated by the plural illumination imaging processing. However, the present invention is not limited to this. The halation reduction processing may be executed on the basis of two original image data captured by illuminations in two emitting directions different from each other, may be executed on the basis of three original image data captured by illuminations in three emitting directions different from one another, or may be executed on the basis of four original image data captured by illuminations in four emitting directions different from one another. Further, the halation reduction processing may be executed on the basis of five or more original image data captured by five or more illuminations in emitting directions of light different from one another. In these cases, numbers that can be designated as the selection order are natural numbers equal to or smaller than the number of original image data used for the halation reduction processing.

In the halation reduction processing, the ranks are given in the descending order of the pixel values concerning the plurality of pixels corresponding to one another of the plurality of original image data. However, the present invention is not limited to this. The ranks may be given in an ascending order of the pixel values concerning the plurality of pixels corresponding to one another of the plurality of original image data.

Emitting positions of lights corresponding to two directional illuminations among the plurality of directional illuminations corresponding to the plurality of original image data used in the halation reduction processing are desirably disposed to be opposed to each other across the optical axis A1 of the objective lens 131a. Consequently, emitting directions of lights of two illuminations irradiated on the observation target S are greatly different. Therefore, it is less likely that a halation component common to two original image data corresponding to the two directional illuminations occurs. Therefore, it is possible to generate saturation reduced image data with a further reduced halation component.

In the example explained above, the halation reduction processing is executed on the basis of the five original image data generated by the plural illumination imaging processing. However, the present invention is not limited to this. Imaging by the plurality of directional illuminations may be continuously repeatedly executed. The saturation reduced image data may be generated every time the original image data is generated. Every time the saturation reduced image data is generated, the image SI of the observation target S based on the generated saturation reduced image data may be updated on the display unit 430.

Figure 41:
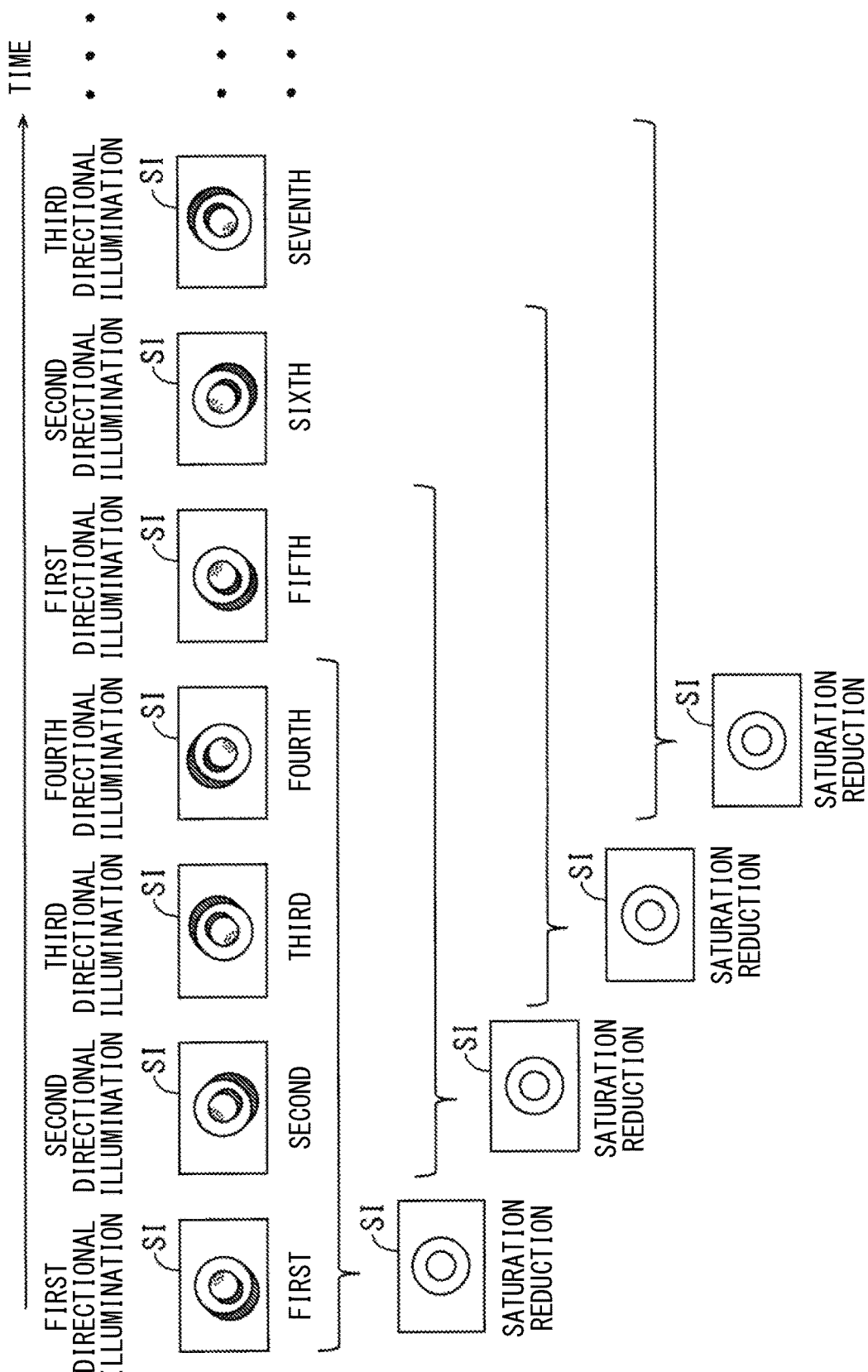
FIG. 41 is a conceptual diagram of the halation reduction processing for generating saturation reduced image data every time original image data is generated while repeatedly executing imaging by a plurality of directional illuminations.

FIG. 41 is a conceptual diagram of the halation reduction processing for generating saturation reduced image data every time original image data is generated while repeatedly executing the imaging by the plurality of directional illuminations. As shown at the top of FIG. 41, in this example, original image data respectively corresponding to the first to fourth directional illuminations are sequentially repeated generated according to the elapse of time.

The control section 410 executes the halation reduction processing on the basis of first to fourth four original image data and selection order designated in advance at a point in time when fourth original image data from an initial state is generated. Consequently, the image SI based on saturation reduced image data with the reduced halation component is displayed on the display section 430.

Thereafter, every time new n (n is a natural number equal to or larger than 5)-th original image data is generated, the control section 410 executes the halation reduction processing on the basis of (n−3)-th to n-th four original image data. Consequently, the image SI displayed on the display section 430 is updated on the basis of new saturation reduced image data.

In this case, the image SI of the observation target S with the reduced halation component is displayed on the display section 430 on a real time basis. Therefore, the user can easily perform, for example, adjustment of a light reception time of the imaging section 132 while visually recognizing the image SI of the observation target S.

When the image SI with the reduced halation component is displayed on a real time basis as explained above, an updating operation for the image SI of the observation target S may be stopped in a specific period.

For example, when there is no change in a plurality of original image data generated at a fixed cycle by the same directional illumination, it is highly likely that the adjustment of the imaging information and the illumination conditions is stopped. Therefore, when no change of images is recognized among a predetermined number of original image data generated at the fixed cycle by the same directional illumination, the updating operation for the image SI may be stopped. After the updating operation for the image SI of the observation target S is stopped, when a change of images is recognized between two original image data generated by the same directional illumination, the updating operation may be resumed. In this case, in a state in which the updating operation is stopped, a flicker of the image SI of the observation target S displayed on the display section 430 is prevented.

In the example explained above, the order designation field b41 is displayed on the observation screen 430A for the user to designate the selection order. However, the present invention is not limited to this. Instead of the order designation field b41, a bar indicating the selection order as the brightness of an image and a slider for designating the selection order on the bar may be displayed on the observation screen 430A. In this case, the user can designate the selection order by operating the slider.

In the example explained above, the selection order is set on the basis of the designation by the user. However, the present invention is not limited to this. The selection order may be set in advance by the manufacturer of the magnifying observation apparatus 1 during factory shipment of the magnifying observation apparatus 1 instead of being set by the user.

When at least a part of the plurality of original image data includes a halation component, it is likely that a highest value among a plurality of pixel values respectively indicated by the plurality of pixels corresponding to one another of the plurality of original image data is saturated. When the selection order is set in advance, the selection order is desirably set such that a pixel indicating a pixel value excluding the highest value is selected. In this case, the pixel indicating the pixel value excluding the highest pixel value is selected from the plurality of pixels corresponding to one another of the plurality of original image data Therefore, a pixel indicating a saturated pixel value is less easily selected. Therefore, image data for display with a reduced halation component is generated.

In the halation reduction processing, the control section 410 may select one pixel on the basis of pixel values of the plurality of pixels without using the selection order instead of selecting, on the basis of the selection order, one pixel from the plurality of pixels corresponding to one another. Specifically, the control section 410 may select any pixel among the plurality of pixels when all of the plurality of pixel values of the plurality of pixels corresponding to one another are saturated. When a part of the plurality of pixel values are saturated and the remaining pixel values are not saturated, the control section 410 may select any pixel among pixels indicating the unsaturated pixel values. Further, when not all of the plurality of pixels are saturated, the control section 410 may select any pixel among pixels indicating the unsaturated pixel values.

The halation reduction processing according to this embodiment is executed by the user instructing the halation reduction processing after the plural illumination imaging processing. However, the present invention is not limited to this. For example, the control section 410 of the magnifying observation apparatus 1 may be configured to be operable in one of a normal mode and a halation reduction mode in response to selection of an operation mode by the user. In this case, in the normal mode, the control section 410 may execute the halation reduction processing in response to an instruction for the halation reduction processing by the user. On the other hand, in the halation reduction mode, the control section 410 may determine whether a halation component is present in image data generated by imaging and execute the halation reduction processing when the halation component is present.

(b) Example of the Halation Reduction Processing

The system program stored in the storing section 420 shown in FIG. 2 includes a halation reduction program. The control section 410 shown in FIG. 2 performs the halation reduction processing by executing the halation reduction program.

Figure 42:
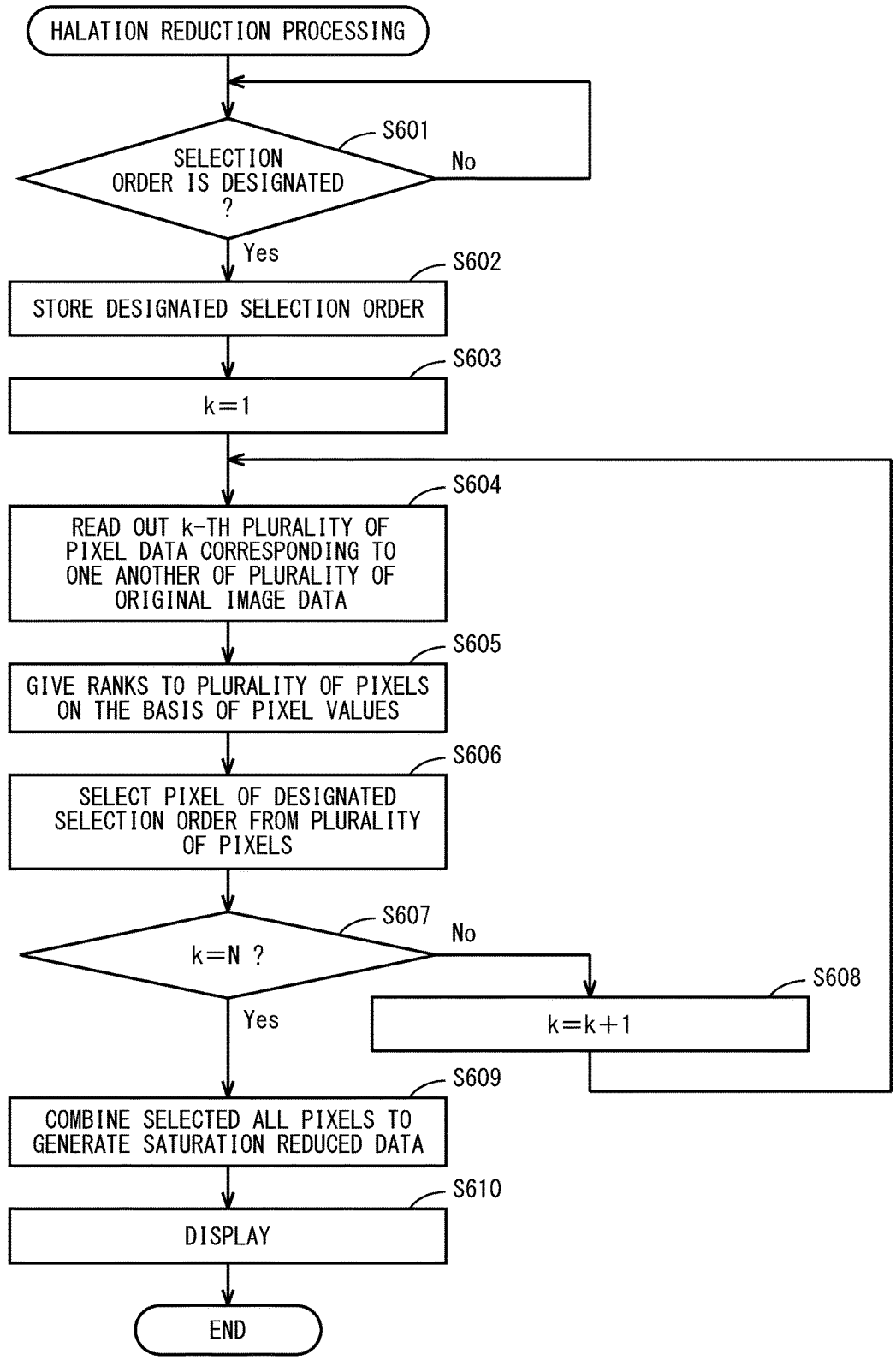
FIG. 42 is a flowchart for explaining an example of the halation reduction processing.

FIG. 42 is a flowchart for explaining an example of the halation reduction processing. The halation reduction processing is started in response to an instruction for the halation reduction processing by the user. When the halation reduction processing is started, the control section 410 determines whether selection order is designated (step S601). Note that, when the selection order is set in advance, the control section 410 can omit the processing in step S601.

If the selection order is not designated, the control section 410 repeats the processing in step S601 until the selection order is designated. If the selection order is designated, the control section 410 causes the storing section 420 to store the designated selection order (step S602) and sets k to 1 (step S603).

Subsequently, the control section 410 reads out a k-th plurality of pixel data corresponding to one another of a plurality of original image data (step S604). The control section 410 gives, on the basis of pixel values of the read-out plurality of pixel data, ranks respectively to a plurality of pixels indicating the pixel values (step S605). Therefore, the control section 410 selects a pixel of the designated selection order from the plurality of pixels (step S606).

Subsequently, the control section 410 determines whether k is a value N representing the number of all pixels of the imaging section 132 (step S607). If k is not the value N, the control section 410 updates k to k+1 (step S608) and returns to the processing in step S604. On the other hand, if k is the value N, the control section 410 combines all pixels selected by the repetition of the processing in steps S604 to S608 to generate saturation reduced image data (step S609).

Finally, the control section 410 causes the display section 430 to display, in the main display region 432, the image SI of the observation target S based on the saturation reduced image data (step S610).

Figure 43A:
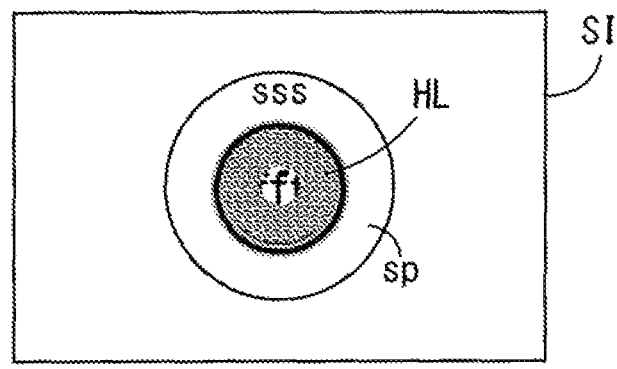
FIGS. 43A to 43C are diagrams showing a use example in which the halation reduction processing and the depth synthesis processing are used in combination.
Figure 43B:
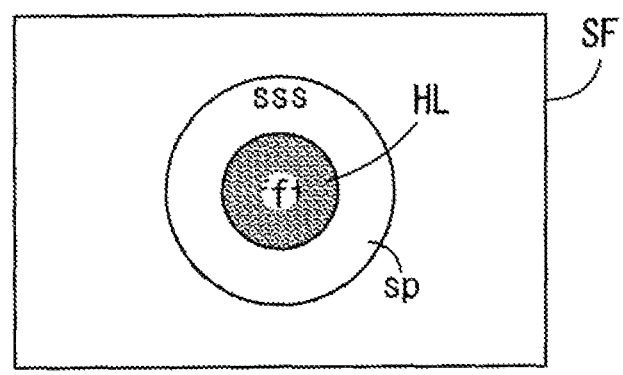
Figure 43C:
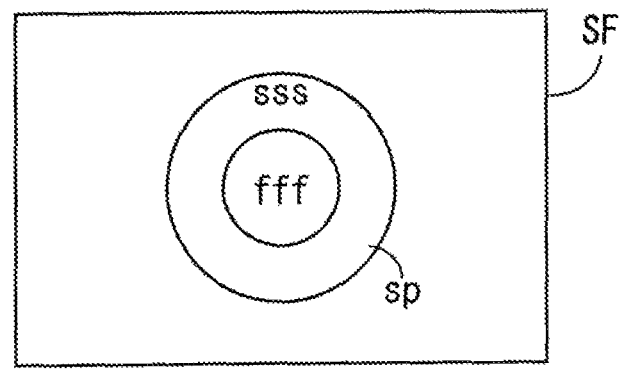

(c) Combination of the Halation Reduction Processing and the Depth Synthesis Processing The user may use the halation reduction processing and the depth synthesis processing in combination. FIGS. 43A to 43C are diagrams showing a use example in which the halation reduction processing and the depth synthesis processing are used in combination. In FIG. 43A, an example of the image SI of the observation target S based on original image data captured by the ring illumination is shown. In the observation target S in this example, character strings "sss" and "fff" are added to a part of the upper surface.

In the image SI shown in FIG. 43A, the halation HL occurs on a target partial image sp. In the image SI shown in FIG. 43A, light is not focused on a part of the observation target S. Therefore, a part of the observation target S cannot be observed in detail. Therefore, the user instructs the depth synthesis processing. In this case, the control section 410 executes the depth synthesis processing and generates a plurality of depth synthesis image data respectively corresponding to the ring illumination and the first to fourth directional illuminations.

In FIG. 43B, an example of the depth synthesis image SF corresponding to the ring illumination is shown. In the depth synthesis image SF shown in FIG. 43B, light is focused over the entire observation target S. However, the halation HL is present on the target partial image sp. Therefore, the user instructs the halation reduction processing. In this case, the control section 410 executes the halation reduction processing using at least two or more depth synthesis image data among the plurality of depth synthesis image data generated by the depth synthesis processing and generates saturation reduced image data.

In FIG. 43C, an example of the depth synthesis image SF with a reduced halation component is shown. In the image SI shown in FIG. 43C, light is focused over the entire observation target S. The halation HL is absent on the target partial image sp.

By using the halation reduction processing and the depth synthesis processing in combination in this way, it is possible to observe an image of the observation target S in which portions of the observation target S are focused and the halation component is reduced.

When the halation reduction processing and the depth synthesis processing are used in combination, the order of processing is not limited to the example explained above. For example, it is also possible that a plurality of original image data respectively corresponding to a plurality of positions in the Z direction of the lens unit 131 are generated, and, thereafter, a plurality of saturation reduced image data respectively corresponding to the plurality of positions in the Z direction are generated and one depth synthesis image data is generated on the basis of the generated plurality of saturation reduced image data.

Note that the processing obtained by combining the halation reduction processing and the depth synthesis processing may be manually executed according to an instruction for the kinds of processing by the user or may be automatically executed according to processing order decided in advance.

(d) Combination of the Halation Reduction Processing and the DR Adjustment Processing In the halation reduction processing, when all of pixel values of portions corresponding to one another of the plurality or original image data used in the halation reduction processing are saturated, halation corresponding to the portions cannot be removed. On the other hand, in the DR adjustment processing, when light having excessively high intensity is made incident on a portion of the plurality of pixels of the imaging section 132, even if a dynamic range is adjusted, in some case, a pixel value of the portion cannot be reduced to be lower than an upper limit value. In this case, halation corresponding to the portion cannot be removed. Therefore, the user may use the halation reduction processing and the DR adjustment processing in combination.

Figure 44A:
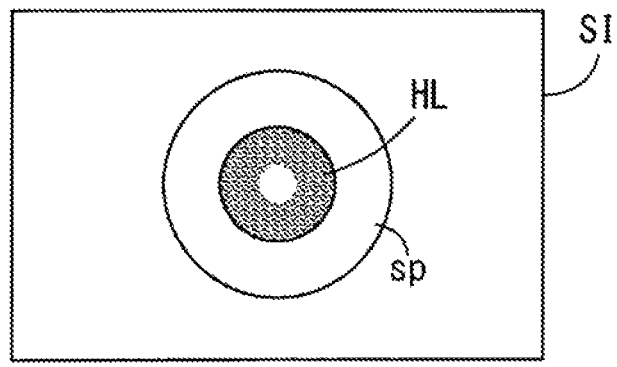
FIGS. 44A to 44C are diagrams showing a use example in which the halation reduction processing and the DR adjustment processing are used in combination.
Figure 44B:
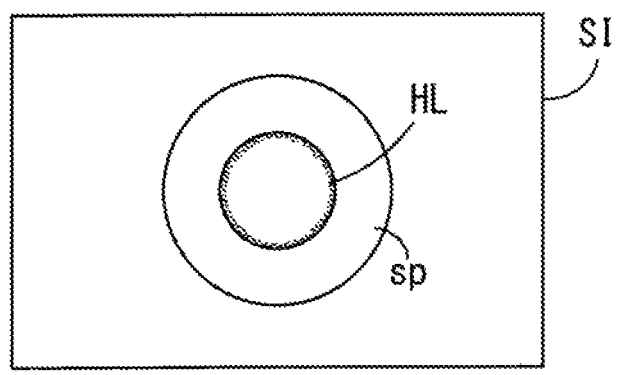
Figure 44C:
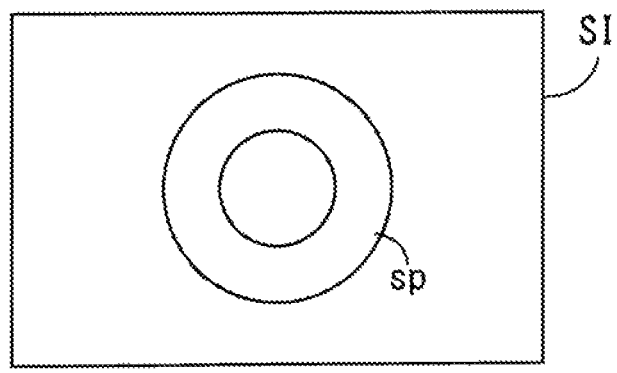

FIGS. 44A to 44C are diagrams showing a use example in which the halation reduction processing and the DR adjustment processing are used in combination. In FIG. 44A, an example of the image SI of the observation target S based on original image data captured by the ring illumination is shown. In the image SI shown in FIG. 44A, the halation HL occurs over a wide range on the target partial image sp. Therefore, the user instructs the DR adjustment processing. In this case, the control section 410 executes the DR adjustment processing and adjusts a dynamic range of a plurality of original image data.

In FIG. 44B, an example of the image SI corresponding to the ring illumination, a dynamic range of which is adjusted, is shown. In the image SI shown in FIG. 44B, the halation HL shown in FIG. 44A is not completely removed. The halation HL is slightly present on the target partial image sp. Therefore, the user instructs the halation reduction processing. In this case, the control section 410 executes the halation reduction processing using at least two or more original image data among the plurality of original image data, the dynamic range of which is adjusted, and generates saturation reduced image data.

In FIG. 44C, an example of the image SI after the halation reduction processing is shown. In the image SI shown in FIG. 44C, the halation HL shown in FIG. 44B is removed.

By using the halation reduction processing in combination with the DR adjustment processing in this way, it is possible to observe an image of the observation target S with a further reduced halation component.

When the halation reduction processing and the DR adjustment processing are used in combination, the order of the processing is not limited to the example explained above. For example, the processing obtained by combining the halation reduction processing and the DR adjustment processing may be executed as explained below.

First, a plurality of original image data are generated by the plural illumination imaging processing. The halation reduction processing is executed on the basis of the generated plurality of original image data, whereby first saturation reduced image data is generated. Thereafter, the plural illumination imaging processing is executed by changing a light reception time, whereby a plurality of original image data are generated again. The halation reduction processing is executed on the basis of the plurality of original image data generated anew, whereby second saturation reduced image data is generated. Finally, the first and second saturation reduced image data are combined. Consequently, saturation reduced image data with an adjusted dynamic range is generated.

Note that the processing obtained by combining the halation reduction processing and the DR adjustment processing may be manually executed according to an instruction for the kinds of processing by the user or may be automatically executed according to processing order decided in advance.

(e) Combination of the Halation Reduction Processing and the Connection Processing Halation is sometimes present in image data for display generated by the connection processing. Therefore, the user may use the halation reduction processing and the connection processing in combination. For example, when halation is present in an image displayed on the display section 430 after the connection processing, the user instructs the halation reduction processing.

In this case, the control section 410 generates, on the basis of a plurality of original image data generated concerning unit regions in the connection processing, saturation reduced image data corresponding to the unit regions. Subsequently, the control section 410 connects a plurality of saturation reduced image data on the basis of the position information and the overlapping region information stored in the storing section 420 during the connection processing.

By using the halation reduction processing and the connection processing in combination in this way, it is possible to acquire an image of the observation target S showing a region of the observation target larger than the unit regions and with a reduced halation component.

(7) Effect

In the magnifying observation apparatus 1 according to this embodiment, the ring illumination and the plurality of directional illuminations from the light projecting section 140 are irradiated on the observation target S. Emitting directions of the ring illumination and the plurality of directional illuminations are different from one another. Therefore, by optionally designating the emitting directions, the user can generate, without changing an emitting direction of light actually irradiated on the observation target S, image data for display indicating an image at the time when light in an appropriate emitting direction corresponding to the shape and the material of the observation target S is irradiated on the observation target S.

The image data for display is generated on the basis of at least one of a plurality of depth synthesis image data respectively corresponding to the ring illumination and the plurality of directional illuminations. Therefore, image data for display indicating an image focused on portions of the observation target S is generated. Consequently, it is possible to easily acquire an image of the observation target S corresponding to a request of the user.

Further, the image data for display can be generated using already generated original image data corresponding to the ring illumination or the directional illuminations. Therefore, it is unnecessary to perform the imaging of the observation target S again. Therefore, it is possible to reduce a burden on the user.

[2] Second Embodiment

Figure 45:
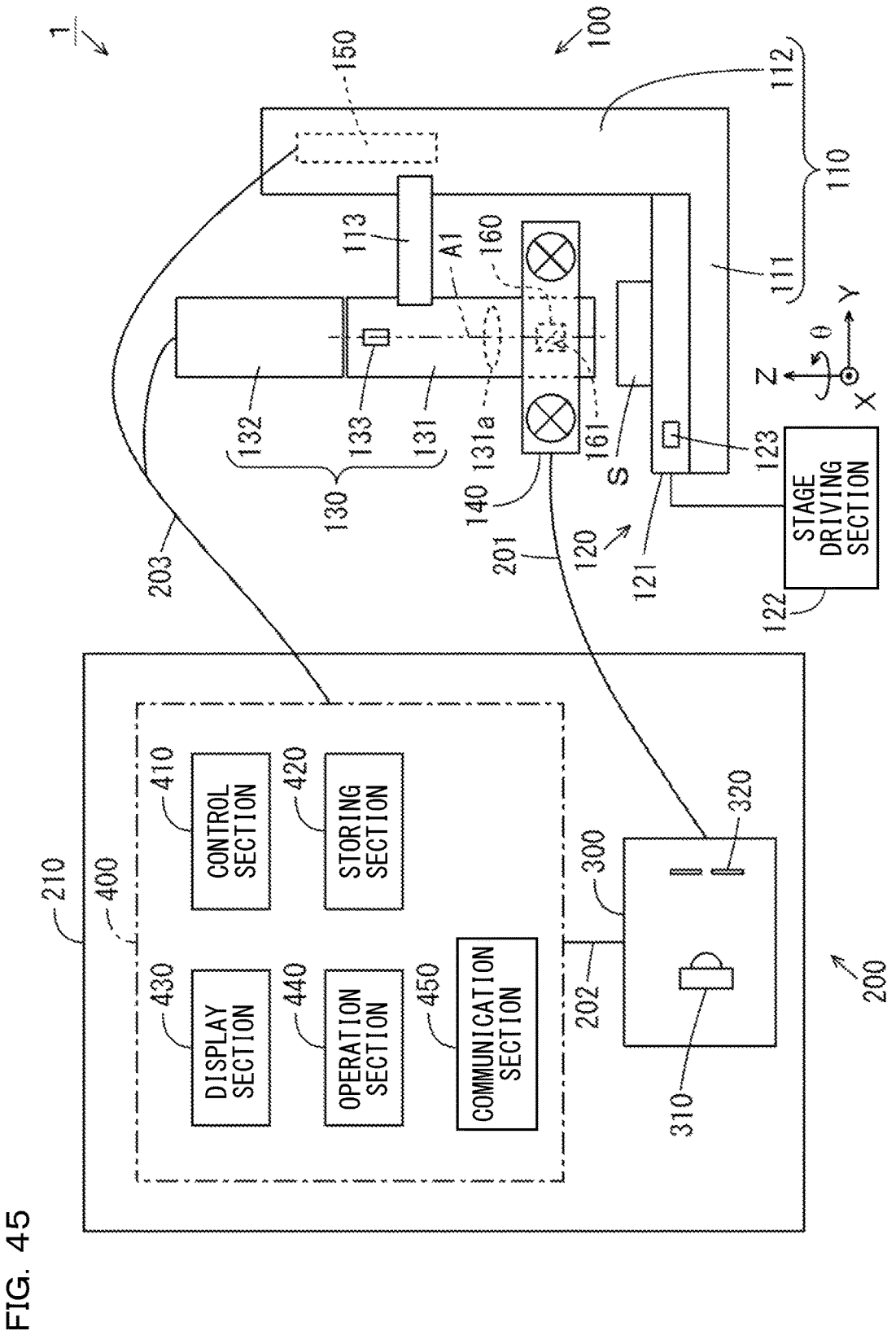
FIG. 45 is a schematic diagram showing the configuration of a magnifying observation apparatus according to a second embodiment of the present invention.

Concerning a magnifying observation apparatus according to a second embodiment of the present invention, differences from the magnifying observation apparatus 1 according to the first embodiment are explained. FIG. 45 is a schematic diagram showing the configuration of the magnifying observation apparatus according to the second embodiment of the present invention. As shown in FIG. 45, in the magnifying observation apparatus 1 according to this embodiment, the measurement head 100 further includes a light projecting section 160. The light projecting section 160 includes a half mirror 161.

The lens unit 131 is configured to be capable of holding the light projecting section 160 on the inside. The light projecting section 160 is disposed in the lens unit 131 in a state in which the light projecting section 160 is inclined at approximately 45° with respect to the optical axis A1 of the objective lens 131a such that a reflection surface of the half mirror 161 faces obliquely downward. The light projecting section 160 is optically connected to the light generating section 300 of the processing device 200 by a part of not-shown optical fibers of the fiber unit 201.

The light blocking section 320 of the light generating section 300 includes a plurality of opening patterns respectively corresponding to the regions 140A to 140D of the light projecting section 140 shown in FIGS. 3A and 3B and includes an opening pattern corresponding to the light projecting section 160. The light-projection control section 510 shown in FIG. 2 is capable of making light incident on the light projecting section 140 as in the first embodiment by switching the opening pattern of the light blocking section 320 that causes the light to pass. The light-projection control section 510 is also capable of making the light incident on the light projecting section 160. Behavior of the light made incident on the light projecting section 140 is the same as behavior of the light made incident on the light projecting section 140 in the first embodiment.

The light made incident on the light projecting section 160 is reflected by the half mirror 161 to be emitted downward along the optical axis A1 of the objective lens 131a and irradiated on the observation target S. The light emitted from the light projecting section 160 is referred to as coaxial epi-illumination. The light irradiated on the observation target S is reflected upward, transmitted through the half mirror 161 of the light projecting section 160 and the lens unit 131, and guided to the imaging section 132.

With the configuration explained above, the light projecting section 160 is capable of irradiating the light on the observation target S from a position closer to the optical axis A1 of the objective lens 131a than the light projecting section 140. Therefore, the coaxial epi-illumination is bright field illumination emitted in a direction parallel to the optical axis A1 of the objective lens 131a. The ring illumination is dark field illumination irradiated in a direction inclined with respect to the optical axis A1 of the objective lens 131a. By irradiating the coaxial epi-illumination on the observation target S, it is possible to more clearly image unevenness on the surface of the observation target S and a difference of a material. Note that it is also possible to simultaneously irradiate lights on the observation target S from the light projecting sections 140 and 160.

The imaging control section 520 shown in FIG. 2 controls a light reception time, a gain, timing, and the like of the imaging section 132 during the irradiation of the coaxial epi-illumination. In this embodiment, the irradiation of the coaxial epi-illumination is performed later than the irradiation of the ring illumination and the first to fourth directional illuminations. The imaging control section 520 performs automatic exposure on the basis of an average brightness value of original image data corresponding to the ring illumination generated earlier to thereby adjust the light reception time during the irradiation of the coaxial epi-illumination. The light reception time during the irradiation of the coaxial epi-illumination may be adjusted to a desired value by the user.

The imaging section 132 further generates original image data indicating the observation target S at the time when the coaxial epi-illumination is irradiated on the observation target S. The generated original image data corresponding to the coaxial epi-illumination is stored in the storing section 420. Imaging information further indicating presence or absence of execution of the irradiation of the coaxial epi-illumination and imaging conditions such as a light reception time during the irradiation of the coaxial epi-illumination is stored in the storing section 420.

The data generating section 610 shown in FIG. 9 generates image data for display further on the basis of the original image data corresponding to the coaxial epi-illumination in addition to the original image data respectively corresponding to the ring illumination and the directional illuminations stored in the storing section 420. Specifically, the data generating section 610 combines, at rates decided by illumination conditions designated by the user, a part or all of the plurality of original image data respectively corresponding to the ring illumination, the directional illuminations, and the coaxial epi-illumination. The generated image data for display is stored in the storing section 420.

In the plural illumination imaging processing according to this embodiment, the observation target S is imaged using the coaxial epi-illumination after the imaging of the observation target S performed using the ring illumination and the first to fourth directional illuminations. Consequently, a plurality of (in this example, six) original image data respectively corresponding to the ring illumination, the first to fourth directional illuminations, and the coaxial epi-illumination are generated.

Figure 46:
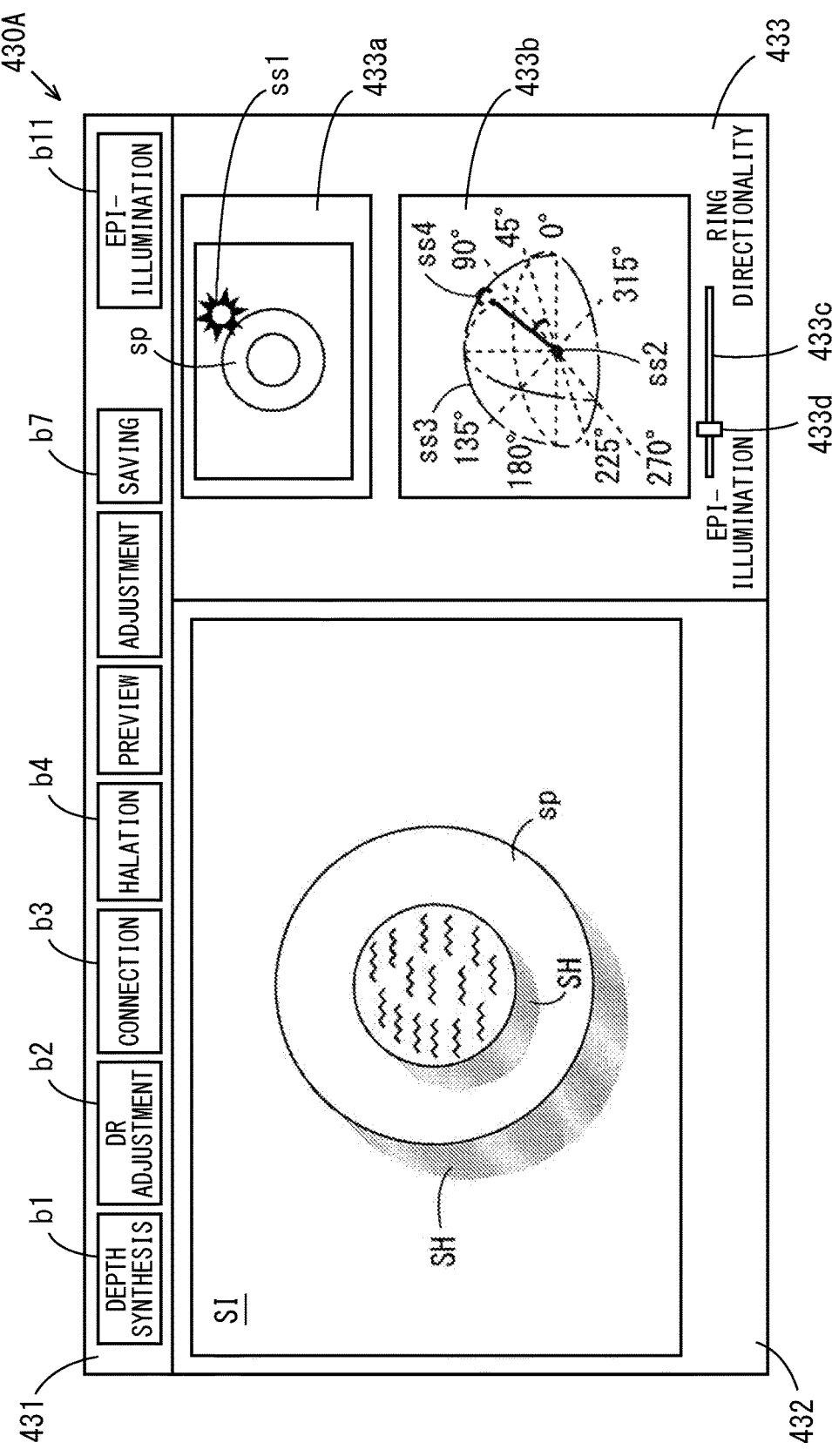
FIG. 46 is a diagram showing a display example of an observation screen after plural illumination imaging processing according to the second embodiment.

When the plural illumination imaging processing is completed, the observation screen 430A is displayed on the display section 430. FIG. 46 is a diagram showing a display example of the observation screen 430A after the plural illumination imaging processing according to the second embodiment. As shown in FIG. 46, an epi-illumination button b11 is displayed in the function display region 431 in addition to the plurality of buttons b1 to b7 explained above.

The user operates the epi-illumination button b11 using the operation section 440. Consequently, the user can instruct that image data for display should be generated using the original image data corresponding to the coaxial epi-illumination.

When it is instructed that the original image data corresponding to the coaxial epi-illumination is used, a bar 433c and a slider 433d for designating a combination rate of the original image data corresponding to the coaxial epi-illumination to the other original image data (hereinafter referred to as epi-illumination image rate) are displayed in the sub-display region 433.

The user can designate the epi-illumination image rate by operating the slider 433d. In the example shown in FIG. 46, the epi-illumination image rate is designated higher as the slider 433d is closer to the left end of the bar 433c. The epi-illumination image rate is designated lower as the slider 433d is closer to the right end of the bar 433c.

When the epi-illumination image rate is designated, in the processing in step S209 in FIG. 19 in the image-for-display generation processing, the control section 410 calculates combination rates of the plurality of original image data on the basis of the designated epi-illumination image rate in addition to the designated emitting direction.

For example, first, the control section 410 calculates combination rates of original image data respectively corresponding to the ring illumination and the first to fourth directional illuminations on the basis of the designated emitting direction. Thereafter, the control section 410 corrects the combination rates of the original image data respectively corresponding to the ring illumination and the first to fourth directional illuminations such that a total of a plurality of combination rates of the ring illumination and the first to fourth directional illuminations is (100−t) % when the designated epi-illumination image rate is t (t is a number of 0 to 100)%.

The plurality of original image data are combined on the basis of the plurality of combination rates calculated as explained above, whereby image data for display is generated. The image SI of the observation target S including components of the original image data corresponding to the coaxial epi-illumination is displayed in the main display region 432.

With the image SI of the original image data corresponding to the coaxial epi-illumination, it is possible to accurately observe the unevenness on the surface of the observation target S and the difference of the material compared with the image SI of the original image data respectively corresponding to the ring illumination and the first to fourth directional illuminations.

Therefore, the user can easily acquire the image SI of the observation target S corresponding to a purpose of observation by operating the epi-illumination button b11 and the slider 433d shown in FIG. 46.

[3] Third Embodiment

Figure 47:
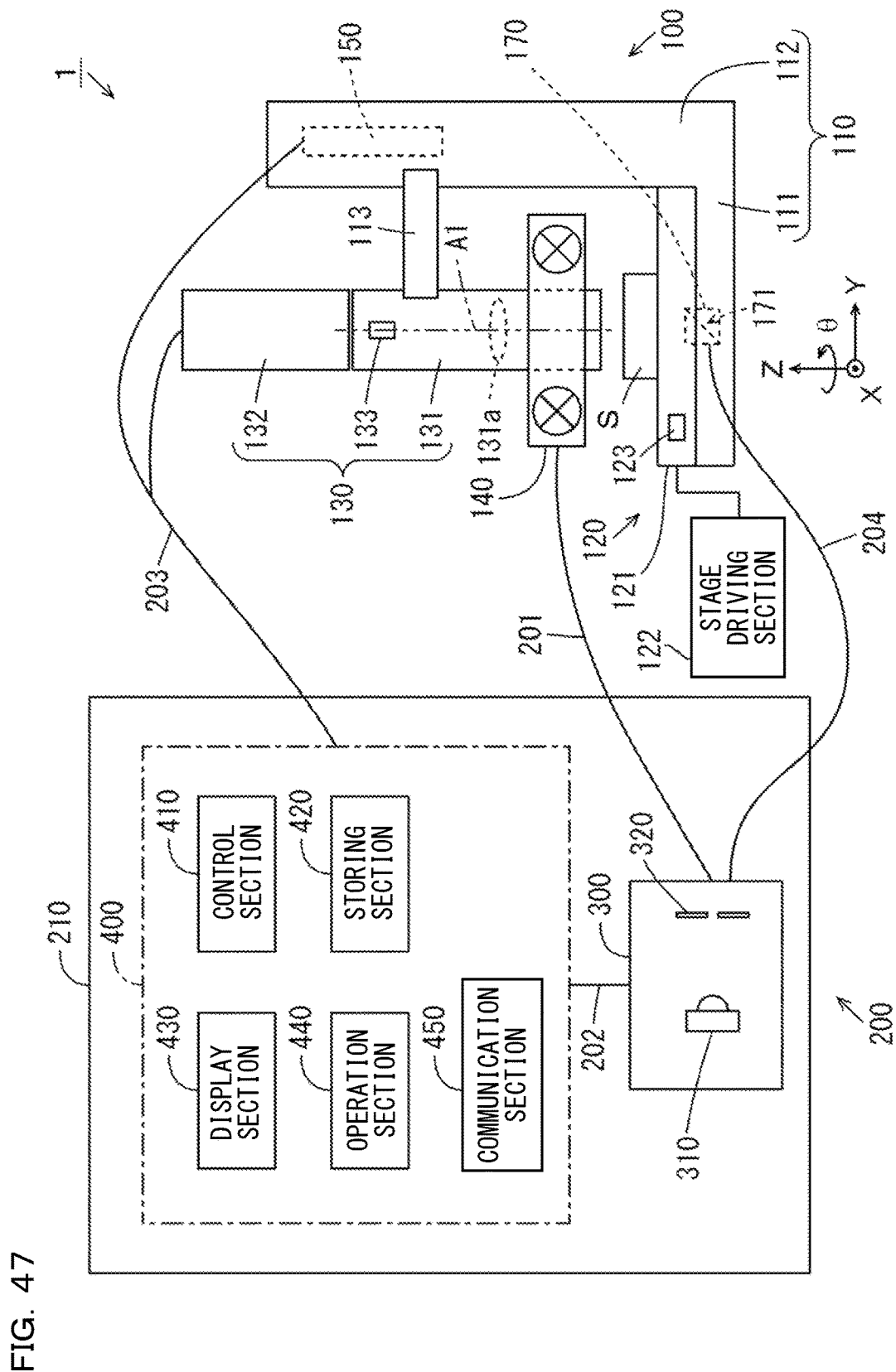
FIG. 47 is a schematic diagram showing the configuration of a magnifying observation apparatus according to a third embodiment of the present invention.

Concerning a magnifying observation apparatus according to a third embodiment of the present invention, differences from the magnifying observation apparatus 1 according to the first embodiment are explained. FIG. 47 is a schematic diagram showing the configuration of the magnifying observation apparatus according to the third embodiment of the present invention. As shown in FIG. 47, in the magnifying observation apparatus 1 according to this embodiment, the measurement head 100 further includes a light projecting section 170. The light projecting section 170 includes a mirror 171. The magnifying observation apparatus 1 further includes a fiber unit 204. The fiber unit 204 includes a not-shown plurality of optical fibers. The light projecting section 170 may be incorporated in the setting section 111 of the stand section 110.

The setting section 111 of the stand section 110 is configured to be capable of holding the light projecting section 170 on the inside. The light projecting section 170 is disposed in the setting section 111 in a state in which the light projecting section 170 is inclined approximately 45° with respect to the optical axis A1 of the objective lens 131a such that a reflection surface of the mirror 171 faces obliquely upward. Consequently, the light projecting section 170 is opposed to the lens barrel section 130 across the observation target S and the stage 121. The light projecting section 170 is optically connected to the light generating section 300 of the processing device 200 by a part of the not-shown optical fibers of the fiber unit 201.

The light blocking section 320 of the light generating section 300 includes a plurality of opening patterns respectively corresponding to the regions 140A to 140D of the light projecting section 140 shown in FIGS. 3A and 3B and includes an opening pattern corresponding to the light projecting section 170. The light-projection control section 510 shown in FIG. 2 is capable of making light incident on the light projecting section 140 as in the first embodiment by switching the opening pattern of the light blocking section 320 that causes the light to pass. The light-projection control section 510 is also capable of making the light incident on the light projecting section 170. Behavior of the light made incident on the light projecting section 140 is the same as behavior of the light made incident on the light projecting section 140 in the first embodiment.

The light made incident on the light projecting section 170 is reflected by the mirror 171 to be emitted upward along the optical axis A1 of the objective lens 131a and irradiated on the observation target S on the stage 121. The light emitted from the light projecting section 170 is referred to as transmission illumination. The light irradiated on the observation target S is transmitted upward, transmitted through the lens unit 131, and guided to the imaging section 132. By irradiating the transmission illumination on the observation target S, it is possible to image the structure on the inside of the observation target S.

The imaging section 132 further generates original image data indicating the observation target S at the time when the transmission illumination is irradiated on the observation target S. The generated original image data corresponding to the transmission illumination is stored in the storing section 420. Imaging information further indicating presence or absence of execution of irradiation of the transmission illumination and imaging conditions such as a light reception time during the irradiation of the transmission illumination is stored in the storing section 420.

The data generating section 610 shown in FIG. 9 generates image data for display further on the basis of the original image data corresponding to the transmission illumination in addition to the original image data respectively corresponding to the ring illumination and the directional illuminations stored in the storing section 420. Specifically, the data generating section 610 combines, at rates decided by illumination conditions designated by the user, a part or all of the plurality of original image data respectively corresponding to the ring illumination, the directional illuminations, and the transmission illumination. The generated image data for display is stored in the storing section 420.

The measurement head 100 shown in FIG. 47 does not include the light projecting section 160 that emits the coaxial epi-illumination. However, the present invention is not limited to this. The measurement head 100 shown in FIG. 47 may include the light projecting section 160 same as the light projecting section 160 shown in FIG. 45. In this case, image data for display is generated on the basis of the original image data respectively corresponding to the ring illumination, the directional illuminations, the coaxial epi-illumination, and the transmission illumination.

In the plural illumination imaging processing according to this embodiment, the observation target S is imaged using the transmission illumination after the imaging of the observation target S performed using the ring illumination and the first to fourth directional illuminations. Consequently, a plurality of (in this example, six) original image data respectively corresponding to the ring illumination, the first to fourth directional illuminations, and the transmission illumination are generated.

Figure 48:
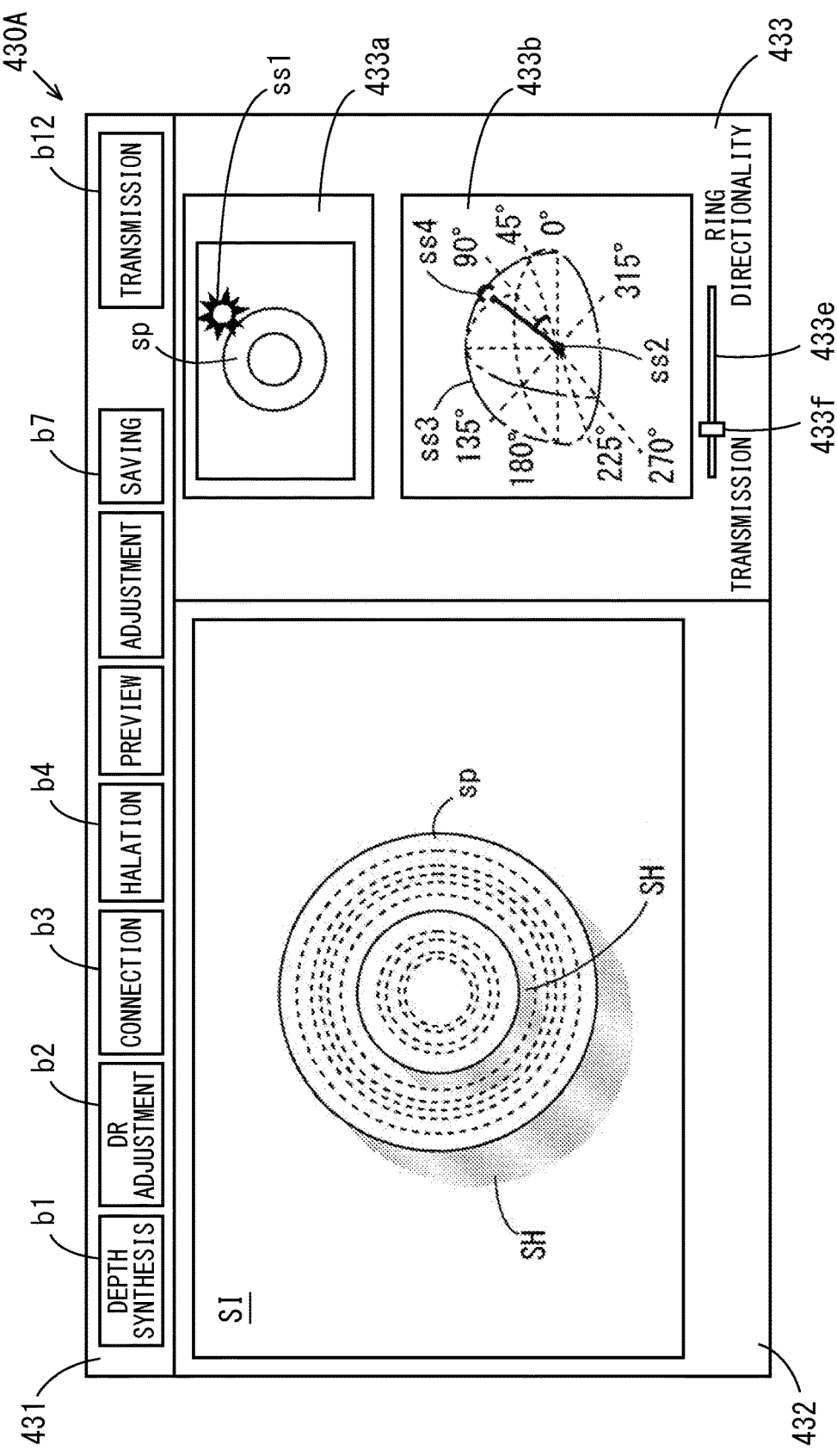
FIG. 48 is a diagram showing a display example of an observation screen after plural illumination imaging processing according to the third embodiment.

When the plural illumination imaging processing is completed, the observation screen 430A is displayed on the display section 430. FIG. 48 is a diagram showing a display example of an observation screen 430A after the plural illumination imaging processing according to the third embodiment. As shown in FIG. 48, a transmission button b12 is displayed in the function display region 431 in addition to the plurality of buttons b1 to b7 explained above.

The user operates the transmission button b12 using the operation section 440. Consequently, the user can instruct that image data for display should be generated using the original image data corresponding to the transmission illumination.

When it is instructed that the original image data corresponding to the transmission illumination is used, a bar 433e and a slider 433f for designating a combination rate of the original image data corresponding to the transmission illumination to the other original image data (hereinafter referred to as transmission image rate) are displayed in the sub-display region 433.

The user can designate the transmission image rate by operating the slider 433f. In the example shown in FIG. 48, the transmission image rate is designated higher as the slider 433f is closer to the left end of the bar 433e. The transmission image rate is designated lower as the slider 433f is closer to the right end of the bar 433e.

When the transmission image rate is designated, in the processing in step S209 in FIG. 19 in the image-for-display generation processing, the control section 410 calculates combination rates of the plurality of original image data on the basis of the designated transmission image rate in addition to the designated emitting direction.

For example, first, the control section 410 calculates combination rates of original image data respectively corresponding to the ring illumination and the first to fourth directional illuminations on the basis of the designated emitting direction. Thereafter, the control section 410 corrects the combination rates of the original image data respectively corresponding to the ring illumination and the first to fourth directional illuminations such that a total of a plurality of combination rates of the ring illumination and the first to fourth directional illuminations is (100−u) % when the designated transmission image rate is u (u is a number of 0 to 100)%.

The plurality of original image data are combined on the basis of the plurality of combination rates calculated as explained above, whereby image data for display is generated. The image SI of the observation target S including components of the original image data corresponding to the transmission illumination is displayed in the main display region 432. When the observation target S is formed of a material that transmits light, the internal structure of the observation target S clearly appears in the image SI of the original image data corresponding to the transmission illumination.

Therefore, the user can easily acquire the image SI of the observation target S corresponding to a purpose of observation by operating the transmission button b12 and the slider 433f shown in FIG. 48.

When the measurement head 100 shown in FIG. 47 includes the light projecting section 160 shown in FIG. 45 as explained above, in the plural illumination imaging processing, a plurality of original image data respectively corresponding to the ring illumination, the directional illumination, the coaxial epi-illumination, and the transmission illumination may be generated. In this case, on the observation screen 430A, the epi-illumination button b11, the bar 433c, and the slider 433d shown in FIG. 46 and the transmission button b12, the bar 433e, and the slider 433f shown in FIG. 48 may be simultaneously displayed. Consequently, flexibility of adjustment is improved concerning the image SI of the observation target S displayed in the main display region 432.

[4] Other Embodiments (1) In the embodiment, after the plurality of original image data respectively corresponding to the plurality of illuminations are generated, the image data for display is generated on the basis of the plurality of original image data according to the illumination conditions designated by the user. However, the present invention is not limited to this. The illumination conditions may be designated by the user first. In this case, original image data necessary for generating the image data for display that should be generated is determined on the basis of the designated illumination conditions.

Therefore, in this embodiment, only illumination corresponding to the necessary original image data is irradiated on the observation target S. Consequently, only the necessary original image data is generated. With this configuration, the other illuminations are not irradiated on the observation target S. Unnecessary original image data is not generated. Consequently, it is possible to generate the image data for display at high speed.

(2) In the embodiment, the regions 140A to 140D of the light projecting section 140 are desirably disposed rotation-symmetrically around the optical axis A1 of the objective lens 131a. However, the present invention is not limited to this. The regions 140A to 140D of the light projecting section 140 do not have to be disposed rotation-symmetrically around the optical axis A1 of the objective lens 131a.

(3) In the embodiment, when the image data for display is generated by combining the plurality of original image data, one of the plurality of original image data is desirably original image data corresponding to the ring illumination. However, the present invention is not limited to this. It is also possible that the original image data corresponding to the ring illumination is not used for the combination and the image data for display is generated by combining a part or all of the plurality of original image data respectively corresponding to the directional illuminations, the coaxial epi-illumination, and the transmission illumination.

(4) In the embodiment, the image data for display is generated by combining the plurality of original image data. However, the present invention is not limited to this. The image data for display may be generated by selecting one of the generated plurality of original image data. In this configuration, a larger number of original image data are desirably generated. In this case, it is possible to generate more accurate image data for display. Therefore, a larger number of light emission regions may be provided in order to make it possible to generate a larger number of original image data. Light emitting members may be provided to be capable of emitting lights from a larger number of positions. Alternatively, a single light emitting member may be provided to be capable of moving to a plurality of emitting positions.

Figure 49:
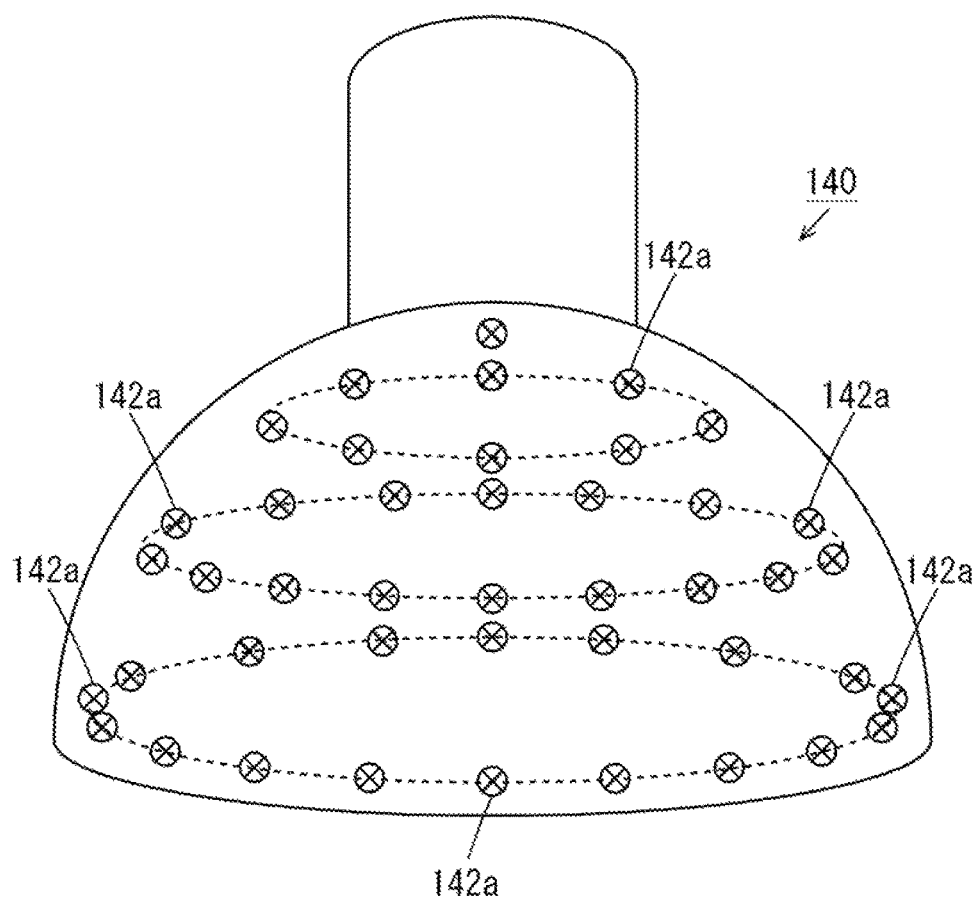
FIG. 49 is a schematic diagram showing a modification of a light projecting section.

(5) In the embodiment, the light projecting section 140 has the cylindrical shape. However, the present invention is not limited to this. The light projecting section 140 may have a shape other than the cylindrical shape. FIG. 49 is a schematic diagram showing a modification of the light projecting section 140. In the example shown in FIG. 49, the light projecting section 140 has, for example, a hemispherical shape. A plurality of light sources 142*a* are provided to be capable of irradiating lights in a plurality of emitting directions on an observation target from any positions on the inner surface of the light projecting section 140. In this case, it is easy to generate image data for display using single original image data without combining a plurality of original image data. In this configuration, it is more desirable that light amounts of lights in emitting directions can be individually adjusted.

(6) In the embodiment, in the image-for-display generation processing, when the imaginary emitting direction of light is designated by the user anew, the image SI of the observation target S displayed on the display section 430 is switched to the image SI corresponding to the light in the designated emitting direction. However, the present invention is not limited to this.

When the imaginary emitting direction of light is designated by the user anew, the image SI of the observation target S based on the image data for display before the update and the image SI of the observation target S based on the image data for display after the update may be simultaneously displayed on the display section 430. In this case, the user can compare the image SI of the observation target S before the emitting direction is designated and the image SI of the observation target S after the designation. Therefore, it is possible to easily identify an appropriate image SI through the observation of the observation target S while designating the imaginary emitting direction of light. The example in which the images SI before and after the update are simultaneously displayed includes, for example, displaying the images SI before and after the update side by side and superimposing and displaying the images SI before and after the update.

(7) In the present invention, the light projecting section 140 may include one or a plurality of one-side irradiation illuminating sections and full irradiation illuminating sections. The one-side irradiation illuminating section and the full irradiation illuminating section are illuminating sections disposed around the imaging section 132 such that a positional relation with the objective lens 131*a* is fixed. The one-side irradiation illuminating section irradiates illumination on the observation target S from a position deviating from the optical axis A1 of the objective lens 131*a*. The full irradiation illuminating section irradiates illumination on the observation target S from a substantially uniform position with respect to the optical axis A1 of the objective lens 131*a*.

Image data for display is generated on the basis of at least one of one or a plurality of original image data at the time when the observation target S is illuminated by the one-side irradiation illuminating section and original image data at the time when the observation target S is illuminated by the full irradiation illuminating section. The image data for display may be generated to be subjected to various kinds of processing such as the depth synthesis processing. In this embodiment, the directional illumination corresponds to an example of light emitted by the one-side irradiation illuminating section. The ring illumination corresponds to an example of light emitted by the full irradiation illuminating section.

(8) In the present invention, the light projecting section 140 may include a plurality of light emitting members disposed around the imaging section 132 such that a positional relation with the objective lens 131*a* is fixed. The light emitting members irradiate illuminations on the observation target S. Image data for display is generated on the basis of at least one of original image data at the time when the observation target S is illuminated by at least one of the light emitting members and original image data at the time when the observation target S is illuminated by the other light emitting members. The image data for display may be generated to be subjected to various kinds of processing such as the depth synthesis processing.

(9) In the present invention, the light projecting section 140 may include at least one light emitting member that irradiates illumination on the observation target S. A plurality of emitting positions may be provided around the imaging section 132 such that a positional relation with the objective lens 131*a* is fixed. Image data for display is generated on the basis of at least one of original image data at the time when the observation target S is illuminated by the light emitting member from one emitting position and original image data at the time when the observation target S is illuminated by the light emitting member from the other emitting positions. The image data for display may be generated to be subjected to various kinds of processing such as the depth synthesis processing. In this configuration, a plurality of light emitting members may be disposed in the plurality of emitting positions or a single light emitting member may be provided to be capable of moving to the plurality of emitting positions.

[5] Correspondence Relation Between the Constituent Elements of the Claims and the Sections of the Embodiments An example of correspondence between the constituent elements of the claims and the sections of the embodiments is explained. However, the present invention is not limited to the example explained below.

In the embodiments, the objective lens 131*a* is an example of the objective lens, the observation target S is an example of the observation target, the light projecting section 140 is an example of the light projecting section, the imaging section 132 is an example of the imaging section, and the optical axis A1 is an example of the optical axis. The focus driving section 113 is an example of the focal-position changing section, the data generating section 610 is an example of the data generating section, the magnifying observation apparatus 1 is an example of the magnifying observation apparatus, and the focus determining section 620 is an example of the focus determining section. The operation section 440 is an example of the first to third operation sections or the operation section, the light-projection control section 510 is an example of the control section, the regions 140A to 140D are examples of the light emission regions, and the optical fibers 142 are an example of the light emitting member.

As the constituent elements of the claims, other various elements including the configurations or the functions described in the claims can also be used.

The present invention can be effectively used in various magnifying observation apparatuses.

What is claimed is:

1. A magnifying observation apparatus comprising:
an objective lens;
a light projecting section configured to selectively irradiate, on an observation target, lights from first and second emitting directions different from each other;
an imaging section configured to receive light from the observation target via the objective lens and generate first and second original image data indicating an image of the observation target;
a focal-position changing section configured to change a focal position of the light passed through the objective lens to an optical axis direction of the objective lens relatively to the observation target; and
a data generating section configured to generate image data for display indicating an image of the observation target that should be obtained when it is assumed that light in a specific emitting direction designated by a user is irradiated on the observation target,
wherein, at a first light irradiation time, the light projecting section irradiates the light in the first emitting direction on the observation target and the imaging section generates a plurality of the first original image data in a different plurality of the focal positions changed by the focal-position changing section, at a second light irradiation time,
the light projecting section irradiates the light in the second emitting direction on the observation target and the imaging section generates a plurality of the second original image data in a different plurality of the focal positions changed by the focal-position changing section, and
the data generating section acquires, on the basis of the plurality of first original image data, first focused image data having a focus degree decided in advance, acquires, on the basis of the plurality of second original image data, second focused image data having a focus degree decided in advance, and generates image data for display on the basis of at least one of the first and second focused image data.

2. The magnifying observation apparatus according to claim 1, further comprising a focus determining section configured to determine a focus degree of each of portions of the first or second original image data generated by the imaging section,
wherein the data generating section selectively combines portions of the plurality of first original image data on the basis of the determination of the focus degree by the focus determining section to thereby generate the first focused image data indicating an image focused on portions of the observation target and selectively combines portions of the plurality of second original image data on the basis of the determination of the focus degree by the focus determining section to thereby generate the second focused image data indicating an image focused on the portions of the observation target.

3. The magnifying observation apparatus according to claim 2, wherein the data generating section generates correspondence relation data indicating a correspondence relation between portions of the first focused image data and portions of the plurality of first original image data and generates the second focused image data from the plurality of second original image data on the basis of the generated correspondence relation data.

4. The magnifying observation apparatus according to claim 2, wherein the generation of the plurality of first or second original image data by the imaging section and the generation of the first or second focused image data by the data generating section are performed in parallel.

5. The magnifying observation apparatus according to claim 1, further comprising a focus determining section configured to determine a focus degree of the first or second original image data generated by the imaging section,
wherein the data generating section extracts any one of the plurality of first original image data as the first focused image data on the basis of the determination of the focus degree by the focus determining section and extracts any one of the plurality of second original image data as the second focus image data on the basis of the determination of the focus degree by the focus determining section.

6. The magnifying observation apparatus according to claim 1, further comprising a first operation section operated by the user in order to designate a range of a focal position of light in the optical axis direction of the objective lens,
wherein the focal-position changing section changes the focal position of the light in the optical axis direction of the objective lens in the range designated by the first operation section.

7. The magnifying observation apparatus according to claim 1, further comprising:
a second operation section configured to receive an instruction for a start of observation by the user; and
a control section configured to, in response to the instruction received by the second operation section, control the light projecting section to sequentially emit the lights in the first and second emitting directions respectively at the first and second light irradiation times while controlling the focal-position changing section to set the focal position of the light to a first position and thereafter control the light projecting section to sequentially emit the lights in the first and second emitting directions respectively at the first and second light irradiation times while controlling the focal-position changing section to set the focal position of the light to a second position different from the first position in the optical axis direction of the objective lens.

8. The magnifying observation apparatus according to claim 1, further comprising:
a second operation section configured to receive an instruction for a start of observation by the user; and
a control section configured to, in response to the instruction received by the second operation section, control the light projecting section to emit the light in the first emitting direction while controlling the focal-position changing section to sequentially change the focal position of the light to different first and second positions in the optical axis direction of the objective lens at the first light irradiation time and thereafter control the light projecting section to emit the light in the second emitting direction while controlling the focal-position changing section to sequentially change the focal position of the light to the first and second positions at the second light irradiation time.

9. The magnifying observation apparatus according to claim 1,
wherein the imaging section generates the first and second original image data in a state in which a light reception time is changed to a plurality of times, and the data generating section generates the image data for display with an adjusted dynamic range on the basis of at least one of the plurality of first original image data generated by the imaging section in the state in which the light reception time is changed to the plurality of times concerning the focal positions and the plurality of second original image data generated by the imaging section in the state in which the light reception time is changed to the plurality of times concerning the focal positions.

10. The magnifying observation apparatus according to claim 1,
wherein the light projecting section includes a plurality of light emission regions disposed rotation-symmetrically around an optical axis of the objective lens and simultaneously emits lights from the plurality of light emission regions at the first light irradiation time to thereby irradiate the light in the first emitting direction on the observation target and emits light from a part of the plurality of light emission regions at the second light irradiation time to thereby irradiate the light in the second light emitting direction on the observation target.

11. The magnifying observation apparatus according to claim 10, wherein one or more light emitting members are provided in each of the plurality of light emission regions.

12. The magnifying observation apparatus according to claim 1, wherein the data generating section combines the first and second focused image data to thereby generate the image data for display.

13. The magnifying observation apparatus according to claim 12, wherein the data generating section determines a ratio of the combination of the first and second focused image data on the basis of the specific emitting direction.

14. The magnifying observation apparatus according to claim 1, further comprising a third operation section operated by the user in order to designate the specific emitting direction, wherein the data generating section updates, according to the specific emitting direction designated by the third operation section, the image data for display to be generated.

15. A magnifying observation apparatus comprising:
an objective lens;
a light projecting section configured to irradiate lights in a plurality of emitting directions on an observation target;
an imaging section configured to receive light from the observation target via the objective lens and generate original image data indicating an image of the observation target;
a focal-position changing section configured to change a focal position of the light passed through the objective lens to an optical axis direction of the objective lens relatively to the observation target;
an operation section operated by a user in order to designate an imaginary emitting direction of light; and
a data generating section configured to generate image data for display indicating an image of the observation target that should be obtained when it is assumed that light in the emitting direction designated by the operation section is irradiated on the observation target,
wherein the light projecting section irradiates light in one or a plurality of emitting directions on the observation target on the basis of the emitting direction designated by the operation section, the imaging section generates a plurality of the original image data in a different plurality of the focal positions changed by the focal-position changing section, and the data generating section acquires, on the basis of the plurality of original image data, one or a plurality of focused image data having a focus degree decided in advance and generates image data for display on the basis of at least one of the one or plurality of focused image data.

* * * * *